US012687813B2

(12) United States Patent
Iizuka et al.

(10) Patent No.: US 12,687,813 B2
(45) Date of Patent: Jul. 21, 2026

(54) IMAGE FORMING APPARATUS HAVING BOTH FRONT AND SIDE OPENING/CLOSING COVERINGS

(71) Applicant: FUJIFILM Business Innovation Corp., Tokyo (JP)

(72) Inventors: Takahiro Iizuka, Kanagawa (JP); Naoyuki Kato, Kanagawa (JP); Kenji Yamada, Kanagawa (JP); Satoshi Noda, Kanagawa (JP); Kenichi Ishikura, Kanagawa (JP); Hiroyuki Tanaka, Kanagawa (JP); Shinya Hasegawa, Kanagawa (JP); Kota Tomioka, Kanagawa (JP); Yoichi Yamakawa, Kanagawa (JP); Tomonori Sato, Kanagawa (JP); Ryusuke Nakata, Kanagawa (JP); Kazuyuki Koda, Kanagawa (JP); Isamu Adachi, Kanagawa (JP); Miho Morita, Kanagawa (JP); Tomomi Ishida, Kanagawa (JP); Shinnosuke Kondo, Kanagawa (JP); Yuya Shiokawa, Kanagawa (JP); Daisuke Ishihara, Kanagawa (JP); Kohei Tachibana, Kanagawa (JP); Shinichi Ohba, Kanagawa (JP); Taisuke Endo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 244 days.

(21) Appl. No.: 17/710,996

(22) Filed: Mar. 31, 2022

(65) Prior Publication Data

US 2023/0053700 A1 Feb. 23, 2023

(30) Foreign Application Priority Data

Aug. 23, 2021 (JP) ................................ 2021-135289
Aug. 23, 2021 (JP) ................................ 2021-135290
(Continued)

(51) Int. Cl.
*G03G 15/00* (2006.01)
*B41J 29/13* (2006.01)
*G03G 21/16* (2006.01)

(52) U.S. Cl.
CPC ..... *G03G 21/1633* (2013.01); *G03G 21/1619* (2013.01); *G03G 21/1647* (2013.01)

(58) Field of Classification Search
None
See application file for complete search history.

(56) References Cited

U.S. PATENT DOCUMENTS 4,696,522 A * 9/1987 Lowe ...................... B41J 11/58 312/223.2
4,755,010 A * 7/1988 Wilson .................... B41J 29/06 312/208.2
(Continued)

FOREIGN PATENT DOCUMENTS

CN 210460248 U * 5/2020
EP 0452931 10/1991
(Continued)

OTHER PUBLICATIONS

English language translation of JP 02281389 A, publication date Nov. 19, 1990 (Year: 1990).*
(Continued)

*Primary Examiner* — Leslie J Thompson
(74) *Attorney, Agent, or Firm* — JCIPRNET

(57) ABSTRACT

An image forming apparatus includes an apparatus body having an image forming part that forms an image on a
(Continued)

recording medium and a medium storage part in which a recording medium to be supplied to the image forming part is stored; and a front opening/closing covering that is an openable and closable covering that covers at least a part of the image forming part and a part of the medium storage part on a front face of the apparatus body, wherein the front opening/closing covering is constituted by a single opening/closing covering that covers at least a range from one end to the other end in a left-right direction of the part of the medium storage part in a left-right direction of the apparatus body.

20 Claims, 45 Drawing Sheets

(30) Foreign Application Priority Data

| | | | |
|---|---|---|---|
| Aug. 23, 2021 | (JP) | ................................ | 2021-135424 |
| Aug. 23, 2021 | (JP) | ................................ | 2021-135483 |
| Aug. 23, 2021 | (JP) | ................................ | 2021-135487 |
| Aug. 23, 2021 | (JP) | ................................ | 2021-135489 |
| Aug. 23, 2021 | (JP) | ................................ | 2021-135490 |
| Aug. 23, 2021 | (JP) | ................................ | 2021-135491 |
| Jan. 12, 2022 | (JP) | ................................ | 2022-003355 |

(56) References Cited

U.S. PATENT DOCUMENTS

| | | | | |
|---|---|---|---|---|
| 5,614,991 | A | 3/1997 | Moro et al. | |
| 5,764,385 | A | 6/1998 | Ohyama | |
| 5,805,272 | A | 9/1998 | Nozawa et al. | |
| 5,940,128 | A | 8/1999 | Morimura | |
| 6,011,635 | A | 1/2000 | Bungo et al. | |
| 6,371,476 | B2 | 4/2002 | Isogai et al. | |
| 7,704,001 | B2 * | 4/2010 | Igarashi ................ | B41J 13/103 347/108 |
| 2002/0000689 | A1 | 1/2002 | Isogai et al. | |
| 2002/0114634 | A1 | 8/2002 | Ahn et al. | |
| 2003/0230841 | A1 | 12/2003 | Hiramoto et al. | |
| 2005/0074266 | A1 | 4/2005 | Hiramoto et al. | |
| 2007/0071492 | A1 | 3/2007 | Ito | |
| 2007/0076268 | A1 | 4/2007 | Shojo et al. | |
| 2007/0147882 | A1 | 6/2007 | Igarashi | |
| 2007/0183810 | A1 | 8/2007 | Kamiya | |
| 2013/0063751 | A1 | 3/2013 | Miura et al. | |
| 2013/0342878 | A1 | 12/2013 | Larson et al. | |
| 2015/0139685 | A1 | 5/2015 | Hoshino et al. | |
| 2016/0156247 | A1 | 6/2016 | Ishida et al. | |
| 2017/0244853 | A1 | 8/2017 | Yabuuchi et al. | |
| 2017/0302812 | A1 | 10/2017 | Satomi | |
| 2019/0185279 | A1 | 6/2019 | Ando | |
| 2020/0019354 | A1 | 1/2020 | Tsuchiya | |
| 2021/0120137 | A1 | 4/2021 | Okamoto et al. | |
| 2021/0218850 | A1 | 7/2021 | Ogawa | |
| 2023/0053735 | A1 | 2/2023 | Shinoto et al. | |
| 2023/0230841 | A1 | 7/2023 | Lin | |

FOREIGN PATENT DOCUMENTS

| | | |
|---|---|---|
| EP | 1553462 | 7/2005 |
| EP | 1562081 | 8/2005 |
| EP | 1793579 | 6/2007 |
| EP | 2911010 | 8/2015 |
| EP | 2962450 | 1/2016 |
| JP | S5940239 | 3/1984 |
| JP | 02281389 A * | 11/1990 |
| JP | 03076677 A * | 4/1991 |
| JP | H0616255 | 1/1994 |
| JP | H07115516 | 5/1995 |
| JP | H08297387 | 11/1996 |
| JP | H09222762 | 8/1997 |
| JP | H11127286 | 5/1999 |
| JP | H11278742 | 10/1999 |
| JP | 2003078724 | 3/2003 |
| JP | 2003140530 | 5/2003 |
| JP | 2003312870 | 11/2003 |
| JP | 2004032280 | 1/2004 |
| JP | 2004264525 | 9/2004 |
| JP | 2005151426 | 6/2005 |
| JP | 2007104339 | 4/2007 |
| JP | 2007214836 | 8/2007 |
| JP | 1358358 | 5/2009 |
| JP | 2010176104 | 8/2010 |
| JP | 2015032895 | 2/2015 |
| JP | 2016058863 | 4/2016 |
| JP | 2016217539 | 12/2016 |
| JP | 2017152795 | 8/2017 |
| JP | 2017175594 | 9/2017 |
| JP | 2017192116 | 10/2017 |
| JP | 2018007106 | 1/2018 |
| JP | 2018180089 | 11/2018 |
| JP | 2019017063 | 1/2019 |
| JP | 2020137163 | 8/2020 |
| JP | 2021068980 | 4/2021 |
| KR | 20060107994 | 10/2006 |
| WO | 2014131147 | 9/2014 |

OTHER PUBLICATIONS

English translation of CN 210460248 U, publication date May 5, 2020. (Year: 2020).*
English abstract of JP 03076677A, publication date Apr. 2, 1991. (Year: 1991).*
"Search Report of Europe Related Application No. 22169617.2", issued on Oct. 5, 2022, pp. 1-9.
"Search Report of Europe Counterpart Application No. 22169619.8", issued on Oct. 27, 2022, pp. 1-9.
"Search Report of Europe Related Application No. 22169618.0", issued on Oct. 21, 2022, pp. 1-11.
"Search Report of Europe Related Application No. 22169627.1", issued on Oct. 6, 2022, pp. 1-9.
"Search Report of Europe Related Application No. 22169652.9", issued on Oct. 5, 2022, pp. 1-10.
"Search Report of Europe Related Application No. 22169633.9", issued on Oct. 13, 2022, pp. 1-10.
"Search Report of Europe Related Application No. 22169624.8", issued on Oct. 6, 2022, pp. 1-9.
"Search Report of Europe Related Application No. 22169641.2", issued on Oct. 13, 2022, pp. 1-13.
"Office Action of Related U.S. Appl. No. 17/715,025", issued on Aug. 12, 2025, p. 1-p. 13.
"Office Action of U.S. Counterpart Application", issued on Sep. 5, 2024, p. 1-p. 25.
"Office Action of Europe Related Application No. 22169627.1", issued on Apr. 2, 2024, pp. 1-4.
"Office Action of Europe Related Application No. 22169652.9", issued on Apr. 2, 2024, pp. 1-6.
"Office Action of Europe Related Application No. 22169624.8", issued on Apr. 2, 2024, pp. 1-6.
"Office Action of Europe Related Application No. 22169641.2", issued on Apr. 2, 2024, pp. 1-7.
"Office Action of Related U.S. Appl. No. 17/715,021", issued on Nov. 1, 2024, p. 1-p. 24.
"Office Action of Related U.S. Appl. No. 17/715,062", issued on Nov. 27, 2024, p. 1-p. 36.
"Office Action of Related U.S. Appl. No. 17/715,025", issued on Mar. 11, 2025, p. 1-p. 41.
"Office Action of Related U.S. Appl. No. 17/711,040", issued on Mar. 14, 2025, p. 1-p.52.
Merriam-Webster Dictionary, "container", retrieved on Dec. 5, 2024, Available at: https://www.merriam-webster.com/dictionary/container.
"Summaries with Thumbnails", InnovationQ Plus, retrieved on Dec. 11, 2024, pp. 1-127.

(56) References Cited

OTHER PUBLICATIONS

Proquest, "Search Strategy from Dialog", retrieved on Dec. 10, 2024, pp. 1-4.
"Notice of allowance of Related U.S. Appl. No. 17/714,152", issued on Dec. 12, 2024, p. 1-p. 17.
"Notice of allowance of Related U.S. Appl. No. 17/714,110", issued on Dec. 16, 2024, p. 1-p. 14.
"Office Action of Related U.S. Appl. No. 17/714,123", issued on Apr. 22, 2025, p. 1-p. 44.
"Summaries with Thumbnails", InnovationQ+, Jul. 16, 1996-Mar. 26, 2024, pp. 1-127.
"Office Action of Related U.S. Appl. No. 17/714,110", issued on Sep. 13, 2024, p. 1-p. 25.
"Notice of Reasons for Refusal of Japan Counterpart Application, Application No. 2022-003294", issued on Oct. 28, 2025, with English translation thereof, p. 1-p. 6.
"Notice of Reasons for Refusal of Japan Counterpart Application, Application No. 2022-003292", issued on Oct. 28, 2025, with English translation thereof, p. 1-p. 5.
"Notice of Reasons for Refusal of Japan Counterpart Application, Application No. 2022-003293", issued on Nov. 4, 2025, with English translation thereof, p. 1-p. 9.
"Office Action of Related U.S. Appl. No. 17/711,040", issued on Jan. 15, 2026, p. 1-p. 17.
"Decision of Refusal of Japan Counterpart Application", issued on Jan. 13, 2026, with English translation thereof, p. 1-p. 6.
"Office Action of Related U.S. Appl. No. 17/714,123", issued on Sep. 23, 2025, p. 1-p. 14.
"Office Action of Related U.S. Appl. No. 17/715,025", issued on Nov. 17, 2025, p. 1-p. 34.
"Office Action of Europe Related Application, Application No. 22169624.8", issued on Nov. 19, 2025, p. 1-p. 6.
"Notice of Reasons for Refusal of Japan Counterpart Application", issued on Nov. 11, 2025, with English translation thereof, p. 1-p. 11.
"Decision of Refusal of Japan Counterpart Application", issued on Jan. 27, 2026, with English translation thereof, p. 1-p. 3.
"Notice of Reasons for Refusal of Japan Counterpart Application, Application No. 2022-003296", issued on Oct. 14, 2025, with English translation thereof, p. 1-p. 8.
"Notice of Reasons for Refusal of Japan Counterpart Application, Application No. 2022-003355", issued on Oct. 14, 2025, with English translation thereof, p. 1-p. 7.
"Notice of Reasons for Refusal of Japan Counterpart Application, Application No. 2022-003295", issued on Oct. 14, 2025, with English translation thereof, p. 1-p. 6.
"Notice of Reasons for Refusal of Japan Counterpart Application, Application No. 2022-003404", issued on Oct. 21, 2025, with English translation thereof, p. 1-p. 8.
"Office Action of Related U.S. Appl. No. 17/714,123", issued on Jan. 12, 2026, p. 1-p. 10.
"Office Action of U.S. Related Application, U.S. Appl. No. 17/711,040", issued on Apr. 1, 2026, p. 1-p. 36.

* cited by examiner

IMAGE FORMING APPARATUS HAVING BOTH FRONT AND SIDE OPENING/CLOSING COVERINGS

CROSS-REFERENCE TO RELATED APPLICATIONS

This application is based on and claims priority under 35 USC 119 from Japanese Patent Application No. 2021-135289 filed Aug. 23, 2021, Japanese Patent Application No. 2021-135290 filed Aug. 23, 2021, Japanese Patent Application No. 2021-135489 filed Aug. 23, 2021, Japanese Patent Application No. 2021-135490 filed Aug. 23, 2021, Japanese Patent Application No. 2021-135491 filed Aug. 23, 2021, Japanese Patent Application No. 2021-135483 filed Aug. 23, 2021, Japanese Patent Application No. 2021-135487 filed Aug. 23, 2021, Japanese Patent Application No. 2021-135424 filed Aug. 23, 2021, and Japanese Patent Application No. 2022-003355 filed Jan. 12, 2022.

BACKGROUND

(i) Technical Field

The present disclosure relates to an image forming apparatus.

(ii) Related Art

Japanese Unexamined Patent Application Publication No. 11-278742 (paragraph 0014, FIG. 9) describes an image forming apparatus in which a paper feeding part is provided with a front door that opens toward a near side or opens laterally and has therein plural paper feeding trays in which sheets of paper can be stored and from which sheets of paper can be fed.

SUMMARY

Aspects of non-limiting embodiments of the present disclosure relate to an image forming apparatus that can reduce the number of dividing lines extending in an up-down direction created by coverings at least on an exterior of a medium storage part as compared with a case where the medium storage part is covered with plural coverings from one end to the other end in a left-right direction of the medium storage part.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: an apparatus body having an image forming part that forms an image on a recording medium and a medium storage part in which a recording medium to be supplied to the image forming part is stored; and a front opening/closing covering that is an openable and closable covering that covers at least a part of the image forming part and a part of the medium storage part on a front face of the apparatus body, wherein the front opening/closing covering is constituted by a single opening/closing covering that covers at least a range from one end to the other end in a left-right direction of the part of the medium storage part in a left-right direction of the apparatus body.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure are described below with reference to the drawings.

First Exemplary Embodiment

Figure 1:
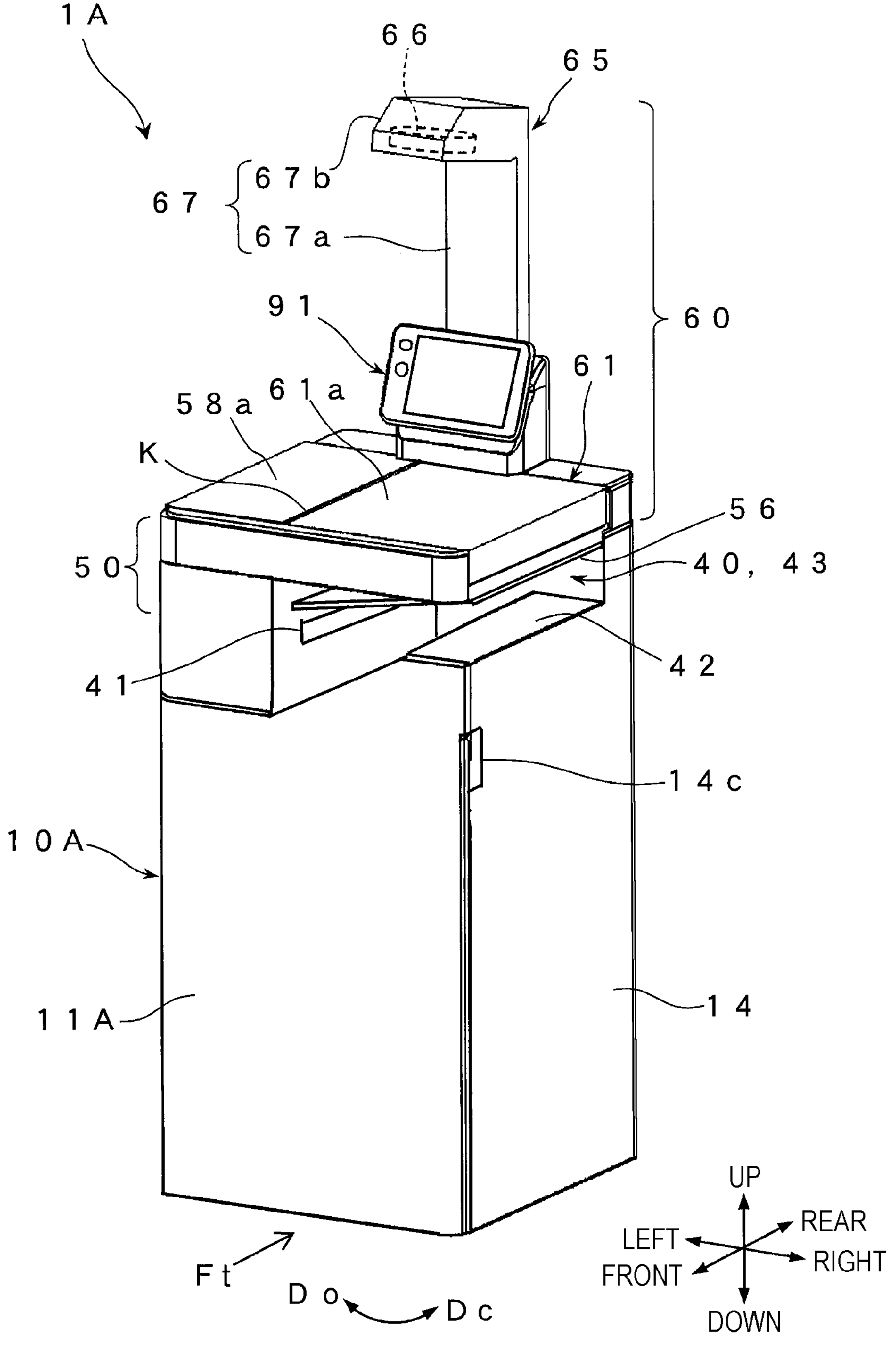
FIG. 1 is a perspective view of an image forming apparatus according to the first exemplary embodiment.
Figure 2:
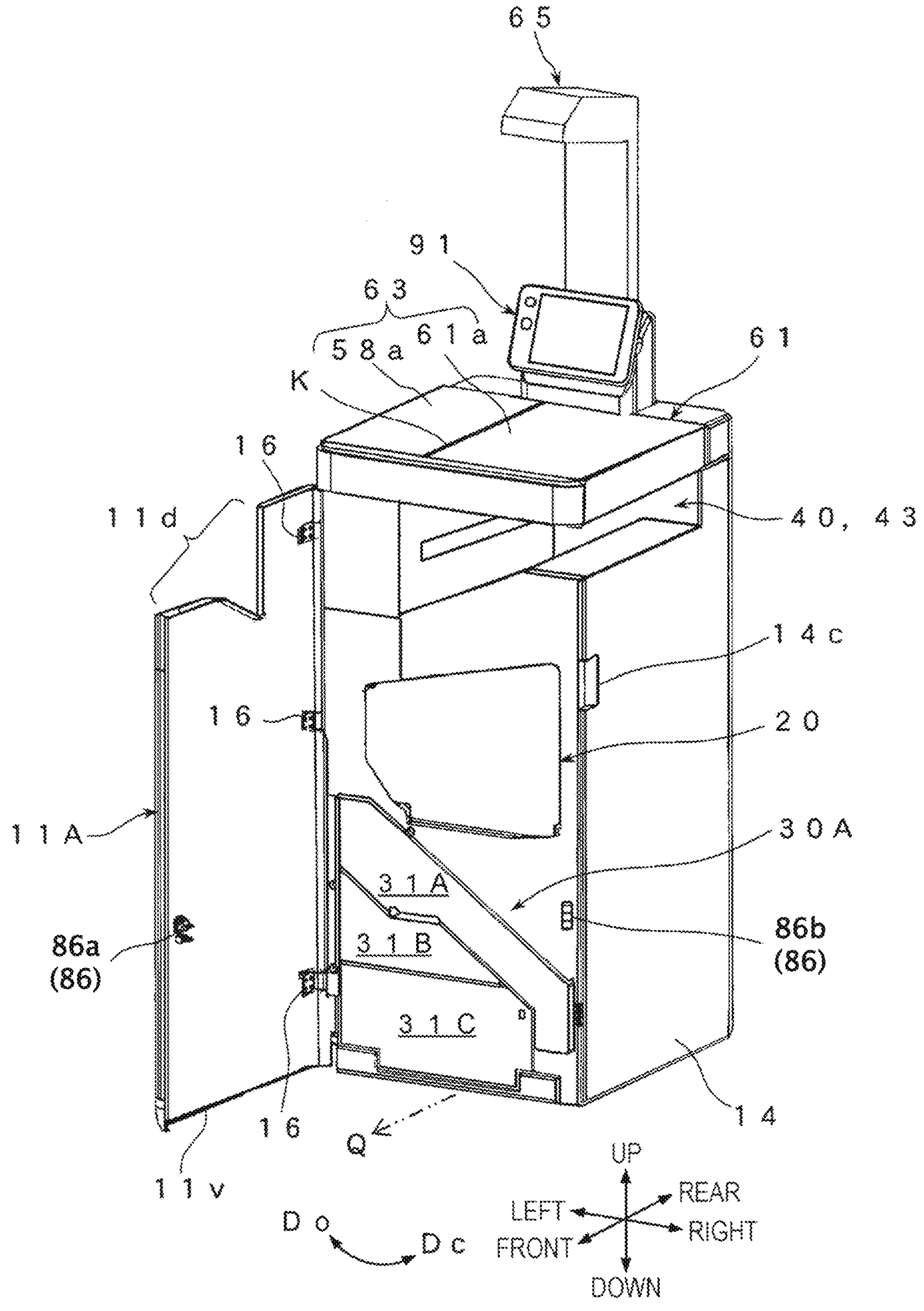
FIG. 2 is a perspective view illustrating a state where a front opening/closing covering of the image forming apparatus of FIG. 1 is opened.
Figure 3:
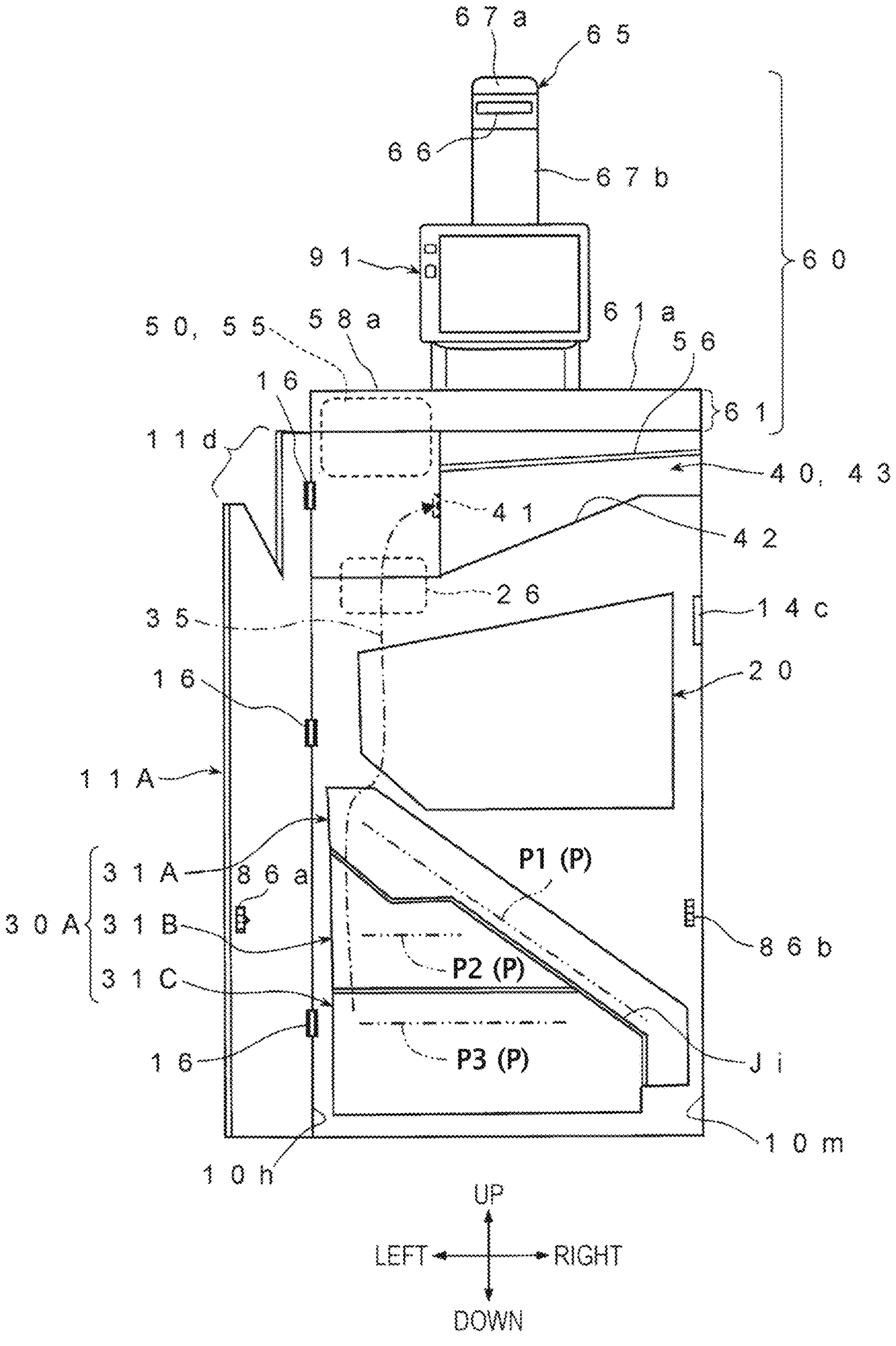
FIG. 3 is a front schematic view of the image forming apparatus of FIG. 2.

FIG. 1 is a perspective view illustrating an image forming apparatus 1A according to a first exemplary embodiment of the present disclosure diagonally viewed from a front side. FIG. 2 is a perspective view illustrating a state where a front opening/closing covering of the image forming apparatus 1A is opened. FIG. 3 is a front schematic view illustrating the state where the front opening/closing covering of the image forming apparatus 1A is opened.

The up, down, left, right, front, and rear directions indicated by the arrows in the drawings (see, for example, FIG. 1) are directions based on a front face Ft of the image forming apparatus 1A which a standing user faces when using the image forming apparatus 1A.

The image forming apparatus 1A according to the first exemplary embodiment includes a housing 10A having an image forming part 20, a medium storage part 30A, a medium discharge part 40, a document transporting reading part 50, and an external reading part 60, and a front opening/closing covering 11A that is openable and closable and covers a front face of the housing 10A, as illustrated in any one of FIGS. 1 to 3.

The housing 10A is an example of an apparatus body of the image forming apparatus 1A. The housing 10A is a structure that has an inner frame part and an outer exterior (exterior part) and has predetermined structure and shape made up of materials such as plural frames and exterior coverings.

As illustrated in FIG. 1, the housing 10A according to the first exemplary embodiment is a structure having an external shape of a rectangular parallelepiped that is long in the up-down direction.

The exterior part of the housing 10A is constituted by exterior coverings such as the front opening/closing covering 11A, a rear covering, a left side opening/closing covering 13, and a right side covering 14. The exterior coverings such as the rear covering and the right side covering 14 are unopenable coverings that are fixedly attached so as not to be opened and closed. Furthermore, the exterior coverings are non-transparent coverings (coverings that cannot be seen through from an outside) unless otherwise specified.

Details of the front opening/closing covering 11A and the left side opening/closing covering 13 will be described later.

Image Forming Part

The image forming part 20 is a part that has devices for forming an image on a recording medium P.

The image forming part 20 according to the first exemplary embodiment is constituted by an electrophotographic image forming device that forms a developer image finally on a recording medium P.

Figure 4A:
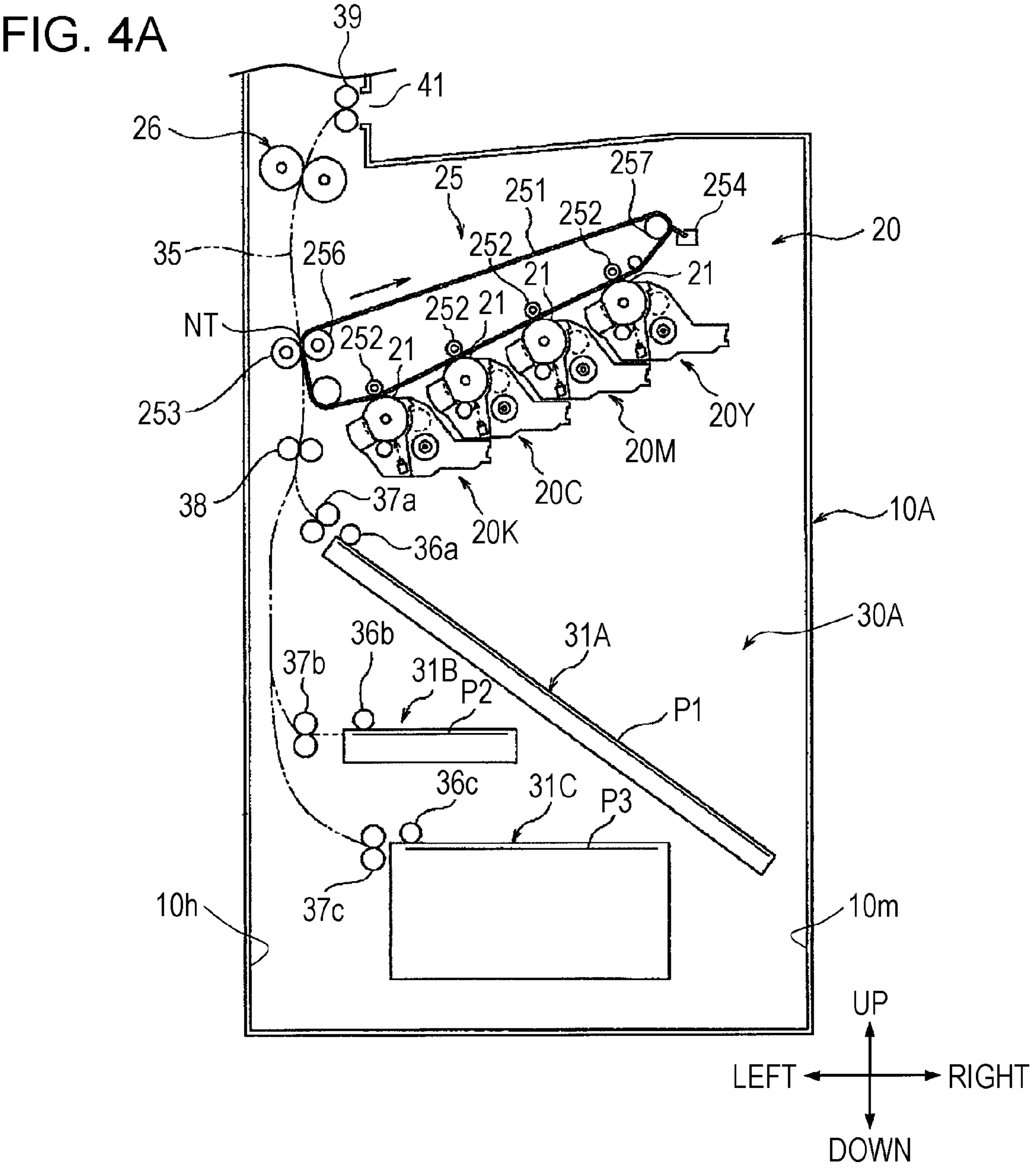
FIGS. 4A and 4B are schematic views of an inside of the image forming apparatus.

The image forming part 20 constituted by an electrophotographic image forming device includes image forming parts 20Y, 20M, 20C, and 20K of four colors (yellow (Y), magenta (M), cyan (C), and black (K)), as illustrated in FIG. 4A. In the following description, Y, M, C, and K attached to the reference signs are omitted in a case where there is no need to distinguish yellow (Y), magenta (M), cyan (C), and black (K).

Figure 4B:
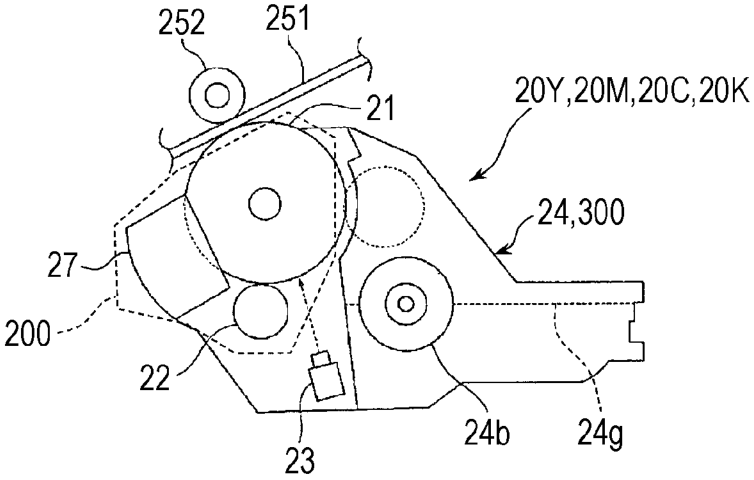

The image forming parts 20Y, 20M, 20C, and 20K basically have similar configurations except for used toner. Specifically, each of the image forming part 20Y, 20M, 20C, and 20K includes a cylindrical photoconductor drum 21 that rotates, which is an example of an image carrier, a charging device 22 that charges the photoconductor drum 21, an exposure device 23 that forms an electrostatic latent image by irradiating the charged photoconductor drum 21 with exposure light, a developing device 24 that develops the electrostatic latent image as a toner image by using a developer 24*g* containing toner, and a drum cleaning device 27, as illustrated in FIG. 4B.

With this configuration, the image forming parts 20Y, 20M, 20C, and 20K form images of the respective colors by using toner of the respective colors.

Furthermore, the image forming part 20 includes an intermediate transfer device 25 and a fixation device 26 disposed apart from the intermediate transfer device 25. Furthermore, the image forming part 20 also includes devices such as a developer supplying device and an image processing device (not illustrated).

As illustrated in FIG. 4A, the intermediate transfer device 25 includes an intermediate transfer belt 251 and first transfer rollers 252 that are disposed on a side opposite to the photoconductor drums 21 of the respective colors with the intermediate transfer belt 251 interposed therebetween and transfer toner images formed on the photoconductor drums 21 of the respective colors onto the intermediate transfer belt 251.

Furthermore, the intermediate transfer device 25 includes a support roller 256 around which the intermediate transfer belt 251 is wound and a driving roller 257 around which the intermediate transfer belt 251 is wound and that transmits rotary force to the intermediate transfer belt 251. With this configuration, the intermediate transfer belt 251 circulates in a direction indicated by the arrow in FIG. 4A.

Furthermore, the intermediate transfer device 25 includes a second transfer roller 253 that is disposed on a side opposite to the support roller 256 with the intermediate transfer belt 251 interposed therebetween and transfers, onto a recording medium P, toner images transferred onto the intermediate transfer belt 251 and a belt cleaning device 254 that cleans an outer circumferential surface of the intermediate transfer belt 251. A transfer nip NT at which toner images are transferred onto a recording medium P is provided between the second transfer roller 253 and the intermediate transfer belt 251.

In the image forming part 20, the photoconductor drums 21 of the respective colors are in contact with the circulating intermediate transfer belt 251 of the intermediate transfer device 25, as illustrated in FIG. 4A. The yellow (Y), magenta (M), cyan (C), and black (K) image forming parts 20Y, 20M, 20C, and 20K are arranged in this order from an upstream side in a direction in which the intermediate transfer belt 251 circulates.

In the image forming part 20, toner images are first-transferred onto the intermediate transfer belt 251 by the first transfer rollers 252 in an order of yellow (Y), magenta (M), cyan (C), and black (K). Meanwhile, the toner images are transferred from the intermediate transfer belt 251 onto a recording medium P transported between the intermediate transfer belt 251 and the second transfer roller 253 by the second transfer roller 253. Furthermore, the recording medium P onto which the toner images have been transferred is transported toward the fixation device 26.

As illustrated in FIG. 4A, the fixation device 26 is disposed on a downstream side relative to the transfer nip NT in a transport direction in which the recording medium P is transported. The fixation device 26 fixes, onto the recording medium P, toner images transferred onto the recording medium P by heating and pressing the toner images. The recording medium P on which an image has been formed by the fixation is finally discharged to the medium discharge part 40.

The image forming part 20 has a function of forming an image corresponding to image information input from an external device such as an information terminal connected to the image forming apparatus 1A, a function of forming an image corresponding to image information read from a document by the document transporting reading part 50, and a function of forming an image corresponding to image information read from a target by the external reading part 60.

Furthermore, the image forming part 20 is attached so that the image forming part 20 except for some members such as the exposure device 23 and the fixation device 26 can be drawn out from an inner side toward an outer side (a near side of the housing 10A) as indicated by arrow Q in FIG. 2 and thereby work such as inspection and repair can be performed in a state where the front opening/closing covering 11A is opened (see FIGS. 2 and 3).

Medium Storage Part

The medium storage part 30A is a part having a device for storing recording media P to be fed to the image forming part 20. The medium storage part 30A is disposed below the image forming part 20. The medium storage part 30A has three storage parts 31A, 31B, and 31C in which recording media P1, P2, and P3 are stored as the recording media P, respectively.

The recording media P are, for example, media such as sheet-shaped plain paper, coat paper, or cardboards having a predetermined size.

In the medium storage part 30A, a required recording medium P (P1, P2, or P3) is fed from any one of the storage parts 31A, 31B, and 31C toward the image forming part 20 in accordance with a transfer operation in the image forming part 20.

The storage parts 31A, 31B, and 31C are arranged in this order from an upper side to a lower side.

A maximum size of the recording medium P2 that can be stored in the storage part 31B is smaller than a maximum size of the recording medium P1 that can be stored in the storage part 31A. A maximum size of the recording medium P3 that can be stored in the storage part 31C is smaller than the maximum size of the recording medium P1 that can be stored in the storage part 31A and is larger than the maximum size of the recording medium P2 that can be stored in the storage part 31B.

The maximum size of the recording medium P1 that can be stored in the storage part 31A is an example of a first size, the maximum size of the recording medium P2 that can be stored in the storage part 31B is an example of a second size, and the maximum size of the recording medium P3 that can be stored in the storage part 31C is an example of a third size.

In the first exemplary embodiment, the storage part 31A mainly stores therein the recording media P1 of an A3 size, and the A3 size is the maximum size of the recording medium P1 that can be stored in the storage part 31A. The storage part 31B mainly stores therein the recording media P2 of a postcard size, and the postcard size is the maximum size of the recording medium P2 that can be stored in the storage part 31B. The storage part 31C mainly stores therein the recording media P3 of an A4 size, and the A4 size is the maximum size of the recording medium P3 that can be stored in the storage part 31C.

Accordingly, as for lengths of the stored recording media P in the front-rear direction, a length of the recording media P1 stored in the storage part 31A is longest, a length of the recording media P2 stored in the storage part 31B is second longest, and a length of the recording media P3 stored in the storage part 31C is third longest. A length of recording media P in the front-rear direction is a length of the recording media P in a direction in which the recording media P are fed to a medium transport path 35, which will be described later.

The topmost storage part 31A is a storage part that can store and feed the recording media P1 whose length in the transport direction is longer than a width of the housing 10A.

The number of recording media P3 that can be stored in the storage part 31C is larger than the number of recording media P1 that can be stored in the storage part 31A and the number of recording media P2 that can be stored in the storage part 31B.

In the present exemplary embodiment, the storage part 31A can store therein 200 recording media P1, the storage part 31B can store therein 100 recording media P2, and the storage part 31C can store therein 1000 recording media P3.

Accordingly, as for a total thickness of stored recording media P in a thickness direction, a total thickness of the recording media P3 stored in the storage part 31C is largest, a total thickness of the recording media P1 stored in the storage part 31A is second largest, and a total thickness of the recording media P2 stored in the storage part 31B is third largest. That is, the total thickness of the recording media P stored in the storage part 31B is smallest.

In the image forming apparatus 1A, A4 size recording media P are consumed the most. That is, the number of recording media P that can be stored in the storage part 31C that stores therein the recording media P3, which are consumed the most, is set larger than the number of recording media P that can be stored in the storage part 31A and the number of recording media P that can be stored in the storage part 31B.

Transport Part

The image forming apparatus 1A includes the medium transport path 35 along which a recording medium P is mainly transported from the medium storage part 30A (the storage part 31A, 31B, or 31C thereof) to a discharge opening 41 of the medium discharge part 40 through a part of the image forming part 20. The part of the image forming part 20 is the transfer nip NT at which toner images are transferred onto the recording medium P.

The medium transport path 35 includes feeding rollers 36*a*, 36*b*, and 36*c* for feeding the recording media P1, P2, and P3 stored in the storage parts 31A, 31B, and 31C, respectively to the medium transport path 35 and prevention rollers 37*a*, 37*b*, and 37*c* that prevent multi feed of the recording media P1, P2, and P3 fed by the feeding rollers 36*a*, 36*b*, and 36*c*, respectively.

Furthermore, the medium transport path 35 includes an adjustment roller 38 that is disposed on a downstream side relative to the prevention rollers 37*a*, 37*b*, and 37*c* in the transport direction in which a recording medium P is transported and adjusts a timing at which the recording medium P is fed to the transfer nip NT.

Furthermore, the medium transport path 35 includes a discharge roller 39 that discharges a recording medium P onto which toner images have been fixed by the fixation device 26 to the medium discharge part 40.

In addition, the medium transport path 35 includes plural other transport roller pairs and transport guide members (not illustrated).

Storage Part 31A

The storage part 31A is a topmost storage part. The topmost oblique storage part 31A is a storage part disposed closest to the image forming part 20. Furthermore, the topmost oblique storage part 31A is a storage part that can store and supply the recording media P1 whose length in the transport direction is longer than the width of the housing 10A.

Figure 5:
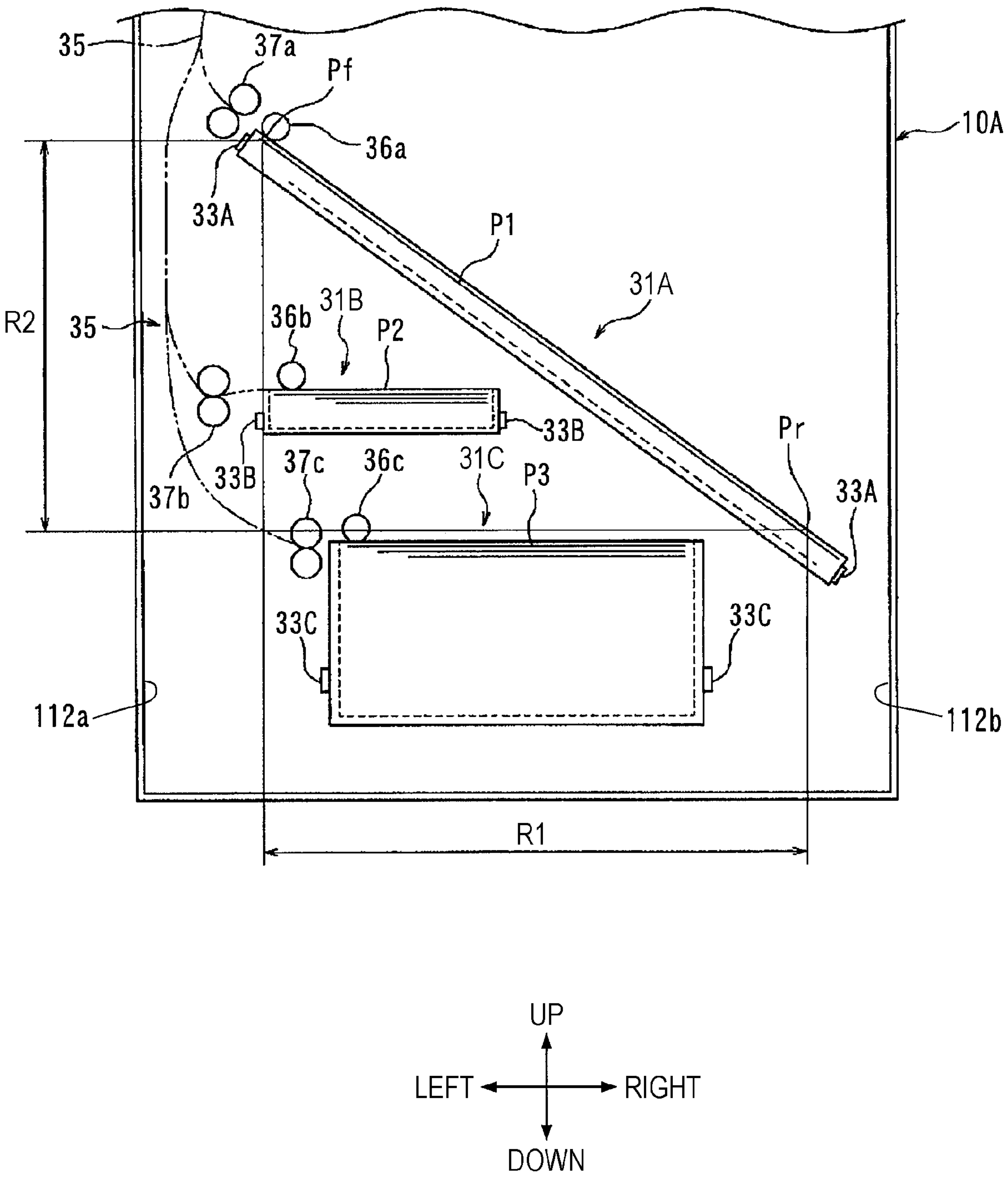
FIG. 5 is an enlarged front schematic view of a medium storage part of the image forming apparatus.

As illustrated in FIG. 5 and other drawings, the storage part 31A includes a storage body part 32 having a box shape opened on an upper side, and both ends of the storage body part 32 in the left-right direction (apparatus width direction) are attached to the housing 10A (apparatus body) by a pair of slide rails 33A.

The slide rails 33A each includes an outer member, an intermediate member, and an inner member, and the outer member is attached to the housing 10A, and the inner member is attached to the storage body part 32A of the storage part 31A. This allows the storage part 31A to move in a direction from a front side toward a rear side (apparatus depth direction) with respect to the housing 10A.

Furthermore, as illustrated in FIGS. 2 to 5 and other drawings, the storage part 31A, when mounted in the housing 10A, is inclined with respect to a horizontal direction so that one end (a left end portion in FIGS. 2 to 5 and other drawings) and the other end thereof in the apparatus width direction are located at different positions in the up-down direction when viewed from the apparatus depth direction (viewed from the front face Ft).

Specifically, the storage part 31A is inclined with respect to the horizontal direction so that the one end in the apparatus width direction is located at a position higher than the other end when viewed from the apparatus depth direction and is configured as an oblique storage part disposed so as to descend from an upper left to a lower right when viewed from the front face of the housing 10A. The one end and the other end are parts of the storage part 31A and are one and the other of two points farthest from each other in the apparatus width direction when viewed from the front face Ft. In other words, the one end of the storage part 31A is a downstream-side end portion of the storage part 31A, and the other end of the storage part 31A is an upstream-side end portion of the storage part 31A. The upstream-side end portion and the downstream-side end portion of the storage part 31A are portions where a plane on which the recording media P stored in the storage part 31A are disposed and the storage part 31A cross each other. Note that the recording media P1 are stored in the storage part 31A in a posture such that medium surfaces of the recording media P1 are parallel with a bottom plate of the storage part 31A.

In the first exemplary embodiment, the storage part 31A is inclined with respect to the horizontal direction so that front edges Pf of the recording media P1 stored in the storage part 31A are located higher than rear edges Pr of the recording media P1, as illustrated in FIG. 5 and other drawings. The front edges Pf of the recording media P1 are edges on a side where the recording media P1 are transported to the medium transport path 35, and the rear edges Pr of the recording media P1 are edges opposite to the front edges Pf.

In the image forming apparatus 1A, the recording media P1 stored in the storage part 31A can be transported to the medium transport path 35 in a state where the storage part 31A is mounted in the housing 10A. In other words, the storage part 31A mounted in the housing 10A is located at a first transport position at which the stored recording media P1 can be transported from the storage part 31A.

Meanwhile, when a user draws out the storage part 31A mounted in the housing 10A toward a near side (front side) in the apparatus depth direction, the storage part 31A is guided by the slide rails 33A and stops by hitting a stopper (not illustrated). In this way, the storage part 31A is pulled out from the housing 10A. When the user pushes the storage part 31A pulled out from the housing 10A toward a far side (rear side) in the apparatus depth direction, the storage part 31A is guided by the slide rails 33A and is mounted in the housing 10A. The state where the storage part 31A is pulled out from the housing 10A is a state where the recording media P1 can be put into the storage part 31A.

In the first exemplary embodiment, the state where the storage part 31A is pulled out from the housing 10A is a state where the storage part 31A is not detached from the housing 10A and is supported by the housing 10A and the recording media P1 can be put into the storage part 31A.

In the state where the storage part 31A is pulled out from the housing 10A, the storage part 31A is inclined with respect to the horizontal direction so that the one end and the other end thereof in the apparatus width direction are located in different positions in the up-down direction when viewed from the apparatus depth direction. Specifically, the storage part 31A pulled out from the housing 10A overlaps the storage part 31A mounted in the housing 10A when viewed from the apparatus depth direction (front side). In other words, the storage part 31A pulled out from the housing 10A is disposed within the apparatus width of the housing 10A when viewed from the apparatus depth direction.

In the state where the storage part 31A is pulled out from the housing 10A, the storage part 31A is opened on an upper side, so that the recording media P1 can be supplied to the storage part 31A. In other words, the storage part 31A pulled out from the housing 10A is located at a first supply position where the recording media P1 can be supplied to the storage part 31A.

Figure 6:
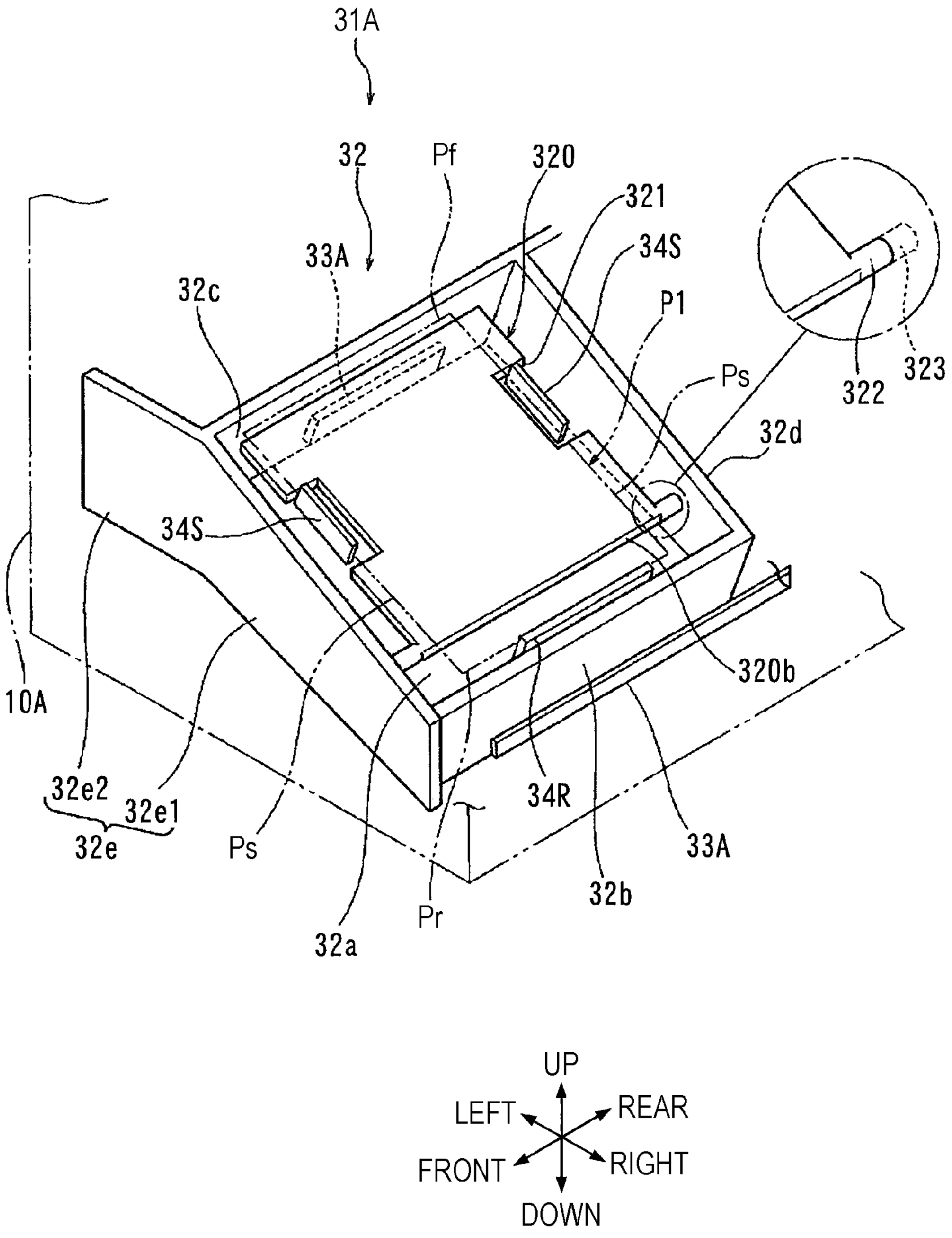
FIG. 6 is a perspective view of an oblique storage part of the medium storage part.

As illustrated in FIG. 6, the storage part 31A includes the storage body part 32 and a rear edge regulating part 34R that regulates a position of the rear edges Pr of the recording media P1 by making contact with the rear edges Pr of the stored recording media P1. Furthermore, the storage part 31A includes a pair of side edge regulating parts 34S that regulate positions of side edges Ps of the recording media P1 by making contact with the side edges Ps of the recording media P1 and a support part 320 that supports the stored recording media P1 from a lower side.

As illustrated in FIG. 6, the storage body part 32 has a box shape opened on an upper side.

Furthermore, the storage body part 32 has a bottom plate 32*a* that faces a rear surface of the stored recording media P1 in a thickness direction of the recording media P1 (hereinafter referred to as a "medium thickness direction") and a rear wall 32*b* that faces the rear edges Pr of the recording media P1 in a transport front-rear direction of the recording media P1 (hereinafter referred to as a "medium front-rear direction"). Furthermore, the storage body part 32 has a front wall 32*c* that faces the front edges Pf of the stored recording media P1 in the transport front-rear direction and a pair of side walls 32*d* and 32*e* that face the side edges Ps of the recording media P1 in a width direction of the recording media P1 (hereinafter referred to as a "medium width direction").

The pair of side walls 32*d* and 32*e* are a side wall 32*d* on a far side in the apparatus depth direction and a side wall 32*e* on a near side in the apparatus depth direction. The side wall 32*d* has a rectangular shape extending from the rear wall 32*b* to the front wall 32*c* when viewed from the apparatus depth direction. Meanwhile, the side wall 32*e* has a base part 32*e*1 having a rectangular shape extending from the rear wall 32*b* to the front wall 32*c* when viewed from the apparatus depth direction and an extending part 32*e*2 extending from the base part 32*e*1 toward one side in the apparatus width direction.

In the image forming apparatus 1A, an inclined contour line J of the storage part 31A forms an inclined dividing line Lc that divides the storage part 31A and the housing 10A between the side wall 32*d* and the housing 10A in the state where the storage part 31A is mounted in the housing 10A, as illustrated in FIG. 3.

As illustrated in FIG. 6, the rear edge regulating part 34R is disposed inside the storage body part 32 and is attached to the bottom plate 32*a* of the storage body part 32. The rear edge regulating part 34R is movable in the medium front-rear direction within a decided range by being guided by a pair of slits (not illustrated) formed in the bottom plate 32*a* and extending in the medium front-rear direction. Furthermore, movement of the rear edge regulating part 34R is restricted by a lock mechanism (not illustrated). The rear edge regulating part 34R regulates a position of the rear edges Pr of the recording media P1 by making contact with the rear edges Pr of the recording media P1 stored in the storage part 31A in the medium front-rear direction.

As illustrated in FIG. 6, the side edge regulating parts 34S are disposed inside the storage body part 32 and are attached to the bottom plate 32*a* of the storage body part 32. Furthermore, the side edge regulating parts 34S are disposed on both sides of the recording media P1 in the medium width direction, respectively. The pair of side edge regulating part 34S are symmetrical in the medium width direction.

The side edge regulating parts 34S are movable in the medium width direction within a decided range by being guided by a pair of slits (not illustrated) formed in the bottom plate 32*a* and extending in the medium width direction. The side edge regulating parts 34S that are being moved stop at the spot due to frictional force generated between the side edge regulating parts 34S and the bottom plate 32*a*.

The storage part 31A employs a center register system. Accordingly, the storage part 31A includes a mechanism (not illustrated) that, when one side edge regulating part 34S is moved in the medium width direction, moves the other side edge regulating part 34S by a similar amount in the medium width direction.

The pair of side edge regulating parts 34S regulate positions of the side edges Ps of the recording media P1 by making contact with the side edges Ps of the recording media P1 stored in the storage part 31A in the medium width direction.

As illustrated in FIG. 6, the support part 320 is disposed inside the storage body part 32.

The support part 320 is formed from a sheet metal, and is symmetrical in the medium width direction when viewed from the medium thickness direction and has a rectangular shape cut out at two positions.

Specifically, the support part 320 has U-shaped cutouts 321 for avoiding interference with the moving side edge regulating parts 34S. A position of a rear edge 320*b* of the support part 320 is decided so that interference with the moving rear edge regulating part 34R is avoided.

Furthermore, both end portions of the rear edge 320*b* of the support part 320 are provided with a shaft part 322 protruding in the medium width direction. The shaft parts 322 are inserted into through-holes (not illustrated) formed in the side walls 32*d* and 32*e* of the storage part 31A. This allows the support part 320 to rotate about the shaft parts 322 so that a front end portion of the support part 320 moves up and down.

Figure 7A:
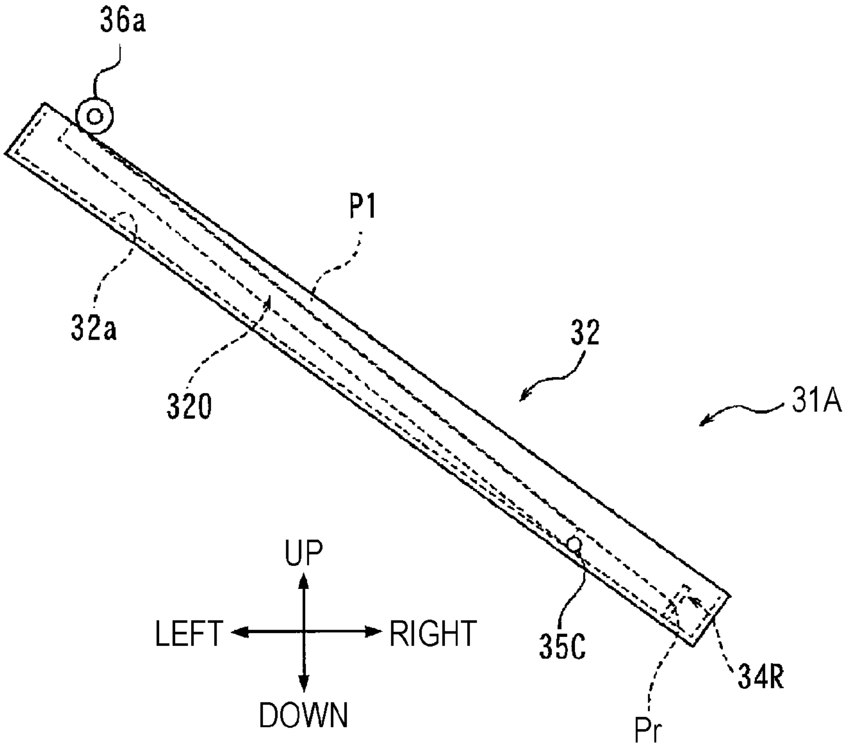
FIG. 7A is a front schematic view illustrating a state where the oblique storage part is mounted.

In the state where the storage part 31A is mounted in the housing 10A (FIGS. 4 and 5), the front end portion of the support part 320 is biased upward by a biasing member (not illustrated) provided in the housing 10A and thereby the whole support part 320 rotates about the shaft parts 322, as illustrated in FIG. 7. This causes the front edges Pf of the recording media P1 supported by the support part 320 to make contact with the feeding roller 36*a*.

Figure 7B:
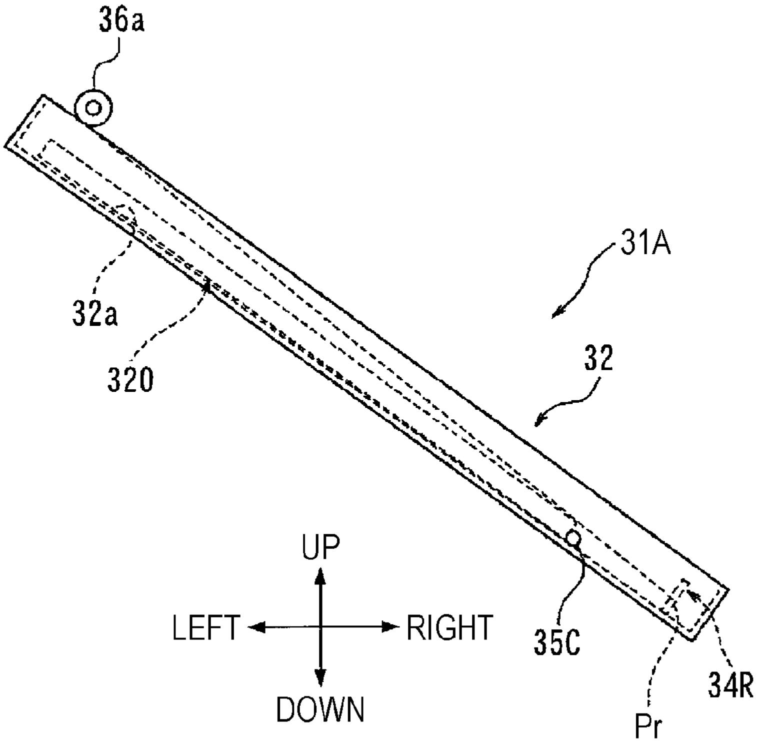
FIG. 7B is a front schematic view illustrating a state where the oblique storage part has been pulled out (drawn out)

In the state where the storage part 31A is pulled out from the housing 10A (see FIGS. 4 and 5), biasing force given to the front end portion of the support part 320 by the biasing member is released, and the support part 320 makes contact with the bottom plate 32*a* of the storage body part 32, as illustrated in FIG. 7B. Note that also in the state where the storage part 31A is pulled out from the housing 10A, the storage part 31A is inclined with respect to the horizontal direction, as in the state where the storage part 31A is mounted in the housing 10A. The state where the storage part 31A is pulled out from the housing 10A is a state where the storage parts is drawn out from the apparatus body and the recording media P1 can be supplied to the storage part 31A, as described above.

Storage Part 31B

Next, the storage part 31B is a middle storage part configured as a small-sized storage part disposed in a gap between the topmost oblique storage part 31A and the lowermost storage part 31C.

As illustrated in FIG. 5, the storage part 31B includes a storage body part having a box shape opened on an upper side, and both ends thereof in the left-right direction (apparatus width direction) are attached to the housing 10A by a pair of slide rails 33B.

The slide rails 33B each includes an outer member, an intermediate member, and an inner member, and the outer member is attached to the housing 10A, and the inner member is attached to the storage part 31B. This allows the storage part 31B to move in the apparatus depth direction with respect to the housing 10A.

When the storage part 31B is drawn out toward the near side in the apparatus depth direction from the housing 10A by a user, the storage part 31B is guided by the slide rails 33B and is pulled from the housing 10A. When the storage part 31B is pushed into the housing 10A toward a far side in the apparatus depth direction by the user, the storage part 31B is guided by the slide rails 33B and is mounted in the housing 10A.

As illustrated in FIG. 5, the storage part 31B is disposed horizontally when viewed from the apparatus depth direction in the state where the storage part 31B is mounted in the housing 10A and the state where the housing 10A is pulled out from the housing 10A. In the first exemplary embodiment, the state where the storage part 31B is disposed horizontally, for example, permits some inclination that does not cause the recording media P2 stored in the storage part 31B to move, as long as the storage part 31B is disposed along the horizontal direction.

The storage part 31B mounted in the housing 10A is located at a second transport position at which the stored recording media P2 can be transported. The storage part 31B pulled out from the housing 10A is located at a second supply position at which the recording media P2 can be supplied to the storage part 31B.

The storage part 31B mounted in the housing 10A is drawn out from the housing 10A toward the near side in the apparatus depth direction irrespective of a position of the storage part 31A.

Furthermore, the recording media P2 of the maximum size stored in the storage part 31B are disposed within a range (R1 in FIG. 5) in which the recording media P1 of the maximum size stored in the storage part 31A are disposed in the apparatus width direction when viewed from the apparatus depth direction, as illustrated in FIG. 5.

Furthermore, the recording media P2 of the maximum size stored in the storage part 31B are disposed within a range (R2 in FIG. 5) in which the recording media P1 of the maximum size stored in the storage part 31A are disposed in the apparatus up-down direction when viewed from the apparatus depth direction.

Storage Part 31C

Next, the storage part 31C is a lowermost storage part configured as a general storage part disposed in an almost horizontal state parallel with the left-right direction when viewed from the front face of the housing 10A. The lowermost storage part 31C is a storage part that can store and supply the recording media P3 whose length in the transport direction is slightly shorter than the width of the housing 10A.

As illustrated in FIG. 5, the storage part 31C includes a storage body part having a box shape opened on an upper side, and both ends thereof in the left-right direction (apparatus width direction) are attached to the housing 10A by a pair of slide rails 33C.

The slide rails 33C each includes an outer member, an intermediate member, and an inner member, and the outer member is attached to the housing 10A, and the inner member is attached to the storage part 31C. This allows the storage part 31C to move in the apparatus depth direction with respect to the housing 10A.

When the storage part 31C is drawn out toward the near side in the apparatus depth direction from the housing 10A by a user, the storage part 31C is guided by the slide rails 33C and is pulled from the housing 10A. When the storage part 31C is pushed into the housing 10A toward a far side in the apparatus depth direction by the user, the storage part 31C is guided by the slide rails 33C and is mounted in the housing 10A.

As illustrated in FIG. 5, the storage part 31C is disposed horizontally when viewed from the apparatus depth direction in the state where the storage part 31C is mounted in the housing 10A and the state where the storage part 31C is pulled out from the housing 10A. In the first exemplary embodiment, the state where the storage part 31C is disposed horizontally, for example, permits some inclination that does not cause the recording media P3 stored in the storage part 31C to move, as long as the storage part 31C is disposed along the horizontal direction.

The storage part 31C mounted in the housing 10A is located at a third transport position at which the stored recording media P3 can be transported. The storage part 31C pulled out from the housing 10A is located at a third supply position at which the recording media P3 can be supplied to the storage part 31C.

The storage part 31C mounted in the housing 10A is drawn out from the housing 10A toward the near side in the apparatus depth direction irrespective of a position of the storage part 31A.

Furthermore, the recording media P3 of the maximum size stored in the storage part 31C are disposed within the range R1 in which the recording media P1 of the maximum size stored in the storage part 31A are disposed in the apparatus width direction when viewed from the apparatus depth direction, as illustrated in FIG. 5.

Furthermore, each of the storage body parts of the storage parts 31A, 31B, and 31C includes, on a front face side thereof, an inner covering having a contour according to a shape of the front face side of the storage part.

Each of the storage body parts of the storage parts 31A, 31B, and 31C is attached so that work such as work of storing the recording media P (P1, P2, or P3) can be performed by drawing the storage part from an inner side toward an outer side of the housing 10A (toward an outside on a near side of the housing 10A) as indicated by arrow Q in FIG. 2 in a state where the front opening/closing covering 11A is opened (see FIGS. 2 and 3).

Medium Discharge Part

The medium discharge part 40 is a part to which a recording medium P on which an image has been formed by the image forming part 20 is discharged. The medium discharge part 40 is provided above the image forming part 20. The medium discharge part 40 is provided as a storage space 43 present on an upper right side on the front face Ft of the housing 10A. The storage space 43 is a space opened to an outside through a front opening and a right side opening continuous with the front opening in the housing 10A.

The medium discharge part 40 has the discharge opening 41 from which a recording medium P is discharged in a left inner wall surface of the storage space 43 and has, on a bottom surface of the storage space 43, a stacking surface 42 on which the recording medium P discharged from the discharge opening 41 is stacked and is stored. The stacking surface 42 is, for example, a surface inclined upward as a distance increases rightward from the discharge opening 41, that is, a rightwardly increasing surface.

Document Transporting Reading Part

The document transporting reading part 50 is a constituent part that reads a document image on a transported sheet-shaped document G (see FIGS. 9 and 10).

As illustrated in FIG. 3, the document transporting reading part 50 is disposed above the image forming part 20.

The document transporting reading part 50 has a document platen 51 on which a document G to be read is placed, a reader part 55 that reads a document image on the document G, a document discharge part 56 to which the document G that has been read is discharged, a transport mechanism 57 that transports the document G on the document platen 51 so that the document G passes the reader part 55 and is then discharged to the document discharge part 56, and a covering part 58 that covers the reader part 55 and the transport mechanism 57.

The document platen 51 is a structural part having a placing surface on which the document G is placed.

Figure 8A:
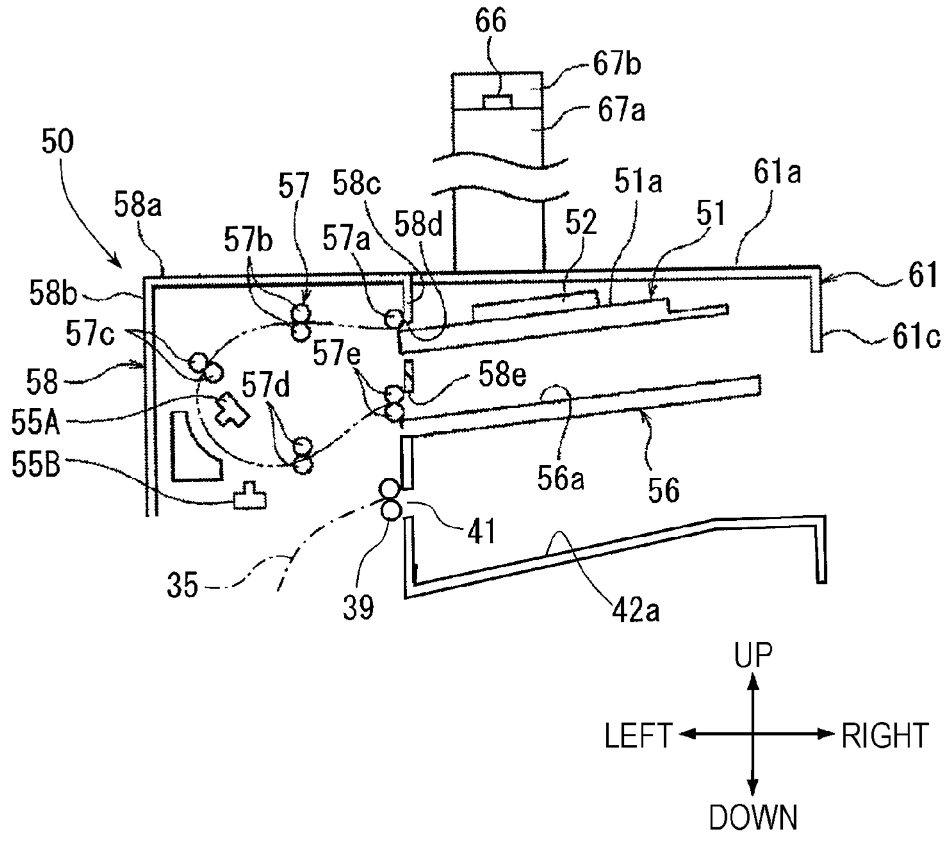
FIG. 8A is a front schematic view of members such as a document transporting reading part in the image forming apparatus.
Figure 9A:
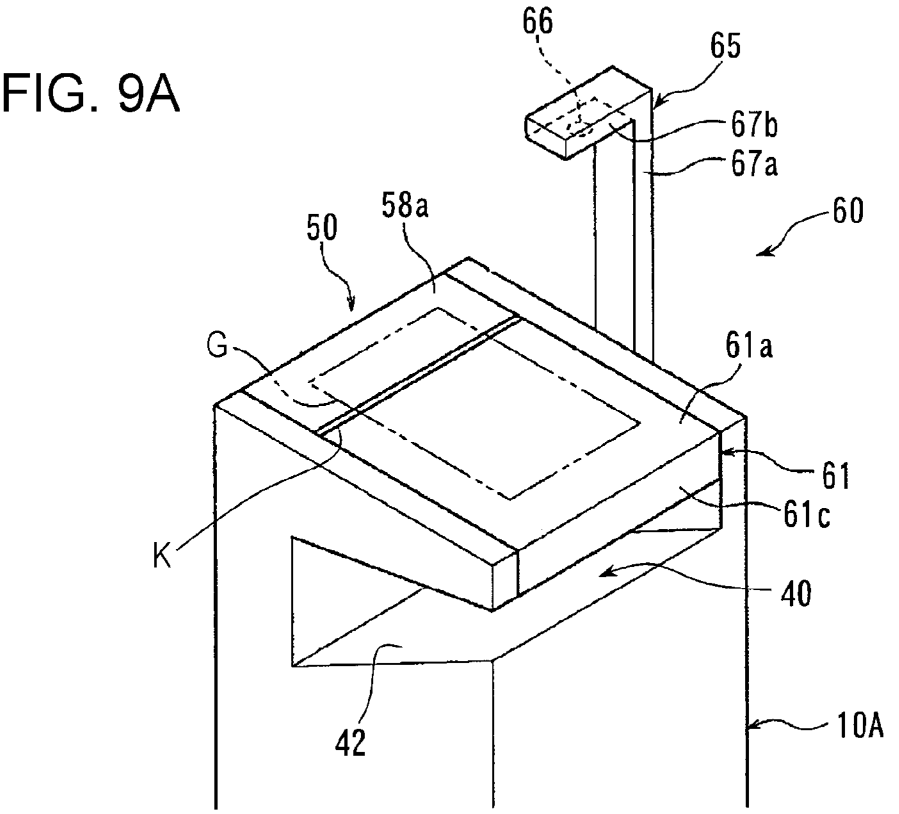
FIG. 9A is a perspective view of members such as the document placing surface in a state where the table part of the external reading part is located at a covering position.

The document platen 51 is disposed below a table part 61 (described later) of the external reading part 60. Accordingly, the document platen 51 is covered with the table part 61 of the external reading part 60 as illustrated in FIGS. 8A and 9A and other drawings when the document transporting reading part 50 is not used. Meanwhile, when the document transporting reading part 50 is used, the table part 61 of the external reading part 60 is moved to an open position, and as a result, the document platen 51 becomes continuous with an upper surface of the table part 61, and the placing surface on which a document G is placed is expanded rightward, as illustrated in FIGS. 9B and 10B and other drawings.

In the first exemplary embodiment, the “document platen” means something on which a document G is placed. The “platen” does not specify a shape.

The document platen 51 in the first exemplary embodiment is disposed on a right side relative to the reader part 55 and has a plate shape extending rightward. An upper surface 51*a* of the document platen 51 is the placing surface on which a document G is placed. The upper surface 51*a* of the document platen 51 is an inclined surface rising toward a right side from a document receiving opening 58*d* of the covering part 58.

Figure 9B:
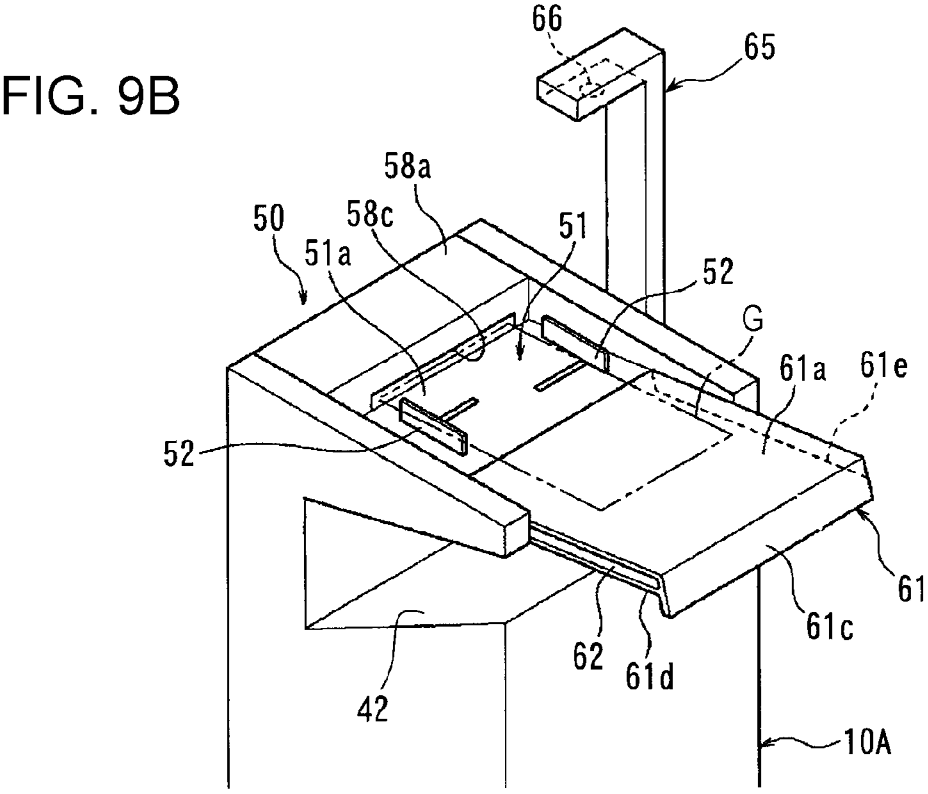
FIG. 9B is a perspective view of members such as the document placing surface in a state where the table part is located at an open position.

The document platen 51 is provided with side edge regulating parts 52 (side guides), as illustrated in FIGS. 8A and 9B and other drawings. The side edge regulating parts 52 restrict movement of a document G placed on the document platen 51 toward one side and the other side in the apparatus depth direction by making contact with side ends of the document G.

The reader part 55 includes a first reading sensor 55A that reads a document image on one surface of a transported document G and a second reading sensor 55B that reads a document image on the other surface of the transported document G. The first reading sensor 55A and the second reading sensor 55B are, for example, contact type image sensors called contact image sensors (CIS).

The document discharge part 56 is a part that has a storage surface on which a document G whose document image has been read by the reader part 55 and that has been discharged is stored.

The document discharge part 56 is disposed below the document platen 51.

Furthermore, the document discharge part 56 has a plate shape extending rightward from a document discharge opening 58*e* of the covering part 58. An upper surface 56*a* of the document discharge part 56 is the storage surface on which a document G is stored. The upper surface 56*a* of the document discharge part 56 is an inclined surface rising rightward from the document discharge opening 58*e* of the covering part 58.

As illustrated in FIG. 8A, the covering part 58 has a top plate 58*a* and side plates 58*b* and 58*c*.

Figure 10A:
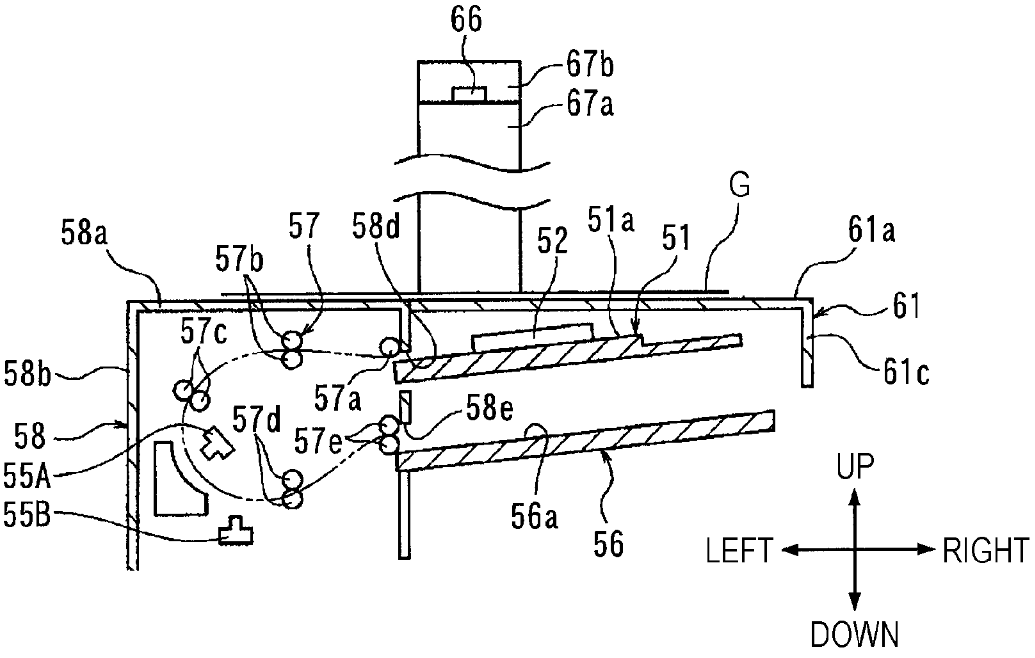
FIG. 10A is a schematic cross-sectional view of members such as the document placing surface in a state where the table part is located at the covering position.
Figure 10B:
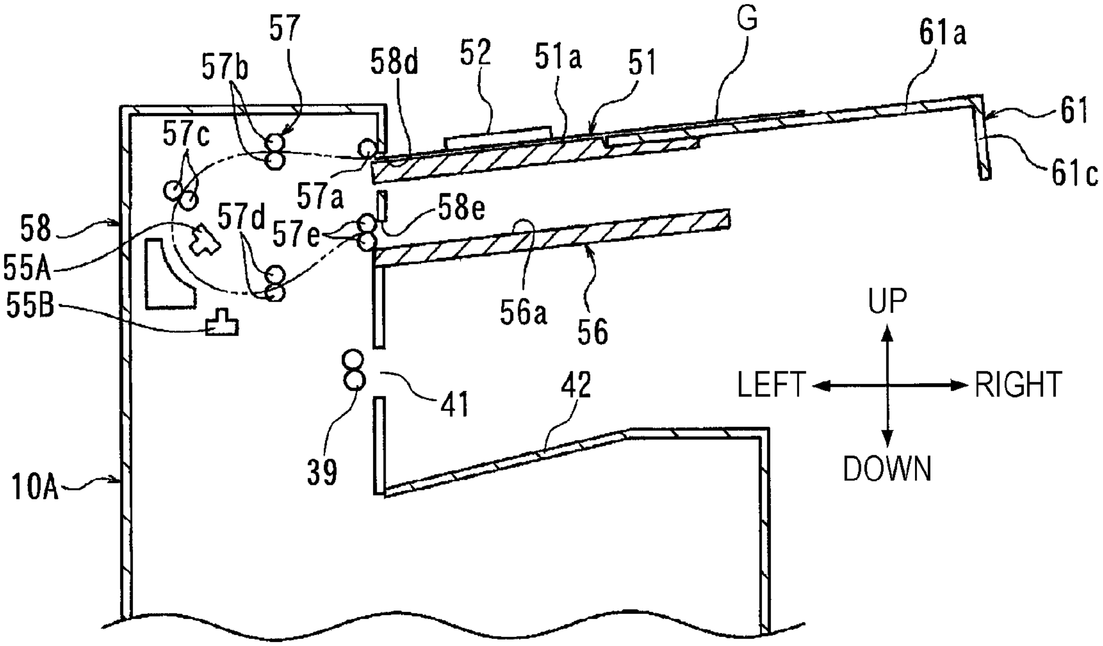
FIG. 10B is a schematic cross-sectional view of members such as the document placing surface in a state where the table part is located at the open position.

The top plate 58*a* is disposed above the reader part 55 and covers the reader part 55 from above. As illustrated in FIGS. 9A and 10A, the top plate 58*a* also constitutes a part of the table part 61 (described later) of the external reading part 60, and a part of a target to be read such as a document G to be read by the external reading part 60 is placed on the top plate 58*a*.

The side plate 58*b* is disposed on one side (left side in FIG. 8A) relative to the reader part 55 in the apparatus width direction and covers the reader part 55 from the one side in the apparatus width direction. The side plate 58*c* is disposed on the other side (right side in FIG. 8A) relative to the reader part 55 in the apparatus width direction and covers the reader part 55 from the other side in the apparatus width direction.

The side plate 58*c* has the document receiving opening 58*d* through which a document G placed on the document platen 51 is introduced into an inside of the covering part 58. The document receiving opening 58*d* is an opening extending in the apparatus depth direction. Below the document receiving opening 58*d* of the side plate 58*c*, the document discharge opening 58*e* through which a document G is discharged from the inside of the covering part 58 to the document discharge part 56 is provided. The document discharge opening 58*e* is an opening extending in the apparatus depth direction.

The transport mechanism 57 is disposed inside the covering part 58. In other words, the transport mechanism 57 is covered with the covering part 58.

The transport mechanism 57 includes plural transport members 57*a* to 57*e* such as transport rollers and a guide member (not illustrated) that guides a document G in the transport direction. In the transport mechanism 57, a document G placed on the document platen 51 is transported from the document receiving opening 58*d* to the document discharge opening 58*e* (finally to the document discharge part 56) along a C-shaped transport path by the transport members 57*a* to 57*e*.

In the document transporting reading part 50, the transport mechanism 57 transports a document G from the document platen 51 to the document discharge part 56, and one or both of the first reading sensor 55A and the second reading sensor 55B of the reader part 55 reads a document image on one surface or both front and rear surfaces of the document G transported by the transport mechanism 57.

External Reading Part

The external reading part 60 is a reading part that reads a target to be read outside (above) the housing 10A. As illustrated in FIG. 1 and other drawings, the external reading part 60 includes the table part 61 serving as a placing part on which a target to be read is placed and a reader part 65 that reads the target to be read placed on the table part 61.

Table Part

The table part 61 is a plate shaped member having the upper surface 61*a* serving as a flat placing surface on which a target to be read can be placed still. The table part 61 is attached to an upper end of the housing 10A so that the upper surface 61*a* becomes an uppermost surface of the housing 10A.

The target to be read may be any object that can be placed on the table part 61 and can be read by the reader part 65 from above the table part 61. Examples of the target to be read include not only a sheet-shaped document G on which image information is recorded, but also three-dimensional objects such as a book, a magazine, food, and a plant.

The table part 61 is set at the same height as the top plate 58*a* of the covering part 58 of the document transporting reading part 50. That is, the upper surface 61*a* of the table part 61 is flush with the upper surface of the top plate 58*a*. Furthermore, the table part 61 covers the upper surface 51*a* of the document platen 51 of the document transporting reading part 50 from above.

Figure 21:
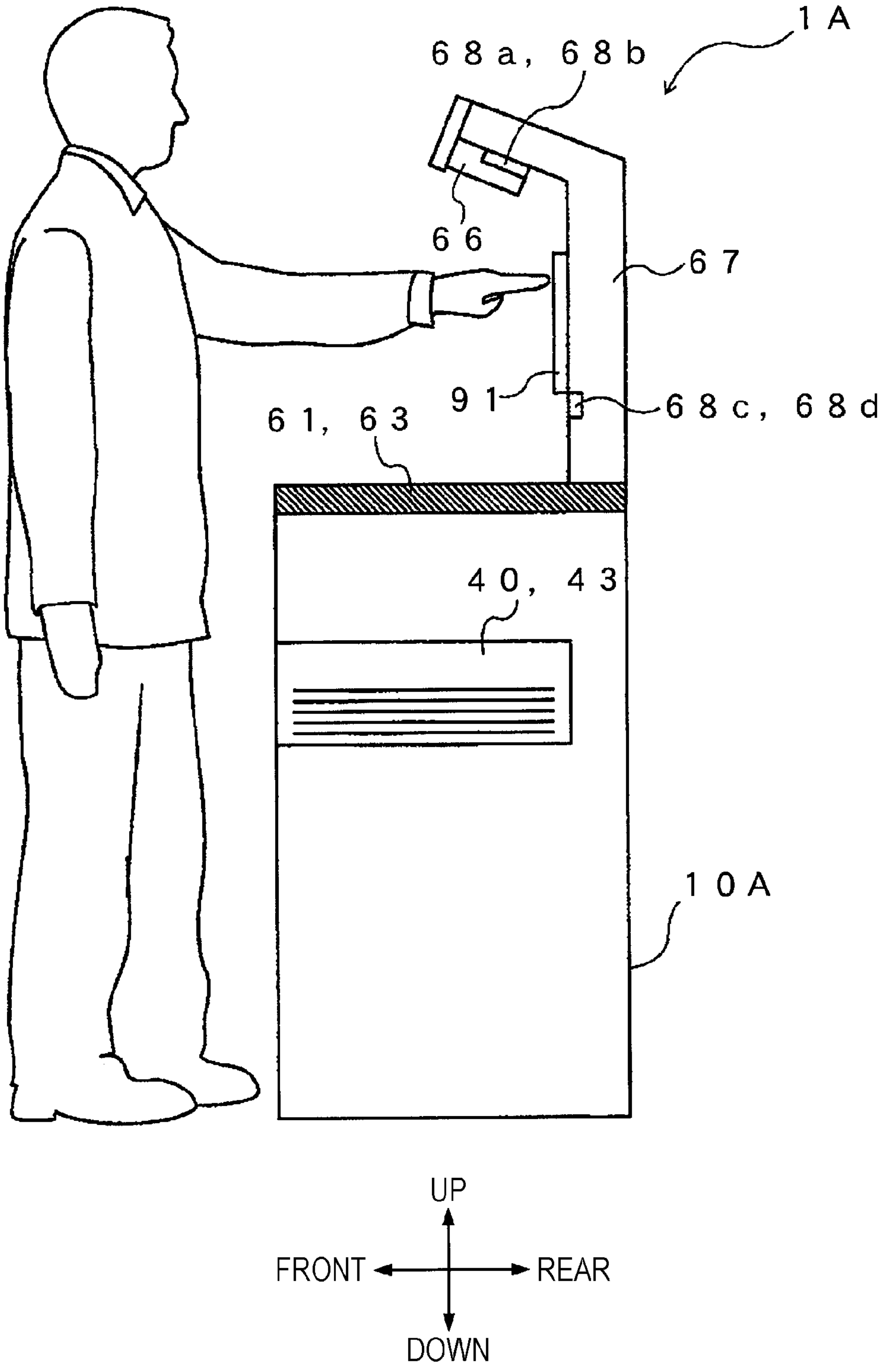
FIG. 21 is a schematic side view illustrating a state where a user is operating the image forming apparatus of FIG. 1.

The table part 61 is provided at a height at which a standing user operating the image forming apparatus 1A can perform an operation of placing a target to be read such as a document G (see FIG. 21). Specifically, the table part 61 is, for example, provided at a height of approximately 1000 mm from a floor surface on which the image forming apparatus 1A is installed.

Figure 8B:
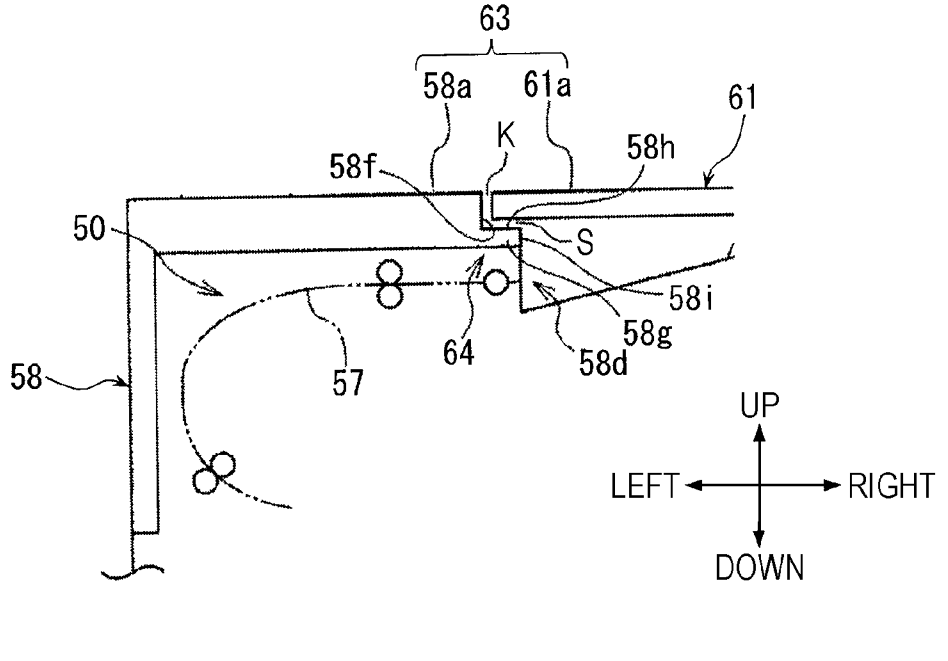
FIG. 8B is a front schematic view of members such as a document placing surface of an external reading part of the image forming apparatus.

Specifically, the table part 61 has a top plate 61*b* having the upper surface 61*a* and side plates 61*c*, 61*d*, and 61*e*, as illustrated in FIGS. 8A and 8B and 9B and other drawings.

Figure 11A:
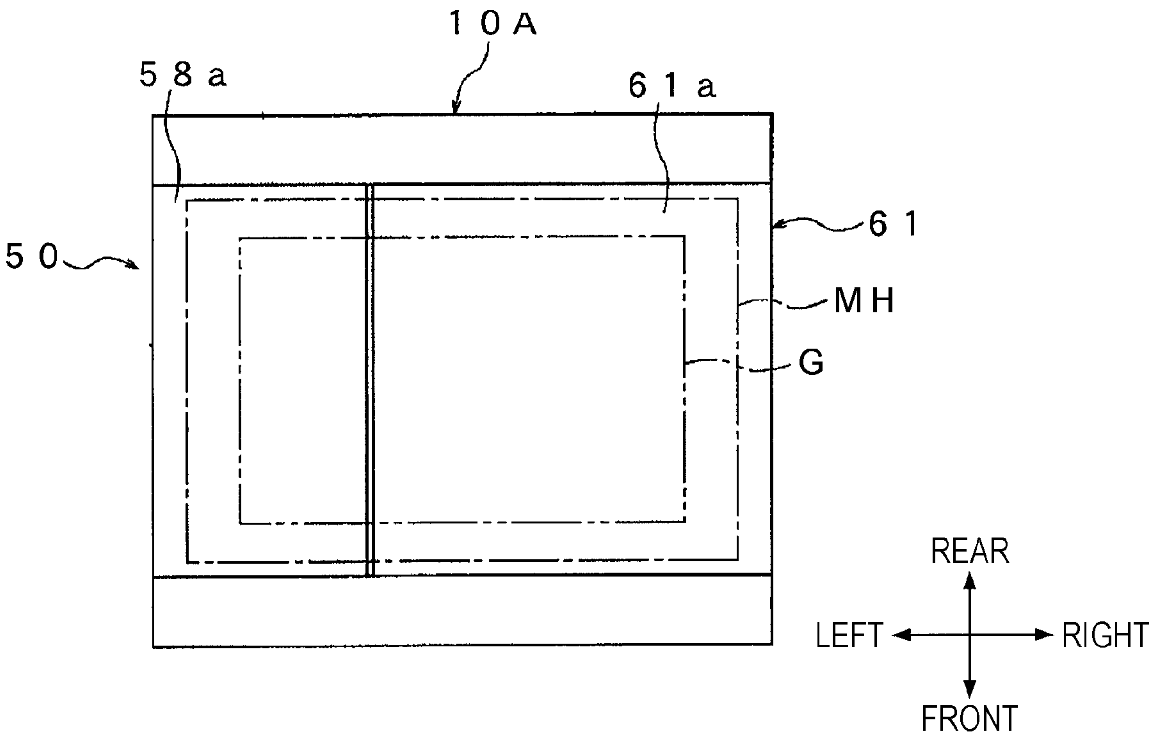
FIG. 11A is a schematic plan view of members such as the document placing surface in a state where the table part is located at the covering position.
Figure 11B:
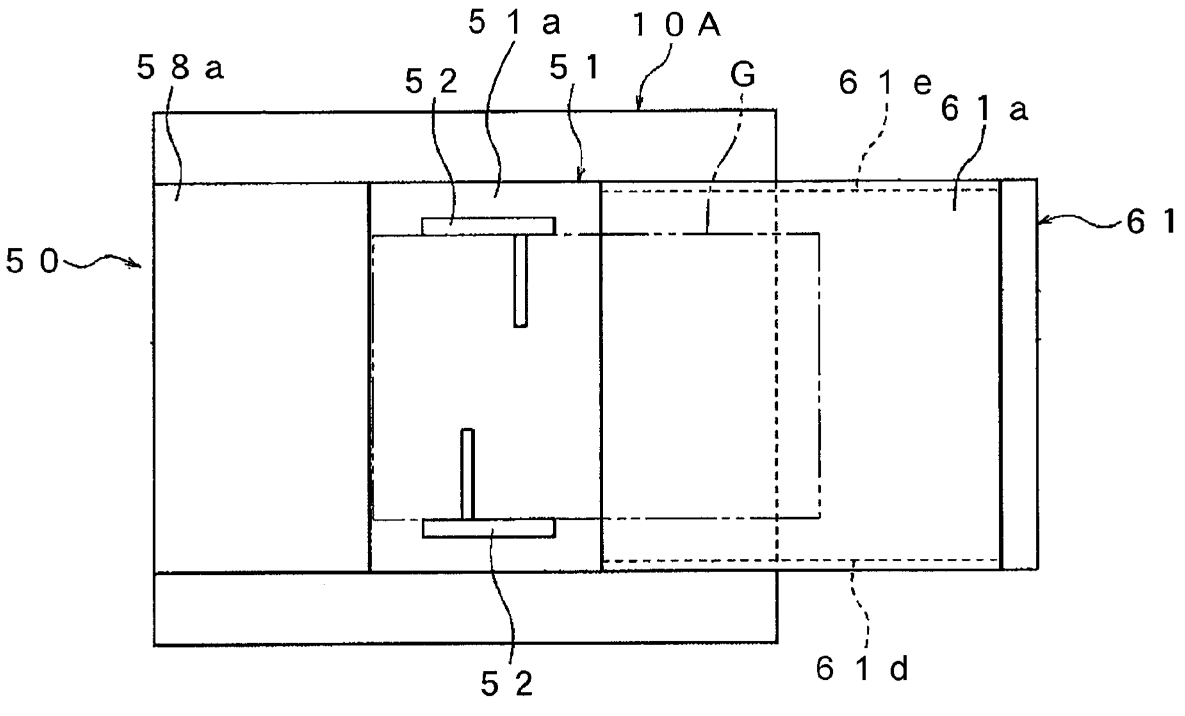
FIG. 11B is a schematic plan view of members such as the document placing surface in a state where the table part is located at the open position.

The top plate 61*b* of the table part 61 has a plate shape whose plate thickness direction is the up-down direction as illustrated in FIGS. 8A and 10A and has a substantially rectangular shape in plan view as illustrated in FIG. 11A. On the table part 61, a document G, which is an example of a target to be read, is placed on the upper surface 61*a* of the top plate 61*b*, as illustrated in FIGS. 9A and 10A and other drawings.

A dimension in the apparatus width direction and a dimension in the apparatus depth direction of the top plate 61*b* are set larger than a dimension in the apparatus width direction and a dimension in the apparatus depth direction of the document platen 51.

The side plate 61*c* of the table part 61 projects downward from a right end portion of the top plate 61*b*. The side plate 61*c* has a plate shape whose plate thickness direction is the apparatus width direction. The side plate 61*c* is disposed on a right side relative to the document platen 51 and covers the document platen 51 from a right side.

The side plates 61*d* and 61*e* of the table part 61 project downward from a front end portion and a rear end portion of the top plate 61*b* (see FIG. 9B), respectively. The side plates 61*d* and 61*e* have a plate shape whose plate thickness direction is the apparatus depth direction. The side plates 61*d* and 61*e* are provided on a front side and a rear side relative to the document platen 51 and cover the document platen 51 from the front side and the rear side, respectively.

Furthermore, the table part 61 is movable between a covering position (a position illustrated in FIGS. 10A and 12A and other drawings) at which the document platen 51 is covered with the table part 61 from above and an open position (a position illustrated in FIGS. 10B and 12B and other drawings) at which an upper side relative to the document platen 51 is opened.

Figure 12A:
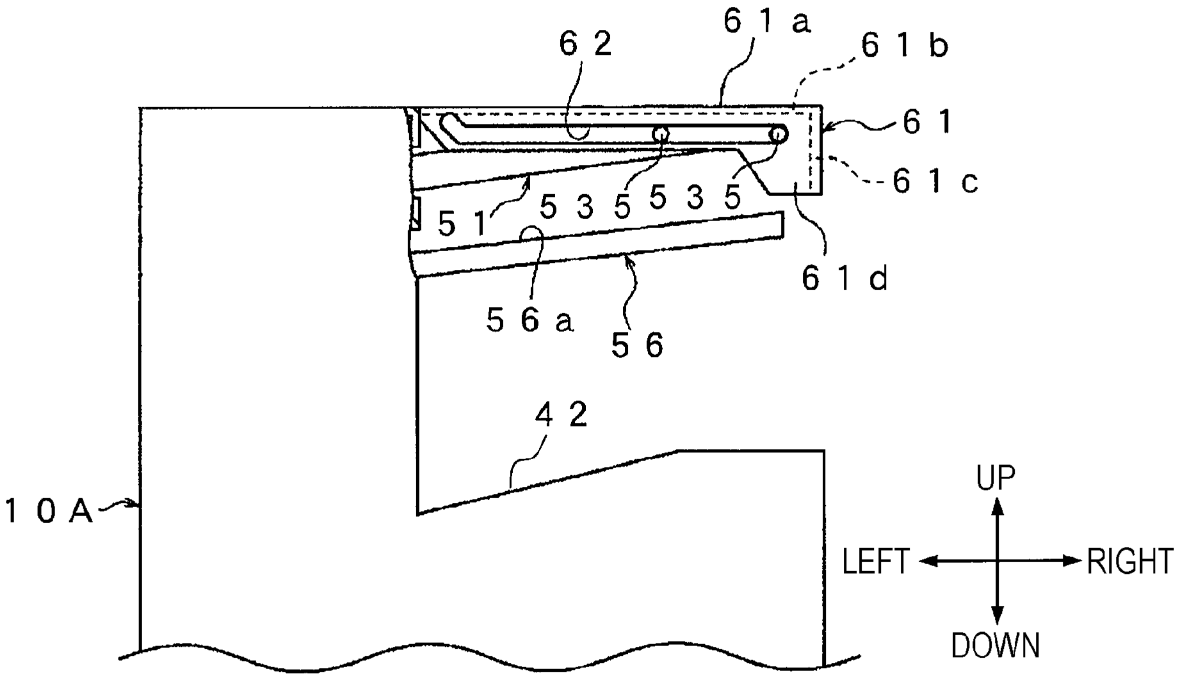
FIG. 12A is a schematic view of the table part and a moving mechanism at the covering position.
Figure 12B:
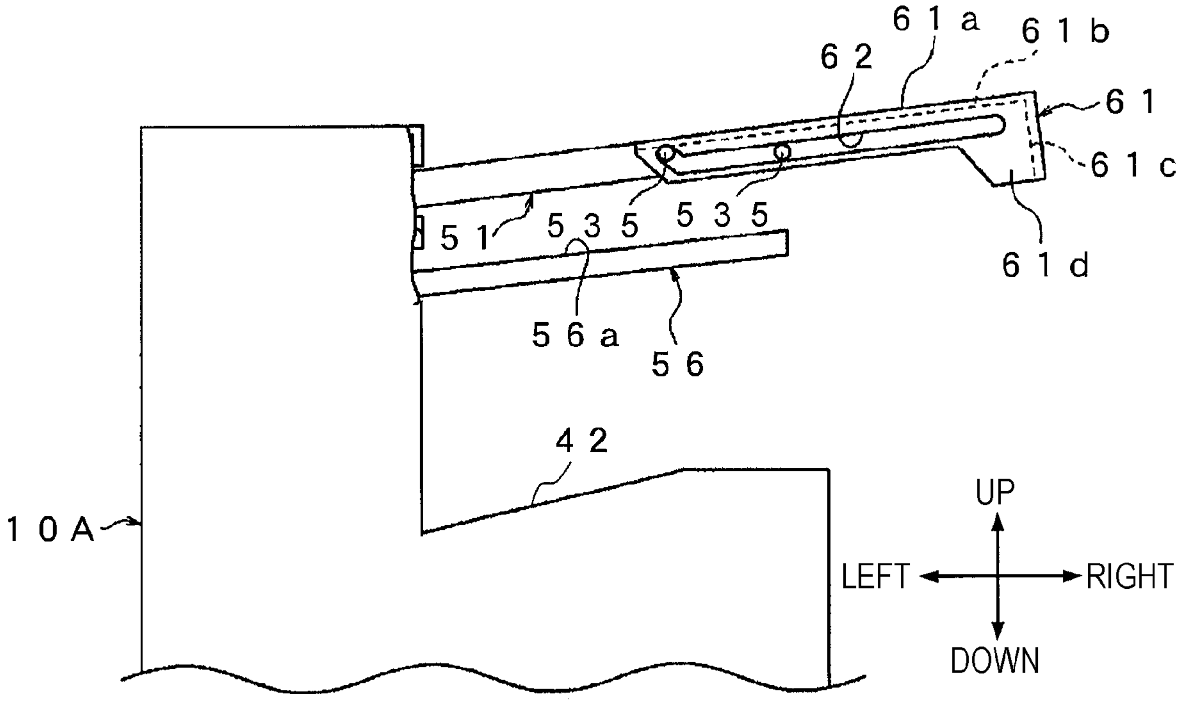
FIG. 12B is a schematic view of the table part and the moving mechanism at the open position.

In the first exemplary embodiment, the table part 61 is supported by the housing 10A serving as a support so as to be movable between the covering position and the open position. Specifically, the side plates 61*d* and 61*e* of the table part 61 are provided with a rail 62 provided as a long hole extending along the left-right direction, as illustrated in FIGS. 12A and 12B. Shaft parts 535 provided on a front surface and a rear surface of the document platen 51 are inserted into the rails 62.

With this configuration, the shaft parts 535 are guided between the covering position (the position illustrated in FIG. 12A) and the open position (the position illustrated in FIG. 12B) by the rails 62, and thereby the table part 61 moves along the apparatus width direction between the covering position and the open position.

The table part 61 at the open position is disposed on a side opposite to the reader part 55 (i.e., on a right side) relative to the document platen 51, as illustrated in FIGS. 8A and 8B and 10A and 10B and other drawings. On the table part 61 located at the open position, a part of a document G placed on the document platen 51 is placed, as illustrated in FIGS. 9B and 10B and other drawings.

As described above, in the external reading part 60, a moving mechanism for moving the table part 61 is constituted by members such as the rails 62 and the shaft parts 535. The moving mechanism is not limited to the above configuration and can be constituted by various mechanical elements. As described above, the table part 61 has a function as a covering that covers the document platen 51 of the document transporting reading part 50. That is, the table part 61 also serves as a covering that covers the document platen 51. Since the table part 61 functions as a covering, the table part 61 may be grasped as a covering (covering member) for the document platen 51.

Reader Part

The reader part 65 is constituted by components such as a reading device 66 (see FIG. 3) that can optically read a target to be read placed on the table part 61 and a member 67 that supports the reading device 65*a*.

The reader part 65 according to the first exemplary embodiment is attached in such a posture that the reading device 66 is supported by the support part 67 so as to be raised upward by a predetermined length from a rear end side of the table part 61 and can read a target on the table part 61.

The support part 67 has a support pillar part 67*a* that extends upward from the housing 10A on a rear side relative to the table part 61 and an attachment part 67*b* that is bent from an upper end portion of the support pillar part 67*a* so as to extend toward a front side. The reading device 66 is attached to the attachment part 67*b*. Accordingly, the reading device 66 is provided above the table part 61.

The reading device 66 is, for example, a camera combining an imaging element such as a Charge Coupled Device (CCD) or a Complementary Metal Oxide Semiconductor (CMOS) that converts light into an electric signal and an optical element such as a lens. Such a camera used as the reading device 66 is sometimes called a document camera.

The camera used as the reading device 66 faces downward so as to be able to read a target to be read such as a document G placed on the upper surface 61*a* of the table part 61. An optical axis of the camera extends, for example, along the up-down direction when viewed from the front side.

As illustrated in FIG. 11A, the reading device 66 has a reading range MH that straddles the document transporting reading part 50 and the table part 61. The top surface of the top plate 58*a* of the covering part 58 of the document transporting reading part 50 and the upper surface 61*a* of the table part 61 are flat at least in the reading range MH of the reading device 66. In the first exemplary embodiment, the whole top surface of the top plate 58*a* and the whole upper surface 61*a* of the table part 61 are flat.

The "flat" as used herein means being flat to such an extent that a sheet-shaped document G can be supported in a posture suitable for reading by the reading device 66 and permits unevenness formed to such an extent that a document G can be supported in a posture suitable for reading by the reading device 66. The posture of the document G suitable for reading is a flat and smooth posture and is at least a posture having smaller warpage than a case where a sheet-shaped document G (specifically, plain paper) is placed so as to straddle the top surface of the top plate 58*a* and the upper surface 61*a* of the table part 61.

Note that it is desirable that the top surface of the top plate 58*a* of the covering part 58 of the document transporting reading part 50 and the upper surface 61*a* of the table part 61 are perpendicular to the optical axis of the reading device 66. In the image forming apparatus 1A, an angle of the top surface of the top plate 58*a* and the upper surface 61*a* of the table part 61 with respect to a direction perpendicular to the optical axis of the reading device 66 is at least smaller than an angle of the upper surface 51*a* of the document platen 51 of the document transporting reading part 50 with respect to the direction perpendicular to the optical axis of the reading device 66 when viewed from the front side.

Furthermore, the external reading part 60 includes a lighting device 68 that illuminates a target to be read placed on the table part 61 during reading.

Figure 13A:
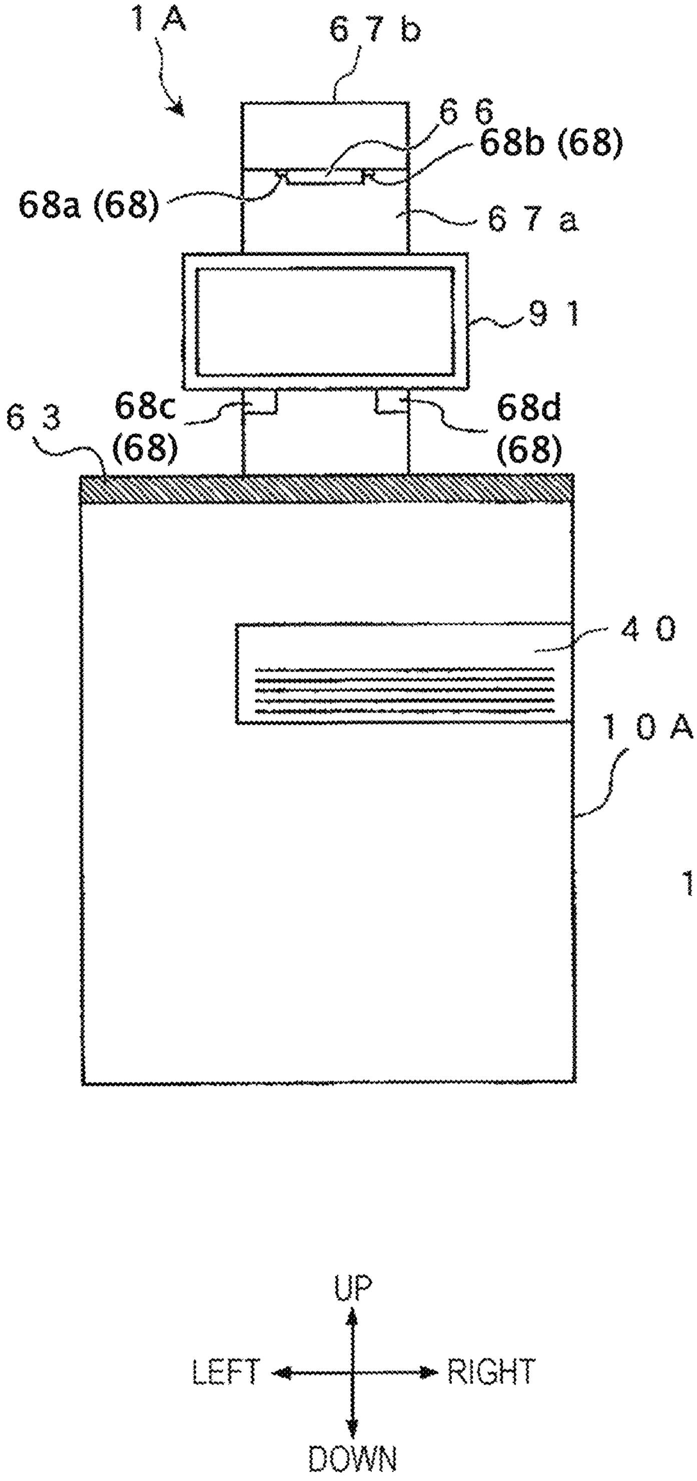
FIG. 13A is a front schematic view illustrating a way in which a lighting device is disposed in the image forming apparatus.
Figure 13B:
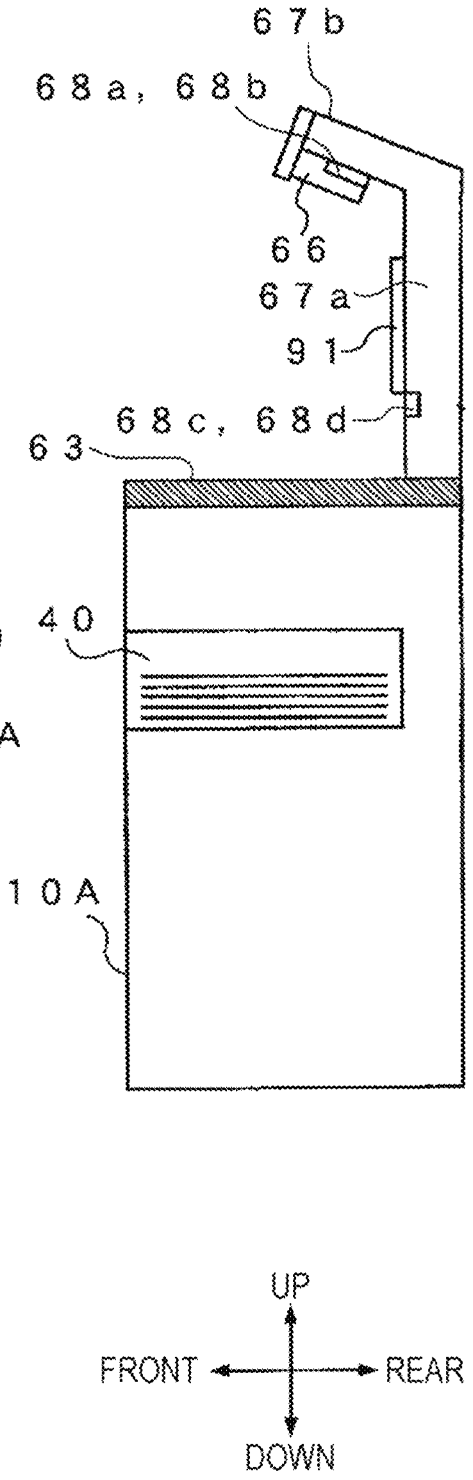
FIG. 13B is a left side schematic view illustrating the way in which a lighting device is disposed.

The lighting device 68 includes one or more light sources. For example, the lighting device 68 includes light sources 68*a*, 68*b*, 68*c*, and 68*d*, as schematically illustrated in FIG. 13. The light sources 68*a*, 68*b*, 68*c*, and 68*d* are provided on the support pillar part 67*a* of the support part 67. That is, the light sources 68*a*, 68*b*, 68*c*, and 68*d* are provided above the table part 61.

Specifically, the light sources 68*a* and 68*b* are provided close to the reading device 66 on left and right sides of the reading device 66 of the attachment part 67*b* of the support part 67, respectively so as to face downward. The light sources 68*c* and 68*d* are provided close to an operation panel 91 at end portions on left and right sides of the support pillar part 67*a*, respectively at a lower end of the operation panel 91, which will be described later, so as to face obliquely downward.

As described above, the light sources 68*a* and 68*b* and the light sources 68*c* and 68*d* are disposed at different heights from the table part 61. That is, the light sources 68*a*, 68*b*, 68*c*, and 68*d* are disposed so as to illuminate a subject (i.e., a target to be read) at different angles, that is, so as to irradiate the subject with light from different directions. With this configuration, the external reading part 60 can distinguish the subject and the table part 61 (the upper surface 61*a*) with more certainty.

Furthermore, in the image forming apparatus 1A, the operation panel 91 for operating the image forming apparatus 1A is provided on a base and front side of the support pillar part 67*a* of the support part 67 that supports the reader part 65, as illustrated in FIG. 1 and other drawings.

The operation panel 91 is separated upward from the table part 61, for example, from perspective of improvement of operability. This operation panel 91 is basically one that has a display part such as a touch-type liquid crystal panel on which an operation screen can be displayed and operated but may have a mechanical operation part such as a button.

Front Opening/Closing Covering

The front opening/closing covering 11A of the image forming apparatus 1A is an openable/closable covering that covers at least a part of the image forming part 20 and a part of the medium storage part 30A on the front face of the housing 10A (apparatus body), as illustrated in FIGS. 1 to 3 and other drawings.

The front opening/closing covering 11A according to the first exemplary embodiment is a part of the front face of the housing 10A excluding the medium discharge part 40 and the table part 61 of the external reading part 60 and is configured as an opening/closing covering that can cover both of the whole image forming part 20 and the whole medium storage part 30A.

In other words, the front opening/closing covering 11A is configured as an opening/closing covering that covers a range from one end to the other end in the left-right direction of the image forming part 20 and covers a range from one end to the other end in the left-right direction of the medium storage part 30A in the left-right direction of the housing 10A.

This front opening/closing covering 11A is also an opening/closing covering that covers a range from one end (left end 10*h*) to the other end (right end 10*m*) in the left-right direction of the front face of the housing 10A.

The expression "covering a range from one end to the other end" encompasses not only a case where a range from a boundary portion between the front face of the housing 10A (apparatus body) and a left side face of the housing 10A to a boundary portion between the front face of the housing 10A and a right side face of the housing 10A is completely covered, but also a case where the medium storage part 30A is covered at least in the left-right direction.

An entire shape of the front opening/closing covering 11A is an oblong shape that is long in the up-down direction, is a lower part of the front face of the housing 10A obtained by excluding the table part 61, and has, in an upper right portion thereof, a cutout part 11*d* having a shape corresponding to a shape of a front face opening of the medium discharge part 40, as illustrated in FIG. 2 and other drawings. The front opening/closing covering 11A has a flange on an outer circumferential edge thereof.

Furthermore, the front opening/closing covering 11A is attached so as to open and close in directions indicated by arrows Do and Dc about plural (three in this example) opening/closing support members 16 such as hinges at the left end 10*h* of the front face of the housing 10A, as illustrated in FIG. 2 and other drawings. The opening/closing support members 16 are provided so as to be apart from one another in the up-down direction of the left end 10*h* of the front face of the housing 10A.

With this configuration, the whole front opening/closing covering 11A opens in a left lateral direction (the direction indicated by arrow Do).

Furthermore, the front opening/closing covering 11A moves between a covering position (see FIG. 1) at which the whole image forming part 20 and the whole medium storage part 30A are covered from the front side (apparatus depth direction) of the housing 10A and an open position (see FIGS. 2 and 3) at which the whole image forming part 20 and the whole medium storage part 30A are exposed in the apparatus depth direction.

Note that the front opening/closing covering 11A moving as described above stops at the covering position by making contact with a stopper (not illustrated). Furthermore, when the front opening/closing covering 11A moves rotationally from the state of stopping at the covering position toward the open position about the opening/closing support members 16, the front opening/closing covering 11A stops at the open position by making contact with a stopper (not illustrated).

In the image forming apparatus 1A, the right side covering 14 is provided with a handle guiding recessed part 14*c* at a front-side end portion thereof, as illustrated in FIGS. 1 and 2. The handle guiding recessed part 14*c* is a part having a recessed shape for guiding a user to easily get his or her finger caught on a handle portion of the front opening/closing covering 11A when opening the front opening/closing covering 11A.

With the above configuration, the front opening/closing covering 11A at the covering position restricts work of pulling out the three storage parts 31A, 31B, and 31C of the medium storage part 30A mounted in the housing 10A.

Meanwhile, the front opening/closing covering 11A at the open position does not restrict work of pulling out the storage parts 31A, 31B, and 31C mounted in the housing 10A. In other words, the front opening/closing covering 11A at the open position permits work of pulling out the storage parts 31A, 31B, and 31C mounted in the housing 10A.

Furthermore, when, for example, the storage part 31A mounted in the housing 10A is pulled out from the housing 10A by drawing out the storage part 31A in the apparatus depth direction in a state where the front opening/closing covering 11A is located at the open position, the bottom plate 32*a* of the storage body part 32 of the storage part 31A is exposed in a thickness direction of the bottom plate 32*a*.

Side Opening/Closing Covering

Figure 14:
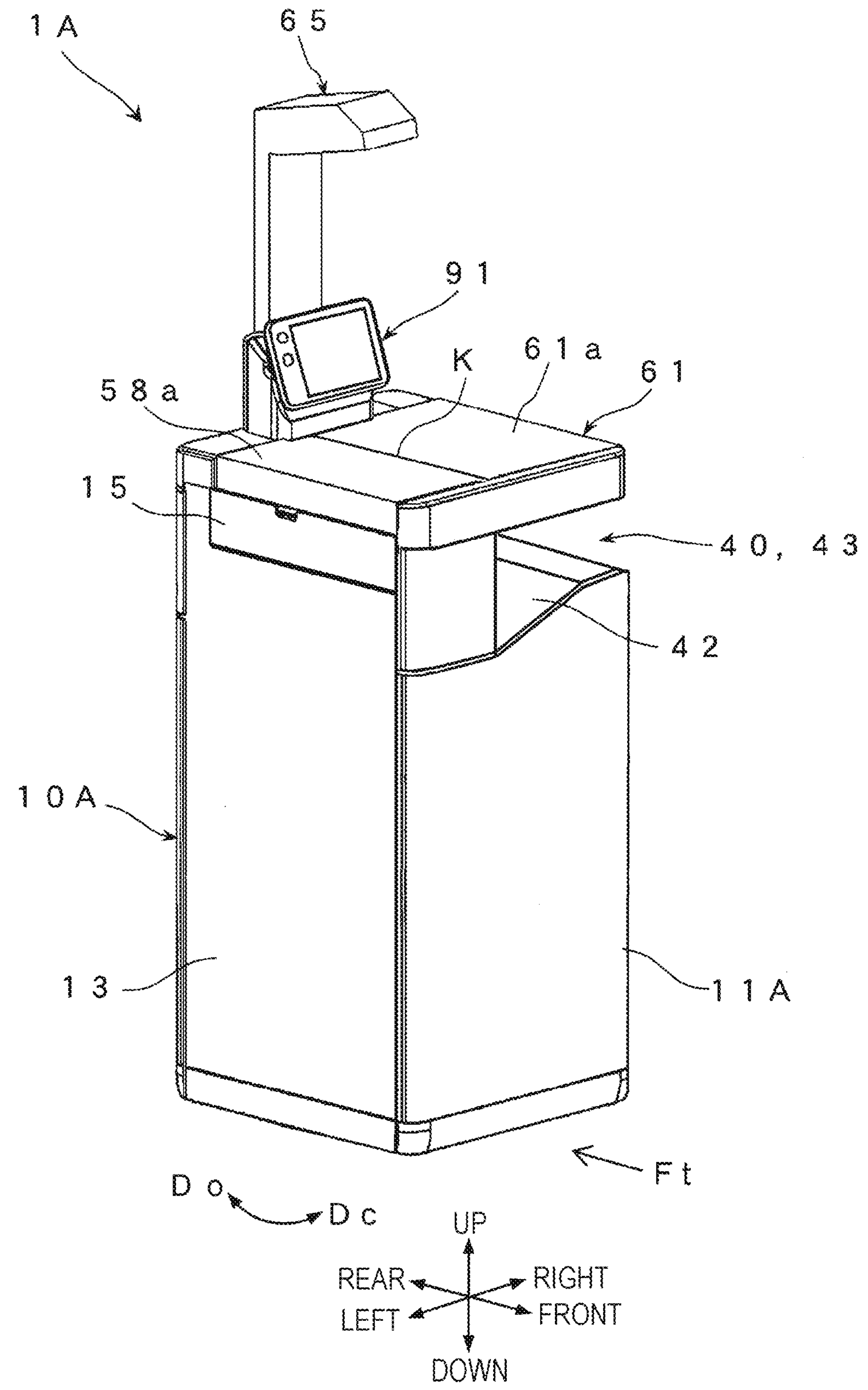
FIG. 14 is a perspective view of the image forming apparatus of FIG. 1 viewed from a different direction.
Figure 15:
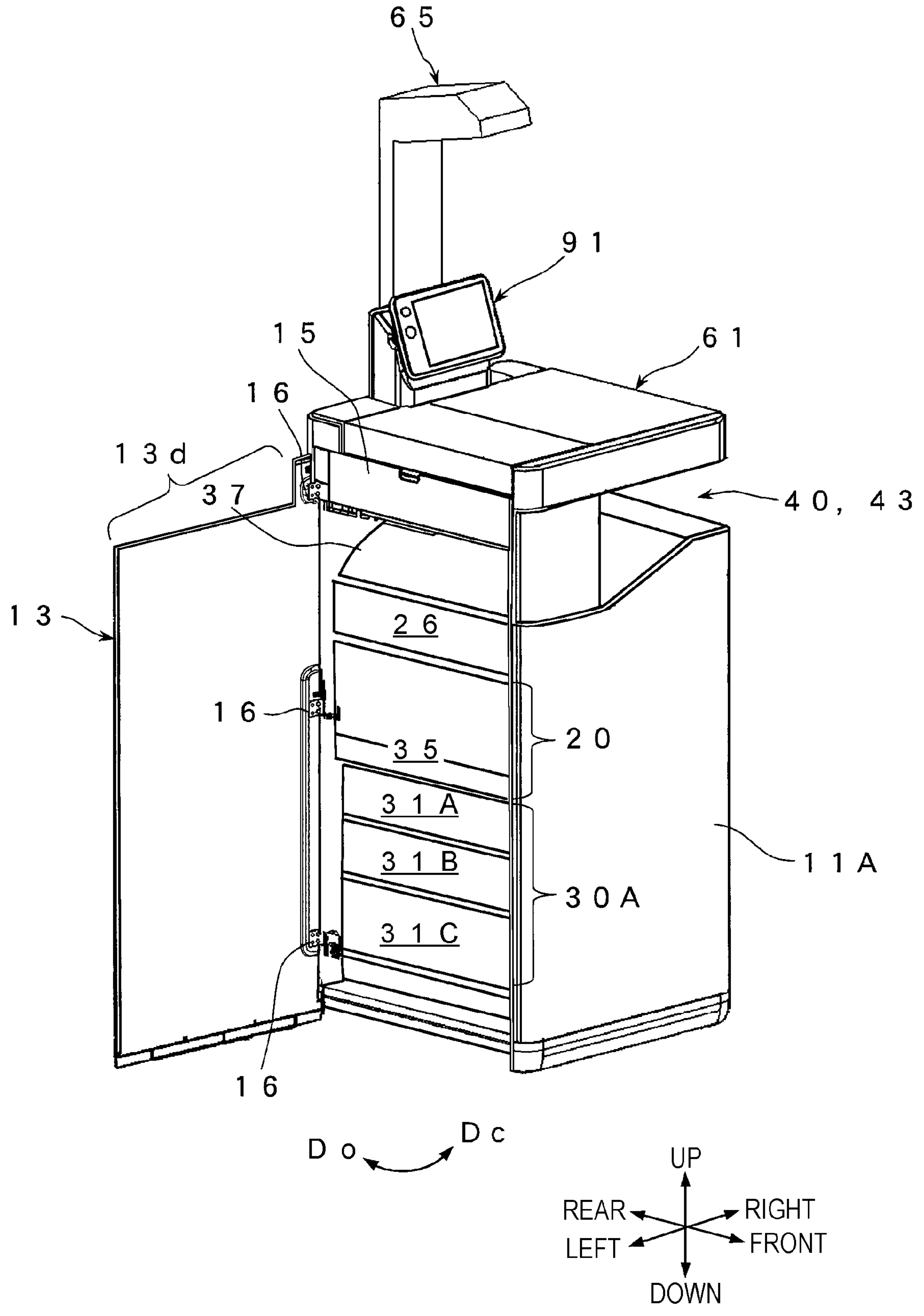
FIG. 15 is a perspective view illustrating a state where the side opening/closing covering of the image forming apparatus of FIG. 14 is opened.

Furthermore, the left side opening/closing covering 13 of the image forming apparatus 1A is a part of the left side face of the housing 10A obtained by excluding the table part 61 of the external reading part 60 and a part of an upper end covering part 15 and is configured as a single opening/closing covering that can cover both of the whole image forming part 20 and the whole medium storage part 30A, as illustrated in FIGS. 14 and 15.

Furthermore, it can be said that the left side opening/closing covering 13 is configured as a single opening/closing covering that covers the fixation device 26, which is a part of the image forming part 20, and a part of the medium transport path 35, as illustrated in FIG. 15.

Furthermore, the left side opening/closing covering 13 is an opening/closing covering heavier than the front opening/closing covering 11A, for example, because a part of the medium transport path 35 and members such as a heat-insulating member are provided on an inner surface side of the left side opening/closing covering 13.

An entire shape of the left side opening/closing covering 13 is an oblong shape that is long in the up-down direction, is a lower part of the right side face of the housing 10A obtained by excluding the table part 61 and the upper end covering part 15, and has a cutout part 13*d*, as illustrated in FIG. 5 and other drawings.

The cutout part 13*d* has a shape corresponding to an oblong shape of the upper end covering part 15 that is long in the front-rear direction and is provided in a front-side portion of an upper portion of the oblong.

Furthermore, the left side opening/closing covering 13 is attached so as to open and close in directions indicated by arrows Do and Dc about plural (three in this example) opening/closing support members 16 such as hinges at a rear end of the left side face of the housing 10A, as illustrated in FIG. 2 and other drawings. The opening/closing support members 16 are disposed so as to be apart from one another in the up-down direction at a rear end of the left side opening/closing covering 13 in the left-right direction of the left side opening/closing covering 13 (the front-rear direction when viewed from the view point of the housing 10A).

With this configuration, the whole left side opening/closing covering 13 opens toward the rear side (in the direction indicated by arrow Do).

Furthermore, the left side opening/closing covering 13 moves between a covering position (see FIG. 14) at which a part of the left side face of the housing 10A excluding the table part 61 of the external reading part 60 and a part (the upper end covering part 15) of the upper end portion is covered with the left side opening/closing covering 13 from the apparatus width direction and an open position (see FIG. 15) at which the part of the housing 10A is exposed in the apparatus width direction.

The left side opening/closing covering 13 moving as described above stops at the covering position by making contact with a stopper (not illustrated). Furthermore, when the left side opening/closing covering 13 is rotationally moved from the state of stopping at the covering position toward the open position about the opening/closing support members 16, the left side opening/closing covering 13 stops at the open position by making contact with a stopper (not illustrated).

In addition, the left side opening/closing covering 13 covers the housing 10A from a side where a recording medium P is transported by the medium transport path 35.

Accordingly, the left side opening/closing covering 13 located at the open position exposes at least a part of the medium transport path 35 along which a recording medium P is transported in the apparatus width direction, as illustrated in FIG. 15.

Furthermore, in the first exemplary embodiment, the left side opening/closing covering 13 also has a function of covering the housing 10A of the image forming apparatus 1A from the apparatus width direction. Accordingly, the left side opening/closing covering 13 moves between the covering position at which the fixation device 26 mounted in the housing 10A is covered with the left side opening/closing covering 13 from the apparatus width direction and an open position at which the fixation device 26 is exposed in the apparatus width direction, as illustrated in FIG. 15.

Figure 16:
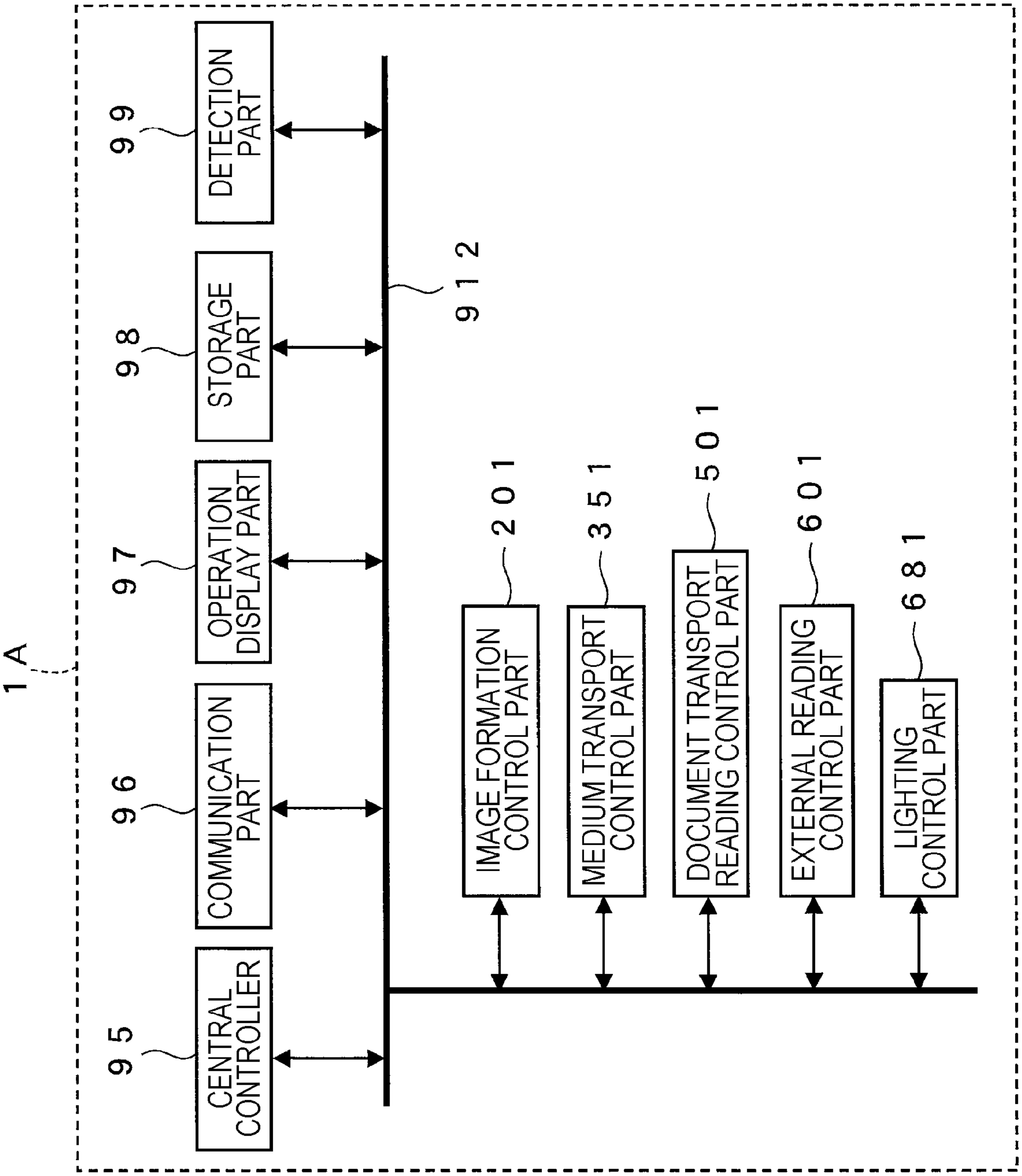
FIG. 16 is a block diagram illustrating a configuration of a control system of the image forming apparatus of FIG. 1.

As illustrated in FIG. 16, the image forming apparatus 1A has a control-system configuration centering on a central controller 95 that collectively controls operation of the whole apparatus such as the image forming part 20, the document transporting reading part 50, the external reading part 60, and the medium transport path 35.

The central controller 95 includes an arithmetic processing device such as a CPU, a storage element such as a memory, an input output unit, and a control circuit part. Furthermore, the central controller 95 transmits a necessary control command to a control target in accordance with a control program, reference data, detection data, or the like stored in a recording element or the like.

Furthermore, the central controller 95 is connected to members such as a communication part 96, an operation display part 97, a storage part 98, a detection part 99, an image formation control part 201, a medium transport control part 351, a document transport reading control part 501, an external reading control part 601, and a lighting control part 681 through a predetermined transmission path 912 or the like.

The communication part 96 receives instruction information (e.g., an image forming operation command, a document reading operation command, an external reading operation command) transmitted from a terminal apparatus connected to the image forming apparatus 1A.

The operation display part 97 displays various kinds of information on the operation panel 91 or a display screen of the terminal apparatus or the like. The operation display part 97 receives various kinds of operation information concerning operations made by a user. The operation panel 91 is controlled to turn off a display screen by the central controller 95 during reading by the external reading part 60.

The storage part 98 stores therein various kinds of data such as image data generated, for example, by the central controller 95.

The detection part 99 detects information necessary for control. The detection part 99 includes various sensors.

The image formation control part 201 controls operation of the image forming part 20.

The medium transport control part 351 controls operation of the medium transport path 35.

The document transport reading control part 501 controls operation of members such as the reading device 57 of the document transporting reading part 50 and the transport mechanism 47.

The external reading control part 601 controls operation of members such as the reading device 66 of the external reading part 60.

The lighting control part 681 controls operation of the lighting device 68. For example, lighting on/off, brightness, and adjustment of an optical axis of the lighting device 68 are controlled by the central controller 95.

In the image forming apparatus 1A, an interlock switch 86, which is one of safety mechanisms concerning operation of the image forming apparatus 1A, is applied as an example of the detection part 85. The interlock switch 86 includes, for example, a movable connection part 86*a* of the interlock switch 86 provided on the front opening/closing covering 11A and a switch part 86*b* of the interlock switch 86 provided on the housing 10A, as illustrated in FIG. 2.

The central controller 95 performs control so that operation of members such as the image forming part 20, the document transporting reading part 50, the external reading part 60, and the medium transport path 35 is executable when the interlock switch 86 is in a connection state. The connection state is a state where the movable connection part 86*a* is connected to the switch part 86*b*.

On the contrary, the central controller 95 performs control so that operation of members such as the image forming part 20, the document transporting reading part 50, the external reading part 60, and the medium transport path 35 is inexecutable when the interlock switch 86 is in a non-connection state. The non-connection state is a state where the movable connection part 86*a* is disconnected from the switch part 86*b*. In this non-connection state, the central controller 95 performs control so that execution of operation is not started (an execution instruction is not received) in a case where no operation is being executed and performs control so that operation is forcibly stopped in a case where operation is being executed.

Operation and Effects

In the image forming apparatus 1A configured as above, the whole image forming part 20 (including the fixation device 26) and the whole medium storage part 30A are covered with the single front opening/closing covering 11A on an exterior of the front face of the housing 10A in a case where the front opening/closing covering 11A is closed, that is, located at the covering position, as illustrated in FIG. 1.

In this case, the front opening/closing covering 11A covers at least the range from one end to the other end in the left-right direction of the medium storage part 30A in the left-right direction of the housing 10A.

Accordingly, in the image forming apparatus 1A, a dividing line Lv (see FIG. 41) extending almost along the up-down direction that is generated by coverings at least on the exterior of the medium storage part 30A is not present as compared with a case where the medium storage part 30A is covered with plural coverings in the range from one end to the other end in the left-right direction. In particular, in the image forming apparatus 1A, a dividing line extending so as to straddle the image forming part 20 and the medium storage part 30A is not present due to the closed front opening/closing covering 11A.

The dividing line Lv extending almost along the up-down direction encompasses not only a dividing line extending parallel with the up-down direction, but also a dividing line extending at an angle with respect to the up-down direction (e.g., at an angle within ±45° with respect to the up-down direction).

Figure 41:
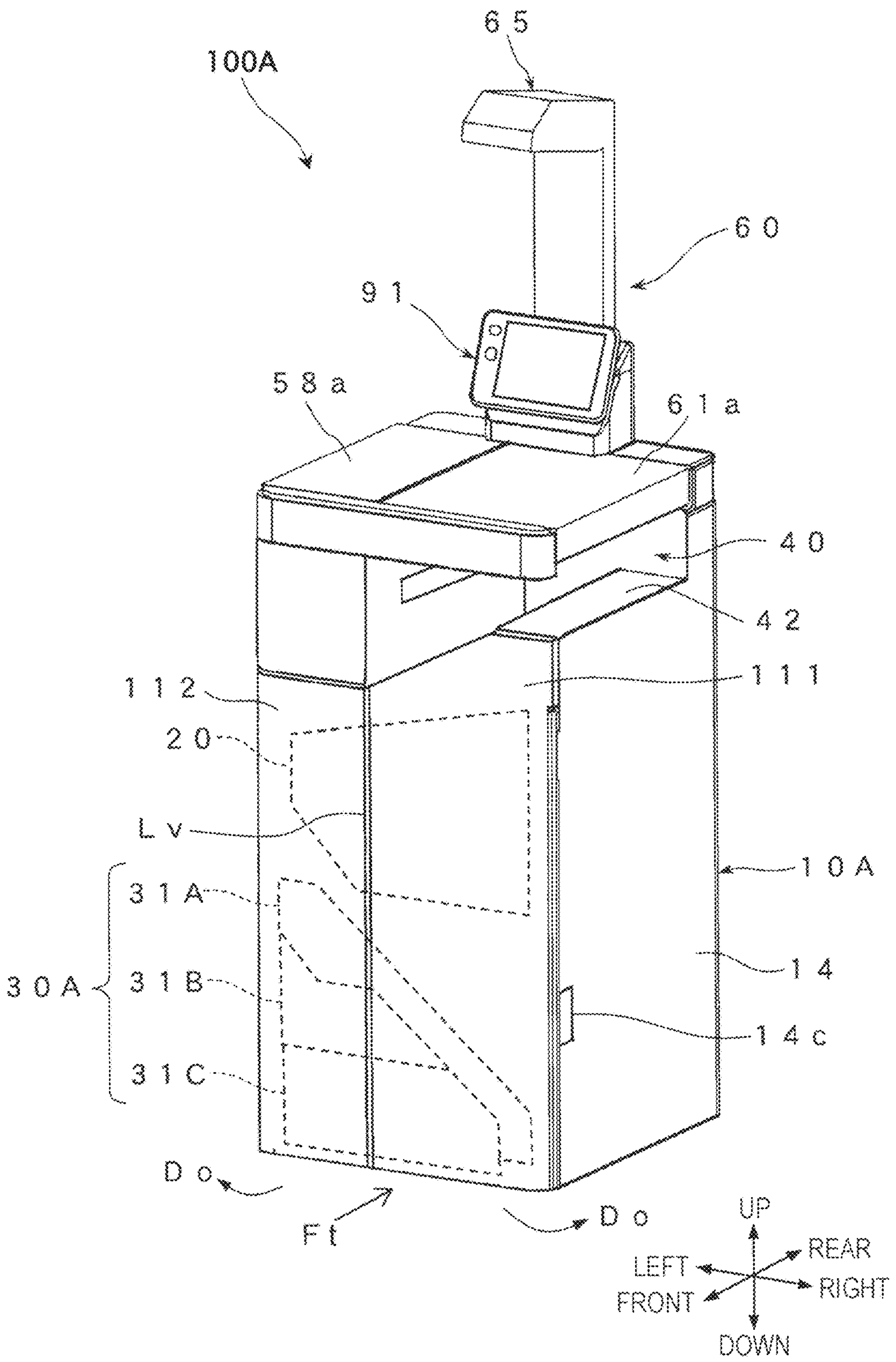
FIG. 41 (Prior Art)
FIG. 41 is a perspective view of an image forming apparatus according to Comparative Example 1.

In this respect, an image forming apparatus 100A according to Comparative Example 1 illustrated in FIG. 41 is configured such that the whole image forming part 20 and the whole medium storage part 30A are covered with two opening/closing coverings 111 and 112.

In the image forming apparatus 100A according to Comparative Example 1, the vertical dividing line Lv also serving as a boundary line between the opening/closing covering 111 and the opening/closing covering 112 is present on the exterior of the front face of the housing 10A. In this case, the vertical dividing line Lv is a dividing line that traverses the image forming part 20 and the medium storage part 30A longitudinally in the up-down direction. Accordingly, in the image forming apparatus 100A according to Comparative Example 1, quality of appearance (beauty of appearance) of the front face of the housing 10A is damaged due to the presence of the vertical dividing line Lv on the exterior of the front face of the housing 10A.

Furthermore, the image forming apparatus 1A is configured such that the front opening/closing covering 11A covers all of the three storage parts 31A, 31B, and 31C of the medium storage part 30A.

Accordingly, in the image forming apparatus 1A, no dividing line is generated between the storage parts 31A, 31B, and 31C of the medium storage part 30A on the exterior (the front opening/closing covering 11A) of the front face of the housing 10A by contour lines of the storage parts 31A, 31B, and 31C because of the closed front opening/closing covering 11A. Therefore, beauty of appearance is less damaged than in a case where dividing lines are present due to the contour lines of the storage parts 31A, 31B, and 31C.

Furthermore, in the image forming apparatus 1A, the whole medium storage part 30A can be covered with the single front opening/closing covering 11A. It is therefore possible to employ a storage part having a special form such as the oblique storage part 31A as the medium storage part 30A. In the image forming apparatus 1A, even in a case where the oblique storage part 31A is included as the medium storage part 30A, quality of appearance can be maintained by hiding the oblique storage part 31A.

Furthermore, in the image forming apparatus 1A, work of pulling out (drawing out) the storage parts 31A, 31B, and 31C from the housing 10A is restricted when the front opening/closing covering 11A is located at the covering position.

Figure 17:
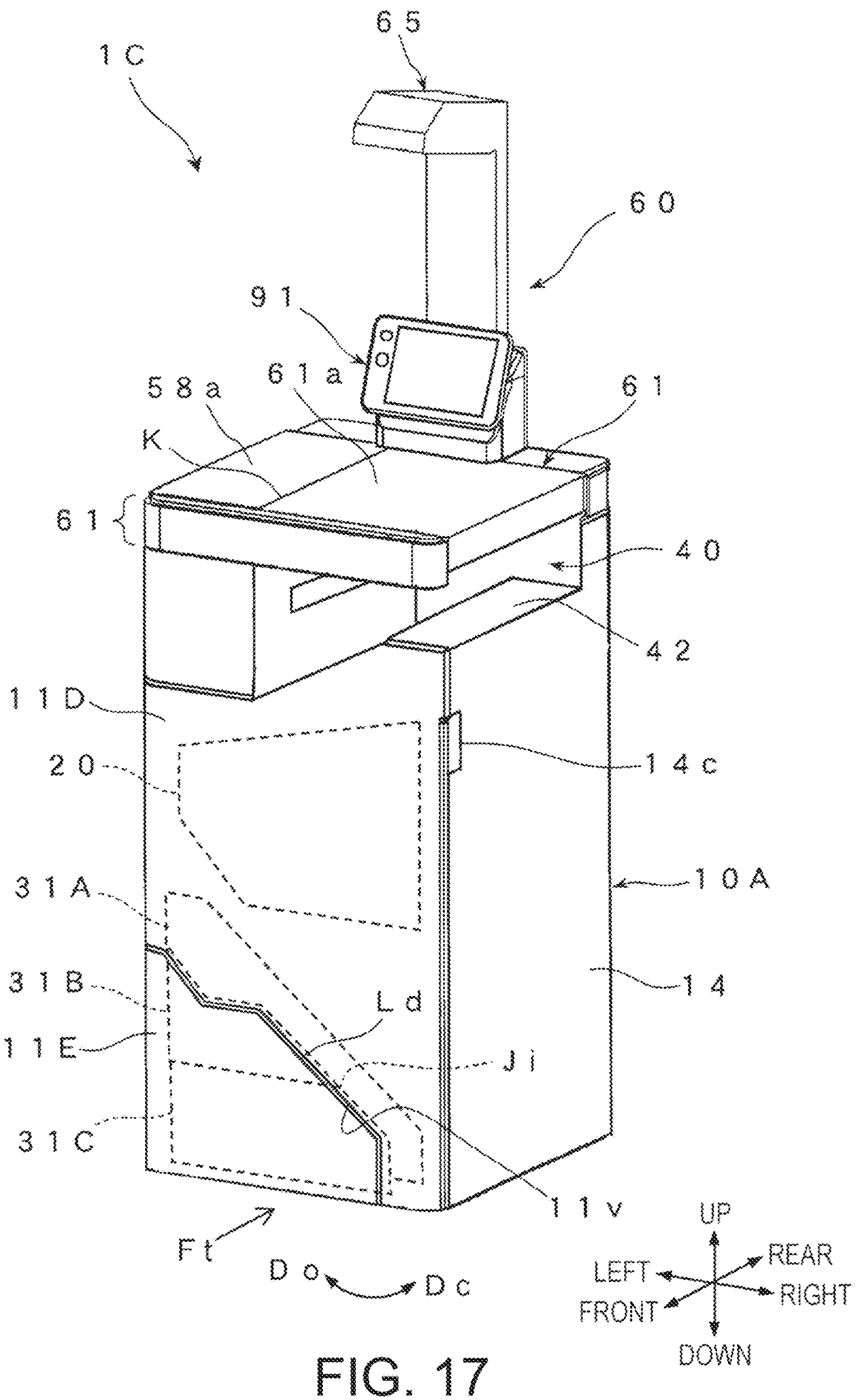
FIG. 17 (Prior Art)
FIG. 17 is a perspective view of an image forming apparatus according to a reference example.

The image forming apparatus 1A may be an image forming apparatus 1C employing a front opening/closing covering 11D illustrated in FIG. 17 instead of the front opening/closing covering 11A.

The front opening/closing covering 11D is an opening/closing covering that covers the whole image forming part 20 and the oblique storage part 31A, which is a part of the medium storage part 30A, on the front face of the housing 10A and is an opening/closing covering whose lower end 11*v* has a shape extending almost along an oblique contour line Ji on a lower end of the oblique storage part 31A. The front opening/closing covering 11D is an opening/closing covering that covers a range from one end to the other end in the left-right direction of the oblique storage part 31A, which is a part of the medium storage part 30A. The front opening/closing covering 11D is also an opening/closing covering that covers a range from one end to the other end in the left-right direction of the image forming part 20.

However, in the image forming apparatus 1C according to a reference example employing the front opening/closing covering 11D, it is necessary to also provide a second front opening/closing covering 11E that covers the remaining storage parts 31B and 31C of the medium storage part 30A, as illustrated in FIG. 17.

Furthermore, in the image forming apparatus 1C, a dividing line Ld extending in an oblique direction is present between the front opening/closing covering 11D and the second front opening/closing covering 11E, and it is therefore difficult to improve quality of appearance due to the presence of the dividing line Ld.

Figure 42:
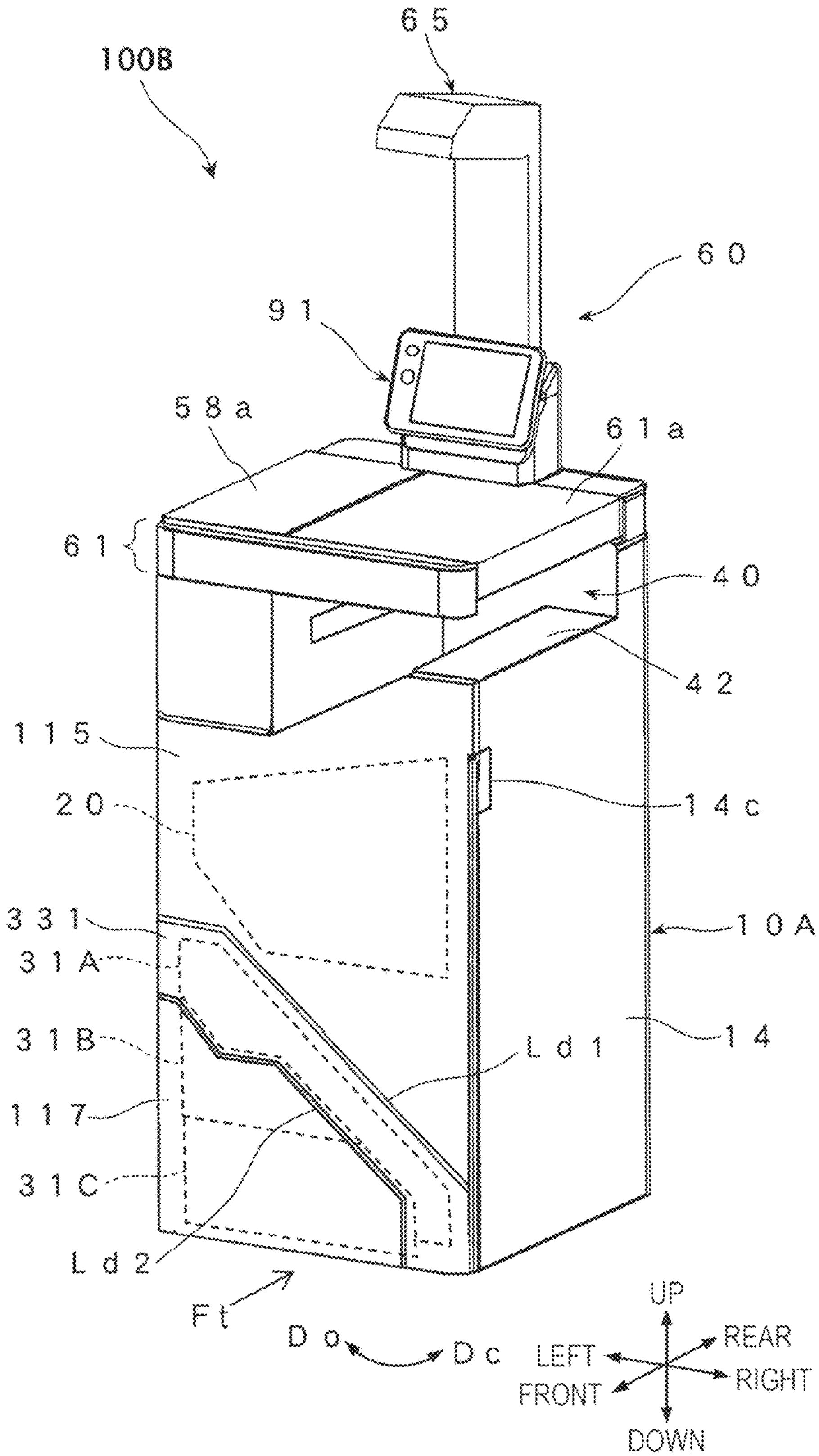
FIG. 42 (Prior Art)
FIG. 42 is a perspective view of an image forming apparatus according to Comparative Example 2.

However, even the image forming apparatus 1C employing the front opening/closing covering 11D is better than an image forming apparatus 100B according to Comparative Example 2 illustrated in FIG. 42 in the following points.

First, the image forming apparatus 100B according to Comparative Example 2 employs a front opening/closing covering 115 that covers the whole image forming part 20 but does not cover the medium storage part 30A at all. That is, the front opening/closing covering 115 is not an opening/closing covering that cover at least a part of the image forming part 20 and a part of the medium storage part 30A.

Furthermore, the image forming apparatus 100B according to Comparative Example 2 includes an exterior covering 331 that covers the oblique storage part 31A of the medium storage part 30A and a second front opening/closing covering 117 that covers the two storage parts 31B and 31C of the medium storage part 30A.

That is, in the image forming apparatus 100B according to Comparative Example 2, two oblique dividing lines Ld1 and Ld2 are present since the oblique storage part 31A is not covered with the front opening/closing covering 115, as compared with the image forming apparatus 1C. In particular, in the image forming apparatus 100B, the dividing line (Ld1) is present at a boundary between the image forming part 20 and the medium storage part 30A.

In this respect, in the image forming apparatus 1C employing the front opening/closing covering 11D, only one oblique dividing line Ld is present, and the number of dividing lines Ld is kept small, and therefore quality of appearance on the exterior of the front face of the housing 10A improves.

Meanwhile, in the image forming apparatus 1A according to the first exemplary embodiment, an opening/closing covering whose lower end 11*v* has a shape extending almost horizontally in the left-right direction without extending along the oblique contour line Ji of the oblique storage part 31A is employed as the front opening/closing covering 11A.

Accordingly, in the image forming apparatus 1A, the oblique storage part 31A can be covered and hidden so that the presence of the oblique storage part 31A is unnoticeable, and quality of appearance can be maintained. Furthermore, in the image forming apparatus 1A, it is unnecessary to separately provide the second front opening/closing covering 11E for covering the storage parts 31B and 31C like the one provided in the image forming apparatus 100B according to Comparative Example 2 even in a case where the storage parts 31B and 31C are provided in addition to the oblique storage part 31A as in the medium storage part 30A.

Furthermore, the image forming apparatus 1A is configured such that the left side opening/closing covering 13 heavier than the front opening/closing covering 11A is opened and closed about the opening/closing support members 16 at a rear end in the left-right direction of the left side opening/closing covering 13.

Accordingly, vibration is less likely to occur when the side opening/closing covering 13 is opened and closed than in a case where the image forming apparatus 1A is configured such that the left side opening/closing covering 13 is opened and closed about the opening/closing support members 16 provided either one of ends in the up-down direction of the left side opening/closing covering 13. As a result, it becomes less likely that vibration transmits to the reading device 66 of the external reading part 60 during opening/closing of the side opening/closing covering 13 and vibrates the reading device 66. This is effective especially in a case where the side opening/closing covering 13 needs to be opened and closed while reading operation is being by the external reading part 60.

In addition, the image forming apparatus 1A includes the left side opening/closing covering 13 that covers both of the image forming part 20 and the medium storage part 30A on the left side face of the housing 10A.

Accordingly, in the image forming apparatus 1A, no vertical dividing line that traverses the image forming part 20 and the medium storage part 30A longitudinally is present on the exterior of the left side face of the housing 10A, and therefore quality of appearance of the left side face improves.

Furthermore, in the image forming apparatus 1A, when the front opening/closing covering 11A is opened, the movable connection part 86*a* of the interlock switch 86 on the front opening/closing covering 11A side is disengaged from the switch part 86*b* of the interlock switch 86 on the housing 10A side and shifts to the non-connection state. In a case where the front opening/closing covering 11A is opened during execution of image formation operation by the image forming apparatus 1A, the central controller 95 performs control so that operation of the image formation control part 201, the external reading control part 601, and the medium transport control part 351 is forcibly stopped based on detection information indicating that the interlock switch 86 has shifted to the non-connection state.

Accordingly, in the image forming apparatus 1A, operation (image formation operation) of the image forming part 20 and the medium transport path 35 exposed on the front face side of the housing 10A is stopped when the front opening/closing covering 11A is opened, and therefore safety is ensured.

Note that in a case where a recording medium P is present somewhere on the medium transport path 35 for image formation operation, the central controller 95 may, when the front opening/closing covering 11A is opened, cause the recording medium P that is being transported to be transported and discharged to the medium discharge part 40 and then stop operation of the medium transport path 35.

Furthermore, in the image forming apparatus 1A, in a case where the front opening/closing covering 11A is opened to the open position about the opening/closing support members 16 disposed on the left side of the medium storage part 30A, the storage part 31A disposed so as to extend diagonally downward from upper left to lower right when viewed from the front face of the housing 10A is exposed to the near side in the apparatus depth direction. With this configuration, the front opening/closing covering 11A is not disposed (is not present) on the right side of the storage part 31A in a case where the front opening/closing covering 11A has moved to the open position, and therefore user's work of storing the recording media P1 into the storage part 31A becomes easier.

Furthermore, in the image forming apparatus 1A, the opening/closing support members 16 of the front opening/closing covering 11A located at the open position are disposed closer to an upper end than to a lower end of the oblique storage part 31A inclined from the upper end to the lower end when viewed from the apparatus depth (front side) direction. With this configuration, a working space in a state where the front opening/closing covering 11A has been moved to the open position and the storage part 31A has been drawn out becomes wider, and workability of storing the recording media P1 improves, as compared with a case where the opening/closing support members 16 of the front opening/closing covering 11A located at the open position are disposed closer to the lower end of the storage part 31A than to the upper end of the storage part 31A when viewed from the apparatus depth direction.

Furthermore, in the image forming apparatus 1A, when the oblique storage part 31A is pulled out from the housing 10A in a state where the front opening/closing covering 11A is located at the open position, the bottom plate 32*a* (see FIG. 6) of the storage part 31A is exposed in the thickness direction of the bottom plate 32*a*. With this configuration, workability of storing the recording media P1 into the storage part 31A improves as compared with a case where the bottom plate 32*a* of the storage part 31A pulled out from the housing 10A is not exposed in the thickness direction of the bottom plate 32*a*.

Furthermore, in the image forming apparatus 1A, the lower end of the oblique storage part 31A is closer to the right end 10*m* (side wall) of the housing 10A on a lower end side of the storage part 31A than to the left end 10*h* (side wall) of the housing 10A on an upper end side of the storage part 31A when viewed from the front face Ft side, as illustrated in FIG. 4. With this configuration, workability of storing the recording media P1 into the storage part 31A improves as compared with a case where the lower end of the storage part 31A is closer to the left end 10*h* (side wall) than to the right end 10*m* (side wall).

Figure 18:
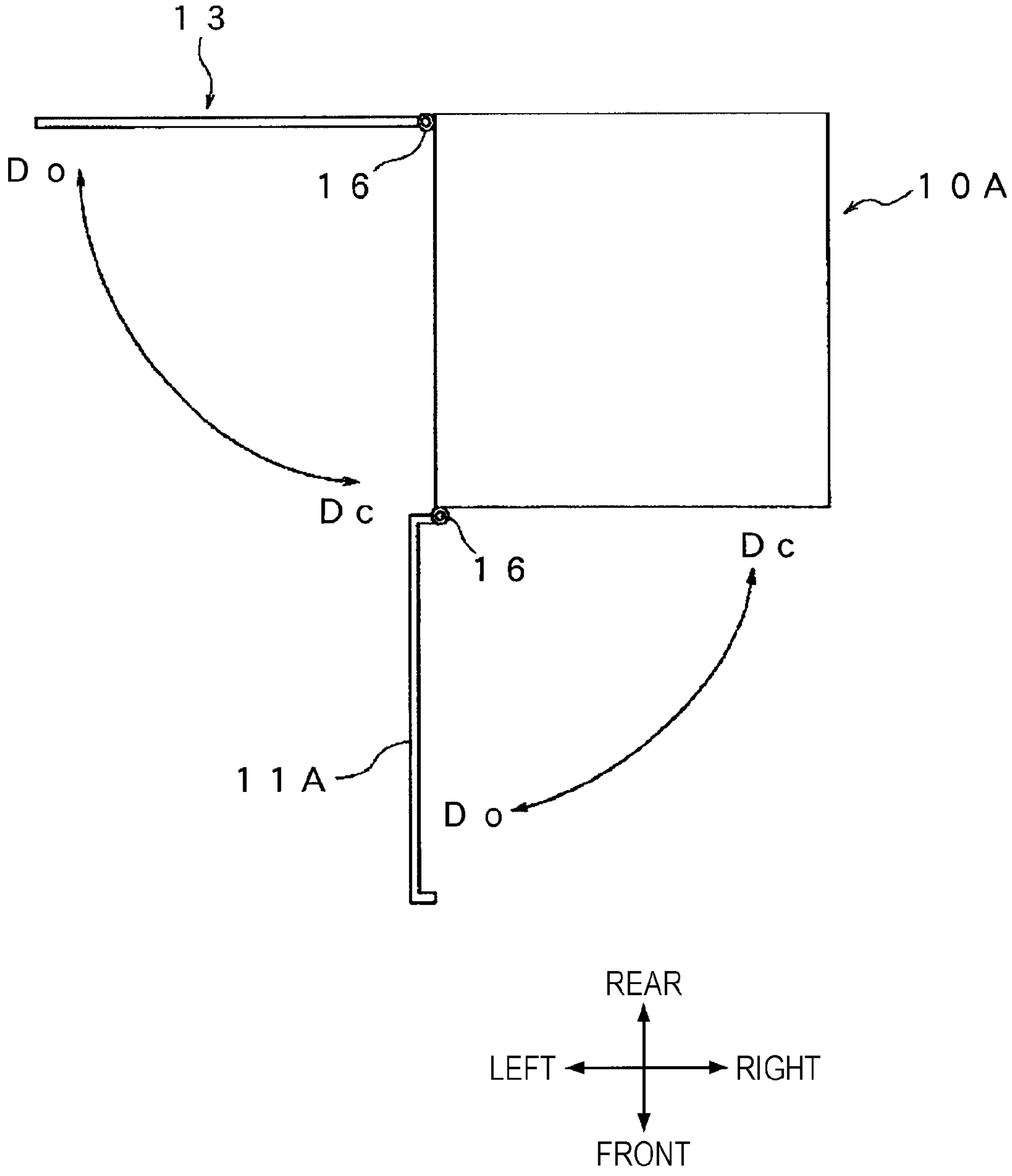
FIG. 18 is a schematic plan view illustrating moving trajectories of the front opening/closing covering and the left side opening/closing covering of the image forming apparatus of FIG. 1.

Furthermore, in the image forming apparatus 1A, a moving trajectory of the front opening/closing covering 11A and a moving trajectory of the left side opening/closing covering 13 are apart from each other, as illustrated in FIG. 18. With this configuration, the left side opening/closing covering 13 moves irrespective of a moving position of the front opening/closing covering 11A. The state where the moving trajectory of the front opening/closing covering 11A and the moving trajectory of the left side opening/closing covering 13 are apart from each other means that the two moving trajectories do not overlap three-dimensionally.

Furthermore, in the image forming apparatus 1A, a part of the medium transport path 35 along which a recording medium P is transported is exposed in a state where the left side opening/closing covering 13 is located at the open position, and thereby a recording medium P jammed at some point on the medium transport path 35 can be removed.

Furthermore, in the image forming apparatus 1A, maintenance of the image forming part 20 (including the fixation device 26) can be performed in a state where the front opening/closing covering 11A is located at the open position.

Figure 43A:
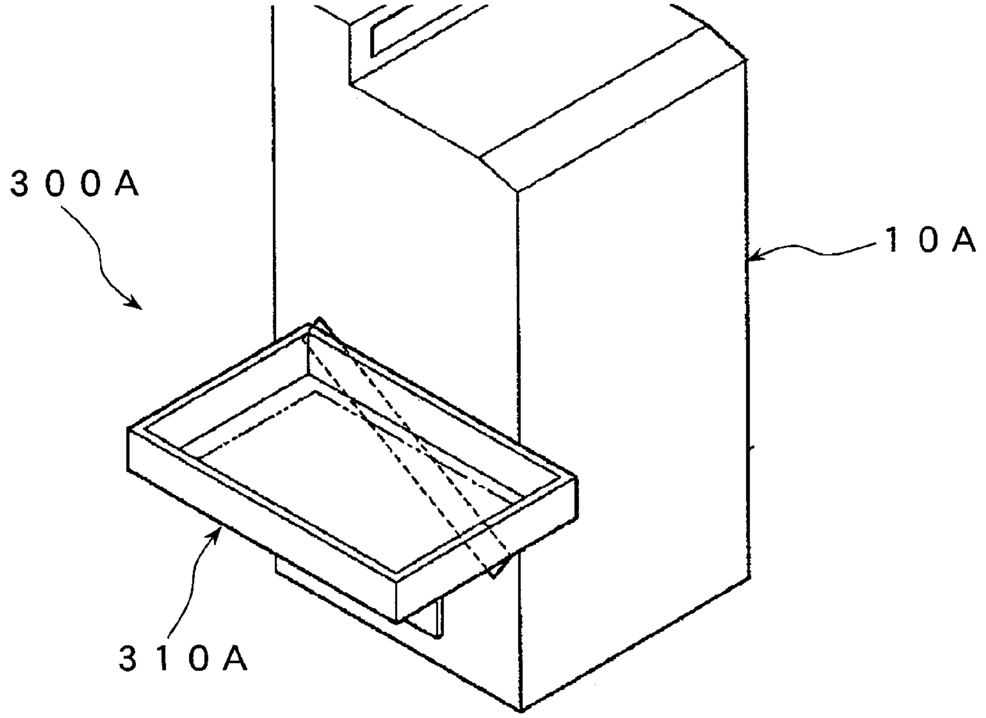
FIG. 43A is a schematic perspective view illustrating a medium storage part according to Comparative Example 3.

Furthermore, in the image forming apparatus 1A, the storage part 31A pulled out (drawn out) from the housing 10A is inclined with respect to the horizontal direction so that one end and the other end thereof in the left-right direction are located at different positions in the up-down direction when viewed from the front face side thereof. With this configuration, a range in which the storage part 31A is disposed in the apparatus width direction (left-right direction) when the recording media P1 are supplied is smaller than in a case where a storage part 310A of a medium storage part 300A according to Comparative Example 3 illustrated in FIG. 43A is employed instead of the storage part 31A.

The medium storage part 300A according to Comparative Example 3 is an example in which the storage part 310A disposed along the horizontal direction so that one end and the other end thereof in the left-right direction are located at the same position in the up-down direction is applied instead of the storage part 31A disposed obliquely.

Furthermore, in the medium storage part 30A, the recording media P2 of the maximum size that can be stored in the storage part 31B mounted in the housing 10A are disposed within the range R1 in which the recording media P1 of the maximum size that can be stored in the storage part 31A mounted in the housing 10A are disposed in the apparatus width direction when viewed from the front side of the medium storage part 30A, as illustrated in FIG. 5. With this configuration, assume that the inclined storage part 31A and a storage part 310B of a medium storage part 300B according to Comparative Example 4 illustrated in FIG. 43B have the same shape, a range where the recording media P2 are disposed in the apparatus width direction is smaller than that in the medium storage part 300B according to Comparative Example 4.

The medium storage part 300B according to Comparative Example 4 is an example of a medium storage part including three storage parts 310B, 310C, and 310D that are inclined at the same angle and are shifted from one another in the up-down direction.

In the medium storage part 300B, a maximum size of recording media P12 that can be stored in the middle storage part 310C is smaller than a maximum size of recording media P11 that can be stored in the topmost storage part 310B. Furthermore, a maximum size of recording media P13 that can be stored in the lowermost storage part 310D is smaller than the maximum size of the recording media P12 that can be stored in the middle storage part 310C.

In the medium storage part 300B, the number of recording media P11 that can be stored in the topmost storage part 310B, the number of recording media P12 that can be stored in the storage part 310C, and the number of recording media P13 that can be stored in the lowermost storage part 310D are similar. Accordingly, the topmost storage part 310B, the middle storage part 310C, and the lowermost storage part 310D are similar in terms of a total thickness of the stored recording media P in a thickness direction.

Figure 43B:
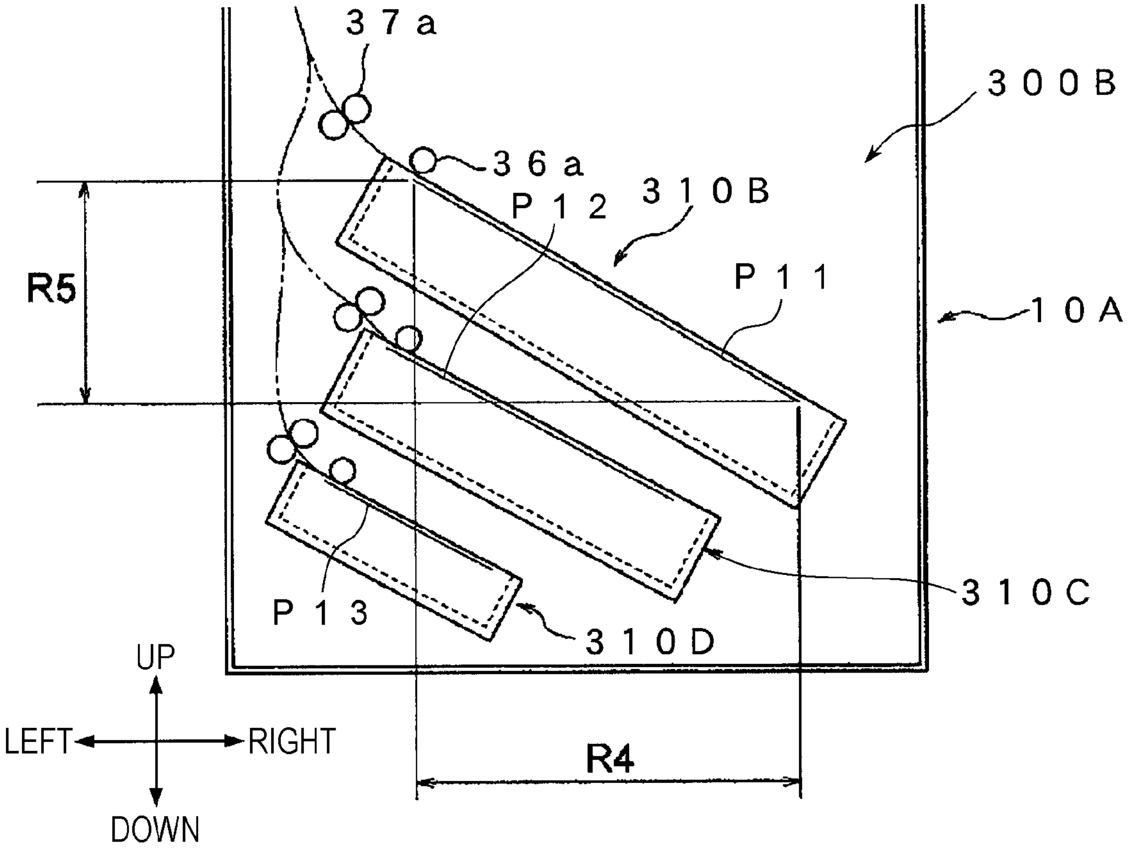
FIG. 43B is a schematic front view illustrating a medium storage part according to Comparative Example 4.

Furthermore, in the medium storage part 300B according to Comparative Example 4, the recording media P12 of the maximum size stored in the middle storage part 310C and the recording media P13 of the maximum size stored in the lowermost storage part 310D protrude, in other words, stick out from a range (R4 in FIG. 43B) in which the recording media P11 of the maximum size stored in the topmost storage part 310B are disposed in the left-right direction, as illustrated in FIG. 43B. Note that although a part of the recording media P12 of the maximum size stored in the middle storage part 310C and a part of the recording media P13 of the maximum size stored in the lowermost storage part 310D stick out from the range R4 in the apparatus width direction in the medium storage part 300B according to Comparative Example 4, the whole recording media P12 and P13 may stick out from the range r4.

Furthermore, the recording media P12 of the maximum size stored in the middle storage part 310C protrude, in other words, stick out from a range (R5 in FIG. 43B) in which the recording media P11 of the maximum size stored in the topmost storage part are disposed in the up-down direction, as illustrated in FIG. 43B. Note that although a part of the recording media P12 of the maximum size stored in the middle storage part 310C stick out from the range R5 in the up-down direction in the medium storage part 300B according to Comparative Example 4, the whole recording media P12 may stick out from the range R5.

In the medium storage part 30A according to the first exemplary embodiment, the recording media P2 of the maximum size stored in the middle storage part 31B are disposed within the range R1 in which the recording media P1 of the maximum size stored in the topmost oblique storage part 31A are disposed both in the up-down direction and the left-right direction of the housing 10A. With this configuration, assume that the inclined topmost storage part 31A and the topmost storage part 310B according to Comparative Example 4 have the same shape, ranges where the recording media P2 are disposed in the up-down direction and the left-right direction are smaller than those in the medium storage part 300B according to Comparative Example 4.

Furthermore, in the medium storage part 30A, the recording media P3 of the maximum size stored in the lowermost storage part 31C are disposed within the range R1 in which the recording media P1 of the maximum size stored in the topmost storage part 31A are disposed in the left-right direction of the housing 10A. With this configuration, assume that the inclined topmost storage part 31A and the topmost storage part 310B according to Comparative Example 4 have the same shape, a range where the recording media P3 are disposed in the left-right direction is smaller than that in the medium storage part 300B according to Comparative Example 4.

Furthermore, in the medium storage part 30A, degrees of inclination of the middle storage part 31B and the lowermost storage part 31C are smaller than a degree of inclination of the topmost storage part 31A. With this configuration, the recording media P2 and P3 stored in the storage part 31B and the storage part 31C, respectively are less likely to move in an inclination direction than in a case where the degrees of inclination of the storage part 31B and the storage part 31C are identical to the degree of inclination of the topmost storage part 31A.

Furthermore, in the medium storage part 30A, the middle storage part 31B and the lowermost storage part 31C are disposed horizontally. With this configuration, the recording media P stored in the storage part 31B and the storage part 31C are less likely to move in an inclination direction than in a case where the storage part 31B and the storage part 31C are inclined with respect to the horizontal direction.

Furthermore, in the medium storage part 30A, the number of recording media P3 that can be stored in the lowermost storage part 31C is larger than the number of recording media P1 that can be stored in the topmost storage part 31A and the number of recording media P2 that can be stored in the middle storage part 31B. With this configuration, a center of gravity of the medium storage part 30A in a state where the recording media P3 are stored is lower than in a case where the number of recording media P3 that can be stored in the lowermost storage part 31C is smaller than the number of recording media P1 that can be stored in the topmost storage part 31A and the number of recording media P2 that can be stored in the middle storage part 31B.

Furthermore, in the medium storage part 30A, the middle storage part 31B and the lowermost storage part 31C mounted in the housing 10A can be drawn out from the housing 10A toward the apparatus near side (front side) irrespective of a position of the topmost storage part 31A. This makes it easier to supply the recording media P2 or P3 to the storage part 31B or the storage part 31C than in a configuration in which both of the middle storage part 31B and the lowermost storage part 31C cannot be drawn out in a state where the topmost storage part 31A has been pulled out from the housing 10A.

Furthermore, in the image forming apparatus 1A, a range necessary for supply of the recording media P (especially the recording media P1) to the image forming apparatus 1A is smaller than in a case where the medium storage part 30A is not provided.

Furthermore, the image forming apparatus 1A includes the external reading part 60 in addition to the document transporting reading part 50. Accordingly, in the image forming apparatus 1A, both of the reader part 55 of the document transporting reading part 50 that reads a document image of a transported document G and the reader part 65 of the external reading part 60 that is disposed above the table part 61 disposed above the document platen 51 and the document discharge part 56 of the document transporting reading part 50 can be provided.

Furthermore, in the image forming apparatus 1A, the upper surface 61*a* of the table part 61 of the external reading part 60 is flat at least in the reading range MH of the reader part 65 of the external reading part 60. Accordingly, a posture of a sheet-shaped document G suitable for reading by the reader part 65 can be created as compared with a case where the upper surface 61*a* of the table part 61 has, in the reading range MH of the reader part 65, unevenness formed to such an extent that it is difficult to support a document in a posture suitable for reading.

Furthermore, in the image forming apparatus 1A, the top surface of the top plate 58*a* of the covering part 58 of the document transporting reading part 50 and the upper surface 61*a* of the table part 61 of the external reading part 60 are flat surface flush with each other at least in the reading range MH of the reader part 65. Accordingly, a posture of a document G suitable for reading by the reader part 65 can be created as compared with a case where the upper surface 61*a* of the table part 61 and the top surface of the top plate 58*a* of the covering part 58 have, in the reading range MH of the reader part 65, unevenness formed to such an extent that it is difficult to support a document in a posture suitable for reading.

Furthermore, in the image forming apparatus 1A, a sheet-shaped document G can be placed on the upper surface 61*a* of the table part 61 and the top surface of the top plate 58*a* of the covering part 58. Accordingly, a range in which a document G can be placed is larger than in a case where a document G can be placed only on the upper surface 61*a* of the table part 61.

Furthermore, in the image forming apparatus 1A, the table part 61 of the external reading part 60 is movable to the open position at which an upper side relative to the document platen 51 of the document transporting reading part 50 is opened. Accordingly, in the document transporting reading part 50, a document G can be placed on the upper surface 51*a* of the document platen 51 from the upper side relative to the document platen 51.

Furthermore, in the image forming apparatus 1A, a part of a document G placed on the document platen 51 of the document transporting reading part 50 is placed on the upper surface 61*a* of the table part 61 moved to the open position. Accordingly, a range in which a document G can be placed is larger than in a case where a document G is placed only on the document platen 51.

Furthermore, in the image forming apparatus 1A, the upper surface 61*a* of the table part 61 of the external reading part 60 is provided at such a height that a standing user operating the image forming apparatus 1A can perform an operation of placing a document G. Accordingly, a user can perform an operation of placing a document G on the upper surface 61*a* of the table part 61 without sitting.

Furthermore, the image forming apparatus 1A includes the image forming part 20 that can form images read by the document transporting reading part 50 and the external reading part 60 onto a recording medium P. Accordingly, the image forming part 20 can form, on a recording medium P, a document image of a transported document G and an image of a document G placed on the table part 61.

More Detailed Configuration of First Exemplary Embodiment

Detailed Configuration of External Reading Part

The table part 61 also serving as a placing table or a document platen of the external reading part 60 is used together with the top plate 58*a* of the covering part 58 of the document transporting reading part 50, as illustrated in FIGS. 1 and 8A and 8B and other drawings.

Both of the upper surface 61*a* of the table part 61 and the upper surface (top surface) of the top plate 58*a* of the covering part 58 have a rectangular shape when viewed from above, as illustrated in FIGS. 9A and 11A and other drawings.

The table part 61 is a table part that expands along a flat plane extending along the front-rear direction and the left-right direction together with the top plate 58*a* of the covering part 58, and the combined upper surface also functions as a document placing surface 63 on which a sheet-shaped document G, which is an example of a target to be read, can be placed.

Figure 19A:
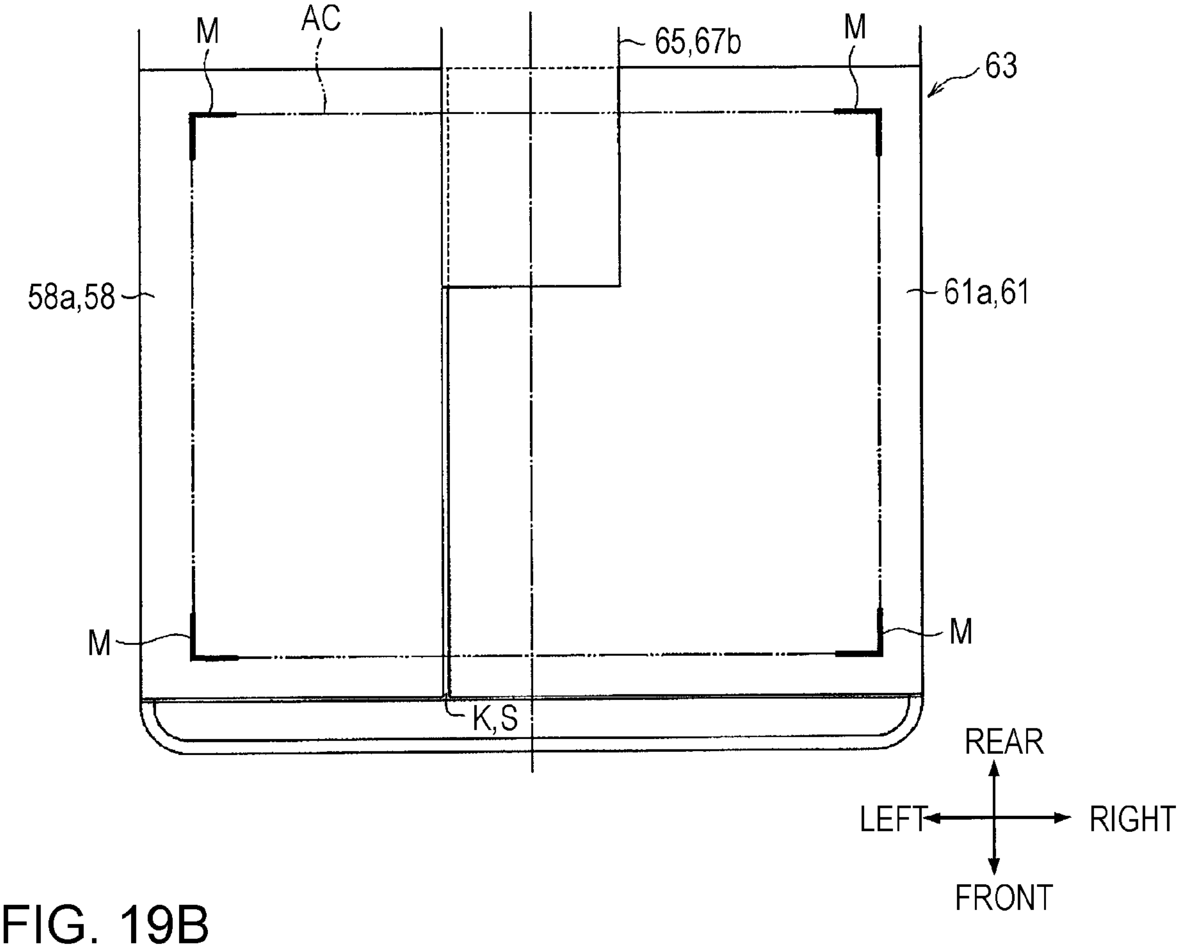
FIG. 19A is a schematic plan view illustrating a configuration of the document placing surface.

Furthermore, the document placing surface 63 is configured such that a left-side end edge of the table part 61 and a right-side end edge of the upper surface of the top plate 58*a* of the covering part 58 are arranged adjacent to each other with a gap S interposed therebetween, as illustrated in FIGS. 8B and 19A and other drawings.

The gap S extends along the front-rear direction when viewed from the apparatus depth direction (front side), as illustrated in FIGS. 8B and 19A.

Furthermore, the gap S forms a boundary line K between the table part 61 and the top plate 58*a* of the covering part 58. In other words, the boundary line K is formed by the gap S between the upper surface 61*a* of the table part 61 and the upper surface of the top plate 58*a* of the covering part 58, as illustrated in FIGS. 8B and 19A. The boundary line K has a shape of a single straight line extending in the front-rear direction of the apparatus. In FIGS. 8B and 19A, the gap S is illustrated in an emphasized manner between the table part 61 and the covering part 58.

The upper surface 61*a* of the table part 61 and the upper surface of the top plate 58*a* of the covering part 58 that constitute the document placing surface 63 have marks M for alignment of a document G placed on the document placing surface 63, as illustrated in FIG. 19A.

Each of the marks M has an L shape when viewed from above the image forming apparatus 1A, and for example, four marks M are provided on the placing surface 30*a* corresponding to four corners of an A3-size document G having a longitudinal direction in the apparatus width direction. Among the four marks M, left two marks M are provided on the upper surface of the top plate 58*a* of the covering part 58 of the document transporting reading part 50 and right two marks M are provided on the upper surface 61*a* of the table part 61. The marks M are, for example, formed by painting. A document G placed on the document placing surface 63 may have any size, but desirably has a prescribed size (e.g., an A3 size or an A4 size) commercially available or a size stored in the storage part 30A.

A center (virtual central line Lc) of an A3-size document G corresponding to the four marks M overlaps a center of a photographing range (angle of view) of the reading device 66 of the external reading part 60 in the apparatus width direction, as illustrated in FIG. 19A. A document G of a size such as the A4 size other than the A3 size is desirably placed on the document placing surface 63 so that a center of the document G matches the center of the photographing range AC.

The marks M are provided at positions apart from the boundary line K. In other words, the boundary line K is at a position deviated from the marks M along the document placing surface 63.

In the first exemplary embodiment, the boundary line K is formed at a position covered with an A3-size document G placed on the document placing surface 63. Furthermore, the boundary line K is not present at a position that is not covered with the A3-size document G within the photographing range AC of the reading device 66. In other words, in a case where an A3-size document G is placed on the document placing surface 63, the boundary line K is formed only within a range covered with the A3-size document G within the photographing range AC of the reading device 66.

Outside the photographing range AC, the boundary line K may also be present outside the range covered with the A3-size document G. The boundary line K is present in a central one of three parts obtained by dividing the document placing surface 63. Specifically, the boundary line K is present in a central one of three parts obtained by equally dividing the document placing surface 63 in the apparatus width direction.

The top plate 58*a* of the covering part 58 that constitutes the document placing surface 63 has an overlapping part 64 that overlaps the upper surface 61*a* of the table part 61 in the apparatus up-down direction, as illustrated in FIG. 8B.

The top plate 58*a* of the covering part 58 has an end surface 58*f* that faces a left-side end surface of the table part 61 and a protruding part 58*g* protruding in a rectangular shape from the end surface 58*f* at a position below the table part 61. The protruding part 58*g* is integral with the covering part 58. Furthermore, the protruding part 58*g* has an upward facing surface 58*h* that faces upward and a front end surface 58*i* that faces a right side.

With this configuration, when the top plate 58*a* of the covering part 58 forms the document placing surface 63, the protruding part 58*g* is disposed below a left-side end portion of the table part 61 and overlaps a part of the table part 61 in the apparatus up-down direction, and thereby the overlapping part 64 is formed. In this state, the upward facing surface 58*h* of the protruding part 58*g* faces a lower surface of the table part 61. Furthermore, in this state, the protruding part 58*g* supports the table part 61 from a lower side by a support part (not illustrated) such as a rib provided on the upward facing surface 58*h*.

Figure 20:
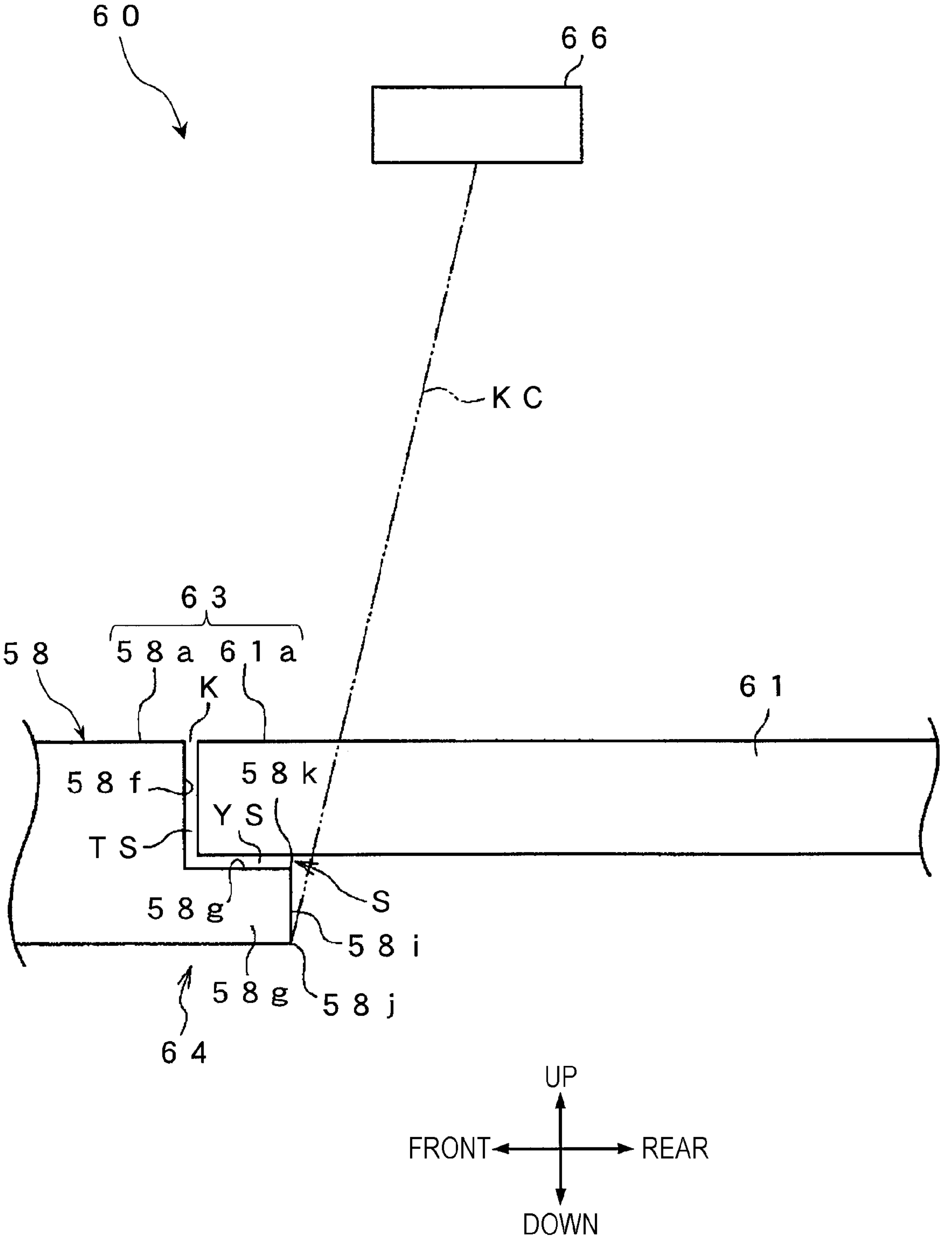
FIG. 20 is an enlarged front view of a part of the document placing surface.

As illustrated in FIG. 20, the document placing surface 63 is disposed so that a part of the table part 61 is present on a virtual straight line KC connecting a lower edge 52*j* of the front end surface 58*f* of the top plate 58 of the covering part 58 and the reading device 66 of the external reading part 60. Furthermore, in this case, the document placing surface 63 is disposed so that a part of the table part 61 is present on a virtual straight line connecting an upper edge 58*k* located above the lower edge 58*j* of the end surface 58*f* of the top plate 58 of the covering part 58 and the reading device 66.

In other words, the document placing surface 63 is disposed so that the end surface 58*f* of the top plate 58 of the covering part 58 is blocked from the reading device 66 by the table part 61 in a case where the overlapping part 64 is formed. Furthermore, the document placing surface 63 is disposed so that the lower edge 58*j* of the end surface 58*f* of the top plate 58 of the covering part 58 is blocked from the reading device 66 by the table part 61 in a case where the overlapping part 64 is formed. The lower edge 58*j* of the end surface 58*f* of the top plate 58 of the covering part 58 is an example of a lower end of the overlapping part 64.

The gap S in the document placing surface 63 is formed in an L shape when viewed from the apparatus front side by the end surface 58*f* and the upward facing surface 58*h* of the top plate 58 of the covering part 58 and an end surface that faces leftward and a lower surface of the table part 61. In other words, in a case where the overlapping part 64 is formed, the overlapping part 64 has the gap S extending in a non-straight manner from the document placing surface 63 to the upper edge 58*k* of the end surface 58*f* of the covering part 58 disposed below the table part 61 when viewed from the apparatus front side.

As illustrated in FIG. 20, the gap S has a vertical gap TS extending from the document placing surface 63 to a lower edge of the left-side end surface of the table part 61 in the apparatus up-down direction when viewed from the apparatus front side and a horizontal gap YS extending in the apparatus width direction below the lower edge of the left-side end surface of the table part 61. The lower edge of the left-side end surface of the table part 61 is a lower end of the vertical gap TS. The vertical gap TS is covered with the protruding part 58*g* of the top plate 58 of the covering part 58 from below. In other words, the lower edge of the left-side end surface of the table part 61 is covered with the protruding part 58*g* of the top plate 58 from below. As for the document placing surface 63 having the gap S, the table part 61 is disposed on a virtual straight line connecting the lower edge of the left-side end surface of the table part 61 and the reading device 66. In other words, in a case where the overlapping part 64 is formed, the document placing surface 63 is disposed so that the lower edge of the left-side end surface of the table part 61 is blocked from the reading device 66 by the table part 61.

Figure 19B:
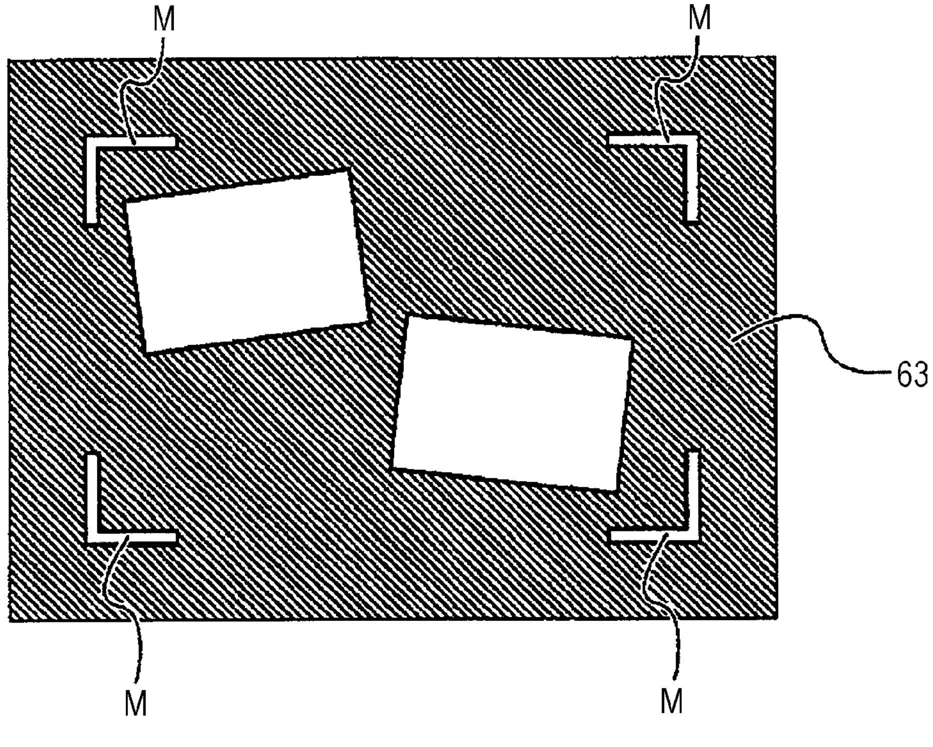
FIG. 19B is a schematic plan view illustrating a state of the document placing surface and a target to be read.

In a case where reading is performed by the external reading part 60, a target to be read, examples of which include a document G, is placed on the document placing surface 63, as illustrated in FIG. 19B.

The document placing surface 63 is configured such that a luminance difference between a paint part or a material part of the whole or a part of an upper part of the document placing surface 63 and a placed subject (e.g., a document G), which is a target to be read, is a predetermined value or more and a color difference between a paint color or a material color of the whole or a part of the upper part of the document placing surface 63 and a color of the placed subject is a predetermined value or more so that the subject and the document placing surface 63 can be distinguished from each other.

Note, however, that this form is not restrictive as long as the subject and the document placing surface 63 can be distinguished from each other. For example, even in a case where the color difference between the paint color or the material color of the whole or a part of the upper part of the document placing surface 63 and the color of the placed subject is less than the predetermined value, it is only necessary that the luminance difference is set to such a value that the subject and the document placing surface 63 can be distinguished from each other. Specifically, for example, under an 8-bit environment, it is desirable that the luminance difference is 50 LSB or more, but it is only necessary that the luminance difference is 20 LSB or more. Conversely, even in a case where the luminance difference between the paint part or the material part of the whole or a part of the upper part of the document placing surface 63 and the placed subject is less than the predetermined value, it is only necessary that the color difference is set to such a value that the subject and the document placing surface 63 can be distinguished from each other.

For example, in a case where a color is expressed by an Y value expressing luminance in the YCbCr forma, a subject of a color expressed by an Y value closer to a value expressing white than to a value expressing black is placed on the document placing surface 63. For example, under an 8-bit environment, a subject of a color expressed by a Y value closer to 255 than to 0 is placed. In a case where a color is expressed by an Y value expressing luminance in the YCbCr format, the color of the upper part of the document placing surface 63 is a color expressed by an Y value closer to a value expressing black than to a value expressing white so that the subject and the document placing surface 63 can be distinguished from each other in an image taken by the reading device 66. For example, under an 8-bit environment, the color of the upper part of the document placing surface 63 is a color expressed by a Y value closer to 0 than to 255. Note that in a case where a color is expressed by an Y value expressing luminance in the YCbCr format, it is only necessary that a color of the whole or a part of the upper part of the document placing surface 63 is a color expressed by an Y value closer to a value expressing black than to a value expressing white.

The document placing surface 63 according to the first exemplary embodiment is configured such that the paint color or the material color of the whole or a part of the upper part thereof is black or a color of a density equal to or higher than a preset value. Furthermore, the document placing surface 63 is configured such that reflectance of light of the paint color or the material color of the whole or a part of the upper surface of the document placing surface 63 is 10% or less. In the first exemplary embodiment, black is a color whose deviation of chromaticity from an achromatic point (x=0.333, y-=0.333, Y=0) is within 3 at a color difference ΔE.

In the first exemplary embodiment, black is a color whose deviation of chromaticity from an achromatic point (x=0.333, y-=0.333, Y=0) is within 3 at a color difference ΔE, or a color whose optical density (OD) value is 1.0 or more, or a color whose Y value expressing luminance in the YCbCr format is 50 or less. Note that the definition of black is one on the document placing surface 63 according to the first exemplary embodiment and may be changed depending on an actual environment around the apparatus or performance of the photographing part.

In addition, the color of the upper portion of the document placing surface 63 is not limited to the paint color or the material color of the document placing surface 63 itself and may be a color reflected on the document placing surface 63 by the lighting device 68 or may be a color created by overlapping between a color reflected on the document placing surface 63 and a shadow.

By thus clarifying a luminance difference or a color difference between the color of the document placing surface 63 and the color of the placed target to be read, the target to be read can be easily discriminated. This makes it possible to increase, for example, accuracy of cutout and rotation correction of image data of the target to be read.

Furthermore, in a case where a color is expressed by an Y value expressing luminance in the YCbCr format, a color of the marks M formed on the document placing surface 63 is a color expressed by a Y value closer to a value expressing white than to a value expressing black, and is, for example, white. In other words, reflectance of light of the color of the marks M is a preset value or more and is, for example, 80% or more.

By thus clarifying a luminance difference between the color of the marks M and the color of the document placing surface 63, the target to be read placed on the document placing surface 63 can be easily discriminated. This makes it possible to increase, for example, accuracy of cutout and rotation correction of image data of the target to be read.

The marks M are for distinguishing a region of the document placing surface 63 where a target to be read is placed and a region of the document placing surface 63 where a target to be read is not placed.

Accordingly, the marks M can be ones indicating a range where a target to be read is placed by L-shaped brackets as described above, ones configured such that a color of the range of the document placing surface 63 where a target to be read is placed and a color of the range of the document placing surface 63 where a target to be read is not placed are different, ones configured such that a material of the range of the document placing surface 63 where a target to be read is placed and a material of the range of the document placing surface 63 where a target to be read is not placed are different, ones configured such that a position where a target to be read is placed is illuminated by the lighting device 68, or the like.

The external reading control part 601 illustrated in FIG. 16 includes not only an arithmetic processing device such as a CPU, a storage element such as a ROM and a RAM, an input output part, and a control circuit part as in the case of the central controller 95, but also a storage part 84 such as an auxiliary storage device (storage).

In the first exemplary embodiment, a document detection program for detecting edges of a document G by performing processing of detecting a color difference or a luminance difference on a read image read (photographed) by the reading device 66 is stored in the ROM or the storage part 84. Furthermore, a photographed image reading program for reading a photographed and detected document image formed on an upper surface (front surface) of the document G is stored in the ROM or the storage part 84.

The arithmetic processing part of the external reading control part 601 functions as a detecting reading part that detects edges of a document G by measuring a color difference or a luminance difference between the document G and the upper surface 61*a* of the table part 61 and the upper surface of the top plate 58*a* of the covering part 58, which are the document placing surface 63, on the basis of an image taken by the reading device 66 and reads a document image formed on the document G in accordance with these programs. That is, the detecting reading part has a function of detecting and reading only a document G placed on the document placing surface 63 from a read image of the document G taken by the reading device 66.

Furthermore, in order to detect edges of a document G placed on the document placing surface 63 from an image taken by the reading device 66, the document placing surface 63 is configured such that a luminance difference and a color difference between the color of the document placing surface 63 and a color of the document G is equal to or larger than a predetermined luminance difference and a predetermined color difference, respectively. However, this form is not restrictive, as long as the edges of the document G can be detected. For example, even in a case where the color difference between the color of the document placing surface 63 and the color of the document G is less than the predetermined color difference, it is only necessary that the luminance difference is set to such a value that the edges of the document G can be detected. Specifically, for example, under an 8-bit environment, the luminance difference is desirably 50 LSB or more, but it is only necessary that the luminance difference is 20 LSB or more. Conversely, even in a case where the luminance difference between the color of the document placing surface 63 and the color of the document G is less than the predetermined luminance difference, it is only necessary that the color difference is set to such a value that the edges of the document G can be detected.

As for the document detection program and the photographed image reading program, arithmetic processing may be performed by the central controller 95.

As illustrated in FIG. 21, the image forming apparatus 1A is configured such that members such as the table part 61 of the external reading part 60, the operation panel 91, and the medium discharge part 40 are located so as to be operable by a standing user so that the standing user can easily operate these members.

Furthermore, in the image forming apparatus 1A, the paint color or the material color of the document placing surface 63 is, for example, applied to a part of a surface accessed by a user. The paint color or the material color of the document placing surface 63 is applied to a part between the top surface of the housing 10A (the covering part 58 or the table part 61) and the medium discharge part 40 on the surface accessed by a user.

Furthermore, in the image forming apparatus 1A, the paint color or the material color of the document placing surface 63 and a different color are applied to the part between the top surface of the housing 10A and the medium discharge part 40.

With this configuration, a user can more easily recognize a position of the document placing surface 63 than in a case where the surface accessed by the user is white.

Lighting Device

Next, a detailed configuration of the lighting device 68 is described with reference to FIGS. 22 and 23.

Figure 22A:
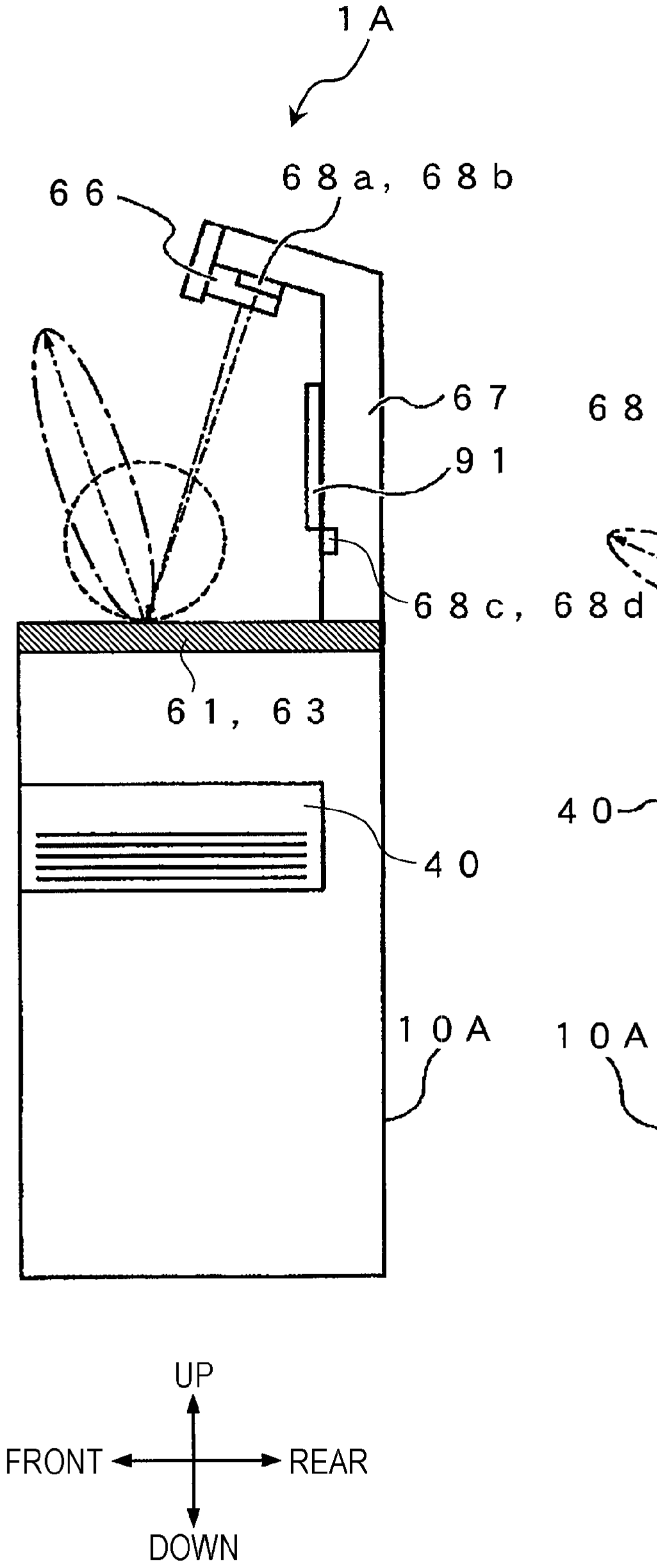
FIG. 22A is a schematic side view illustrating reflected light distributions of some light sources of the lighting device.
Figure 22B:
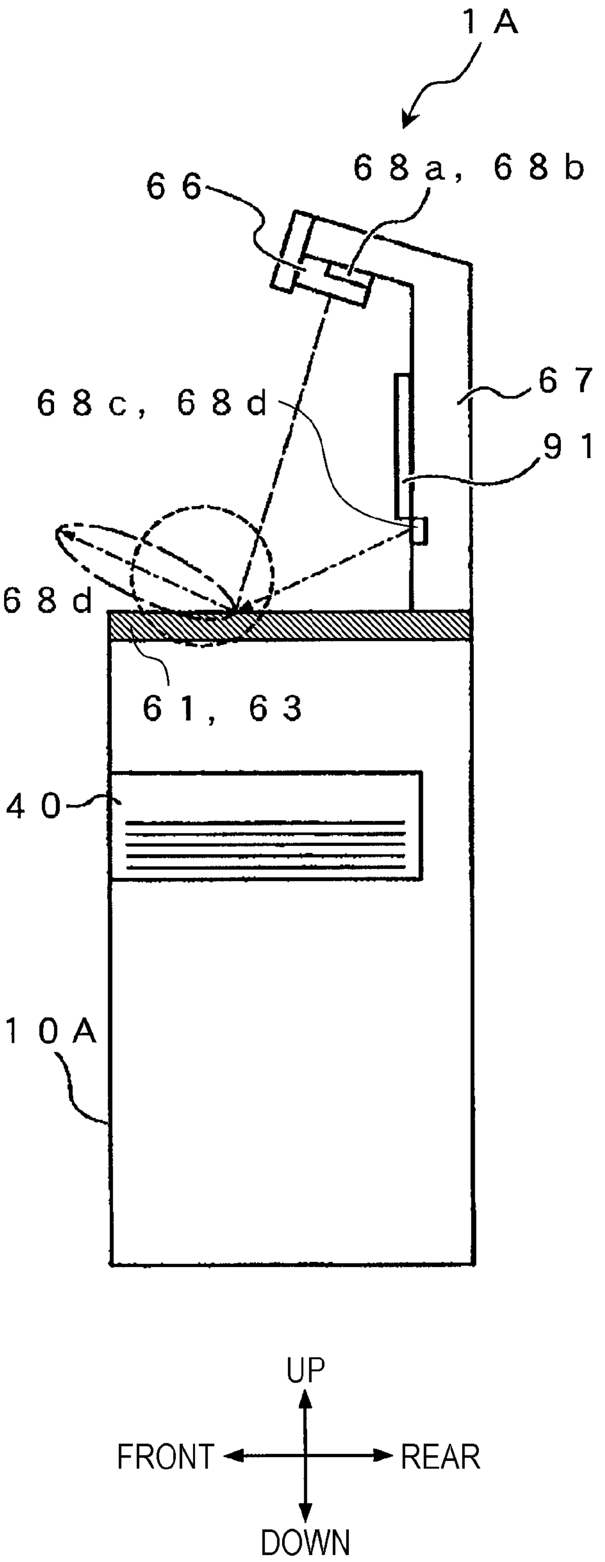
FIG. 22B is a schematic side view illustrating reflected light distributions of remaining light sources of the lighting device.

FIG. 22A illustrates a reflected light distribution in a case where directivity of the light sources is high and a reflected light distribution in a case where directivity of the light sources is low in a case where the light sources 68*a* and 68*b* close to the reading device 66 of the external reading part 60 are used to irradiate a target to be read (subject) from above by emitting light downward. FIG. 22B illustrates a reflected light distribution in a case where directivity of the light sources is high and a reflected light distribution in a case where directivity of the light sources is low in a case where the light sources 68*c* and 68*d* close to the operation panel 91 are used to irradiate a target to be read from above by emitting light obliquely downward.

Figure 23:
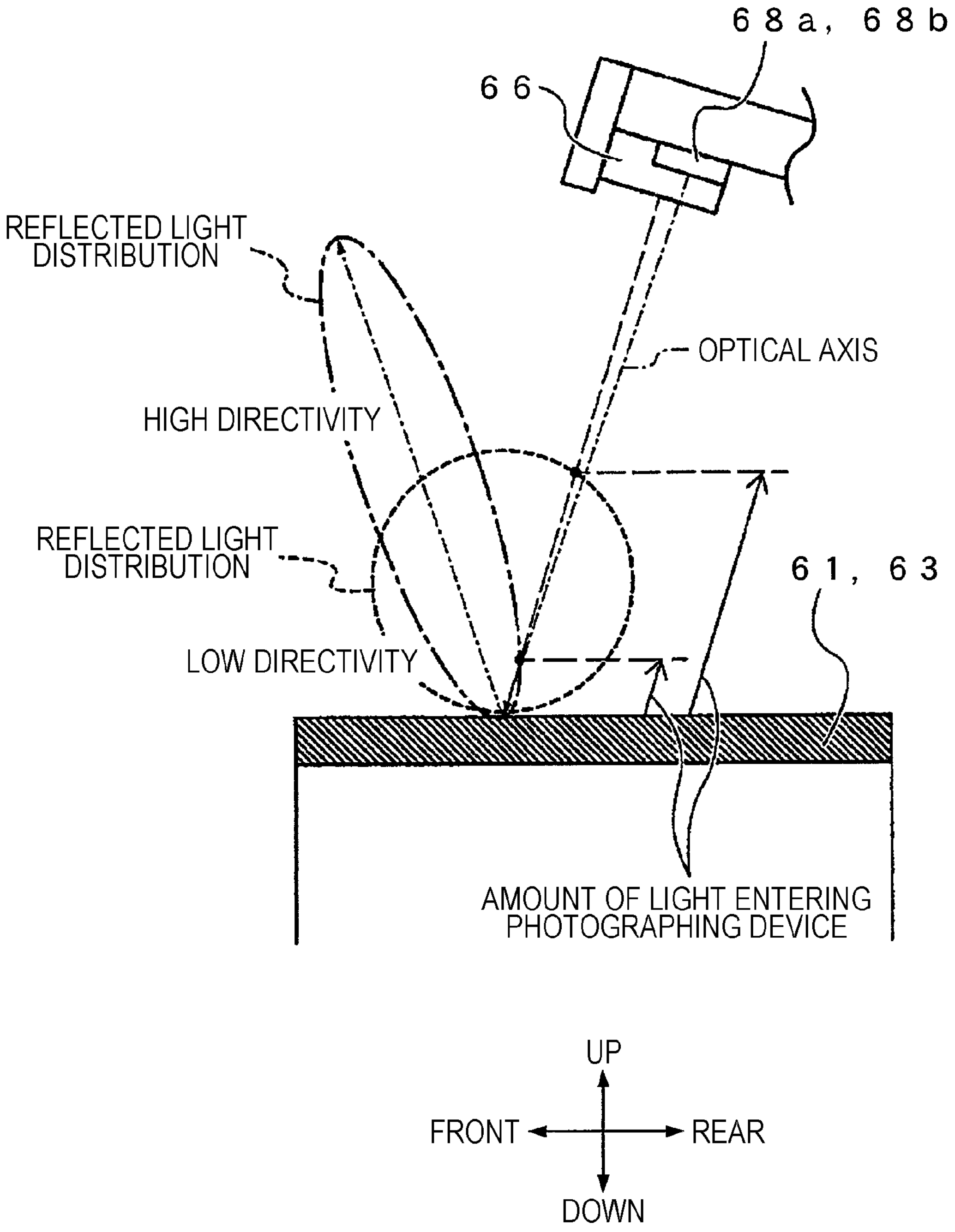
FIG. 23 is a schematic side view for explaining an amount of light entering a reading device of the external reading part of the lighting device.

FIG. 23 illustrates an amount of light incident on the reading device 66 in a case where directivity of the light sources is high and an amount of light incident on the reading device 66 in a case where directivity of the light sources is low.

In the external reading part 60, in a case where directivity of the light sources of the lighting device 68 is high, light incident on the target to be read (subject) is reflected while having directivity, and therefore the light does not diffuse and the reflected light distribution does not become wide. That is, in a case where directivity of the light sources is high, an amount of light incident on the reading device 66 is small, and it becomes dark. Meanwhile, in the external reading part 60, in a case where directivity of the light sources of the lighting device 68 is low, light incident on the target to be read (subject) is reflected without having directivity, and therefore the light diffuses and the reflected light distribution becomes wide, as compared with the case where the directivity is high.

In view of this, in the external reading part 60, an amount of light incident on the reading device 66 can be increased by setting the directivity of the light sources of the lighting device 68 to a preset value or less. It is desirable that the directivity of the light sources is, for example, set so that a ratio of reflected light to an emitted light amount is 50% or less in a case where the target to be read (subject) is irradiated with light at 45 degrees by the light sources.

In other words, it is desirable that directivity of light emitted from the light sources 68*a*, 68*b*, 68*c*, and 68*d* of the lighting device 68 is wider than a preset range.

As the light sources 68*a*, 68*b*, 68*c*, and 68*d* of the lighting device 68, light sources that emit light of a preset color temperature or more, for example, a color temperature of 5000 K (kelvin) or more are used. For example, LEDs that are white light sources can be used as the light sources 68*a*, 68*b*, 68*c*, and 68*d*.

Furthermore, each of the light sources 68*a*, 68*b*, 68*c*, and 68*d* of the lighting device 68 includes a light adjusting part that adjust brightness of emitted light and is configured such that light can be adjusted in consideration of the target to be read (subject) and external light by the light adjusting part.

Furthermore, each of the light sources 68*a*, 68*b*, 68*c*, and 68*d* of the lighting device 68 includes a motor that is an example of a varying part that varies an optical axis of emitted light.

Figure 24A:
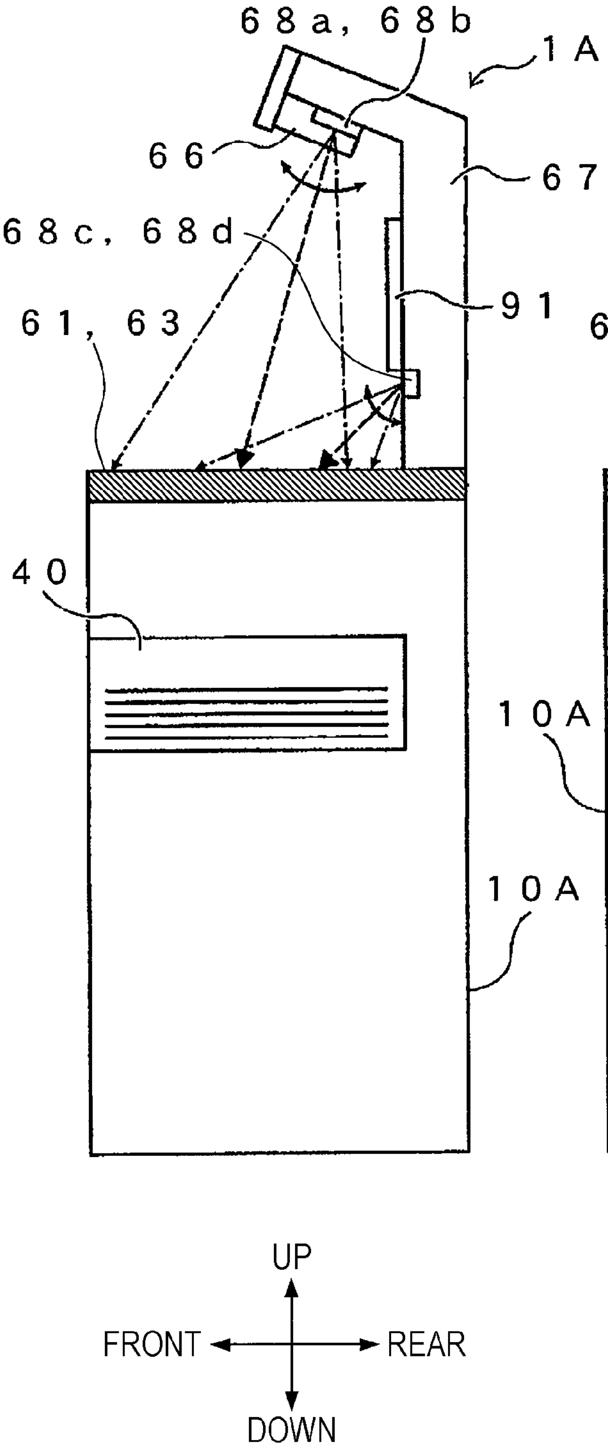
FIG. 24A is a schematic side view for explaining movable regions of the light sources of the lighting device.
Figure 24B:
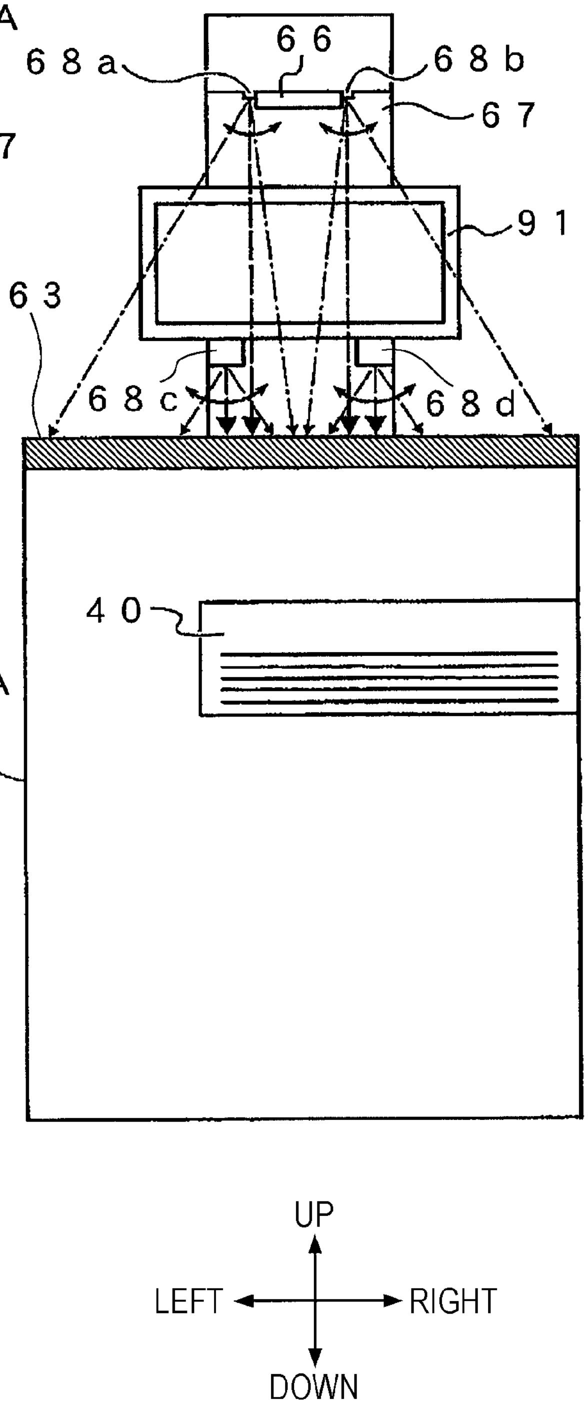
FIG. 24B is a schematic front view for explaining the movable regions of the light sources of the lighting device.

As illustrated in FIGS. 24A and 24B, the central controller 95 or the external reading control part 601 of the external reading part 60 is configured to change an angle at which a target to be read (subject) placed on the document placing surface 63 constituted by members such as the table part 61 is irradiated by varying optical axes of the light sources 68*a*, 68*b*, 68*c*, and 68*d* of the lighting device 68 by action of the motor.

Furthermore, the central controller 95 or the external reading control part 601 is configured to control on and off of the light sources 68*a*, 68*b*, 68*c*, and 68*d* of the lighting device 68.

Furthermore, the central controller 95 or the external reading control part 601 is configured to adjust light amounts, that is, brightness of light of the light sources 68*a*, 68*b*, 68*c*, and 68*d* of the lighting device 68. In this case, each of the light sources 68*a*, 68*b*, 68*c*, and 68*d* includes a light adjusting mechanism, and the light adjusting mechanism adjusts brightness of light emitted toward a target to be read (subject) under control of the central controller 95 or the external reading control part 60.

This makes it possible to adjust light so that light reflected from a target to be read (subject) becomes constant irrespective of influence of the subject and external light when the subject is read by the external reading part 60.

Each of the light sources 68*a*, 68*b*, 68*c*, and 68*d* of the lighting device 68 can be configured to vary a light-ON ratio under control of the central controller 95 or the external reading control part 601. With this configuration, a subject can be discriminated with more certainty, and more suitable image data of the subject can be acquired.

As for the light-ON ratio, for example, the light sources 68*a* and 68*b* can be turned on at a strong level at 100% and the light sources 68*c* and 68*d* can be turned off. Alternatively, all of the light sources 68*a*, 68*b*, 68*c*, and 68*d* can be turned on at a medium level at 60%. Alternatively, the light sources 68*a* and 68*b* can be turned on at a strong level at 100% and the light sources 68*c* and 68*d* can be turned on at a weak level at 30%. In this way, brightness of light with which a target to be read (subject) is irradiated can be adjusted.

Operation and Effects Produced by Detailed Configuration of External Reading Part In the external reading part 60, in a case where an A3-size document G is placed on the document placing surface 63, the boundary line K is formed at a position covered with the document G.

Accordingly, accuracy of reading of the document G can be improved as compared with a case where there is a gap line, which is a line formed in a gap between members, within the photographing range AC of the reading device 66 and outside the placed document G in the external reading part 60 that reads the document G photographed by the reading device 66 that reads the document G from above the document placing surface 63 on which the document G is placed.

Furthermore, in the external reading part 60, there is no boundary line K at a position that is not covered with the A3-size document G within the photographing range AC of the reading device 66 of the document placing surface 63.

Accordingly, accuracy of reading of the A3-size document G improves as compared with a case where the boundary line K is present at a position that is not covered with the A3-size document G within the photographing range AC of the reading device 66.

Furthermore, the external reading part 60 is configured such that the boundary line K is formed by the gap S between the table part 61 of the document placing surface 63 and the covering part 58.

Accordingly, accuracy of reading of the document G can be improved as compared with a case where the document placing surface 63 is constituted by plural members and the boundary line K is formed within the photographing range AC of the reading device 66 and outside the document G placed on the document placing surface 63.

Furthermore, the external reading part 60 is configured such that the boundary line K is formed at a position deviated from the marks M for alignment of the document G along the document placing surface 63. Accordingly, accuracy of reading of the document G can be improved as compared with a case where the boundary line K overlaps the marks M.

Furthermore, the external reading part 60 has a single boundary line K. Accordingly, the external reading part 60 looks better than in a case where plural boundary lines K are present.

Furthermore, in the external reading part 60, one of two members that constitute the document placing surface 63 is the covering part 58 that covers an upper side of members such as the reader part 55 of the document transporting reading part 50. Accordingly, a size of the external reading part 60 and a size of the image forming apparatus 1A can be reduced as compared with a case where one of the two members that constitute the document placing surface 63 is disposed between the table part 61 and the covering part 58 of the document transporting reading part 50.

Furthermore, the external reading part 60 is configured so that the table part 61 that constitutes the document placing surface 63 moves to a right side relative to the document receiving opening 58*d* of the document transporting reading part 50 and opens an upper side of the document platen 51 of the document transporting reading part 50. Accordingly, a document G of a larger size can be placed so as to straddle the document platen 51 and the table part 61 that has moved to a right side as compared with a case where the table part 61 moves in the apparatus depth direction (toward a rear side).

Furthermore, the external reading part 60 is configured such that the table part 61 moves in the apparatus width direction. Accordingly, the table part 61 can be easily moved to open the upper side of the document platen 51 as compared with a case where the table part 61 moves by rotating.

In addition, the external reading part 60 is configured such that a length of the top plate 58*a* of the covering part 58 of the document transporting reading part 50 in the apparatus width direction is shorter than a half of a length of the document placing surface 63 in the apparatus width direction. In other words, the external reading part 60 is configured such that a length of the table part 61 in the apparatus width direction is longer than a half of the length of the document placing surface 63 in the apparatus width direction.

Accordingly, a document G of a larger size can be placed so as to straddle the document platen 51 and the table part 61 as compared with a case where the length of the top plate 58*a* of the covering part 58 in the apparatus width direction is longer than the half of the length of the document placing surface 63 in the apparatus width direction.

Furthermore, in the external reading part 60, the boundary line K is formed within the photographing range AC of the reading device 66 and inside the document G on the document placing surface 63. Accordingly, occurrence of defective reading of a document G using the reading device 66 can be suppressed as compared with a case where the boundary line K is formed within the photographing range AC of the reading device 66 and outside the document G on the document placing surface 63.

In particular, the external reading part 60 is configured such that in a case where an A4-size document G equivalent to the A4-size recording media P3 that can be stored the most in the storage part 31C of the medium storage part 30A is placed on the document placing surface 63, a part of the boundary line K is covered with the document G. Accordingly, occurrence of defective reading of a document G using the reading device 66 can be suppressed as compared with a case where the boundary line K is formed within the photographing range AC of the reading device 66 and outside the document G on the document placing surface 63.

Furthermore, the image forming apparatus 1A includes the operation panel 91 that displays information toward the apparatus near side. Accordingly, the table part 61 having the upper surface 61 can be easily moved while checking contents displayed on the operation panel 91 as compared with a configuration in which the table part 61 moves to the apparatus near side in the configuration in which the image forming apparatus 1A includes the operation panel 91 that displays information toward the apparatus front side.

Figure 44A:
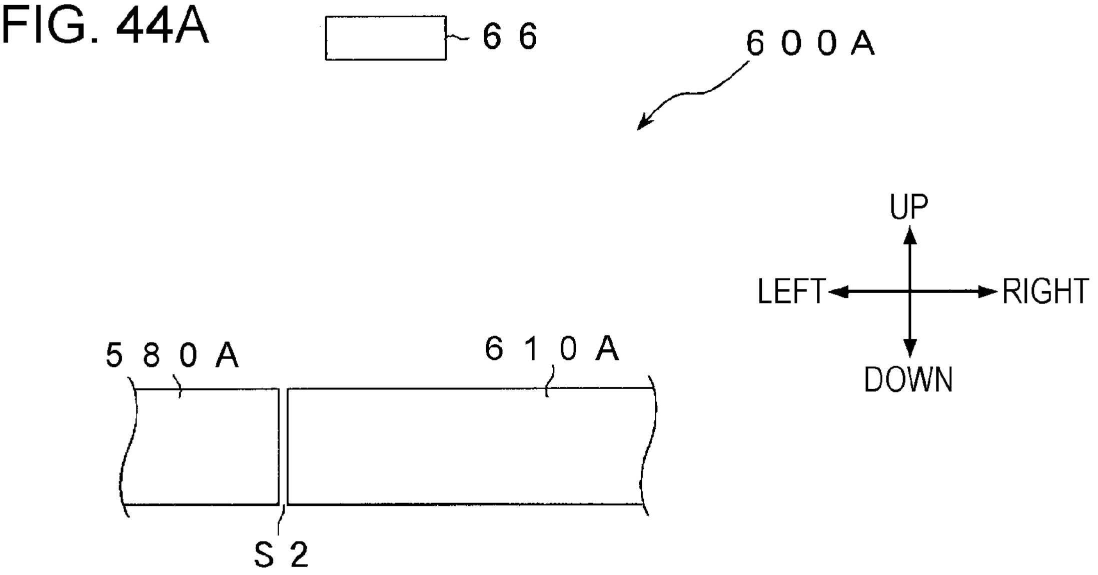
FIG. 44A illustrates a configuration of a part of a document placing table according to Comparative Example 5.

Next, operation and effects of the external reading part 60 are described as compared with an external reading part 600A according to Comparative Example 5 illustrated in FIG. 44A.

First, the external reading part 600A according to Comparative Example 5 includes a covering part 580A instead of the covering part 58 according to the first exemplary embodiment, as illustrated in FIG. 44A.

The covering part 580A according to Comparative Example 5 does not have a configuration corresponding to the protruding part 58*f* of the covering part 58 according to the first exemplary embodiment. Specifically, the covering part 580A according to Comparative Example 5 is configured such that a right-side end surface thereof faces the left-side end surface of the table part 610A in the apparatus width direction and does not overlap the left-side end surface of the table part 610A in the apparatus up-down direction. That is, the external reading part 600A does not have a configuration corresponding to the overlapping part 64 according to the first exemplary embodiment on the document placing surface 63.

Accordingly, when the covering part 580A according to Comparative Example 5 forms the document placing surface 63 together with the table part 610A, a gap S2 is formed between the right-side end surface of the covering part 580A and the left-side end surface of the table part 610A instead of the gap S according to the first exemplary embodiment. The gap S2 extends linearly along the apparatus up-down direction from the document placing surface 63 to rear surfaces of the covering part 580A and the table part 610A when viewed from the apparatus depth direction.

The external reading part 600A according to Comparative Example 5 does not have a configuration corresponding to the overlapping part 64 according to the first exemplary embodiment.

Accordingly, in the external reading part 600A according to Comparative Example 5, light that passes through the gap S2 and then is reflected by a member disposed below the covering part 580A and the table part 610A reaches the reading device 66. In this case, the gap S2 may be undesirably photographed by the reading device 66 as one having a large luminance difference or color difference relative to the document placing surface 63 depending on a color of the member disposed below the covering part 580A and the table part 610A. Accordingly, a detector may undesirably detect the gap S2 erroneously as an edge of a document G in a configuration in which edges of a document G disposed on the document placing surface 63 are detected on the basis of a luminance difference or a color difference between the document G and the document placing surface 63 in an image of the document G taken by the reading device 66.

Meanwhile, the external reading part 60 is configured such that the document placing surface 63 has the overlapping part 64.

With this configuration, even in a case where visible light H enters the gap S from the document placing surface 63 side, the visible light H reaches the upward facing surface 58*g* of the protruding part 58*f* disposed on an upper side relative to the lower edge 521 of the protruding part 58*f* of the top plate 58*a* of the covering part 58 of the document transporting reading part 50. Accordingly, in the external reading part 60, the gap S is imaged by the reading device 66 as one having a small luminance difference or color difference relative to the document placing surface 63, and therefore a possibility that the gap S is erroneously detected as an edge of a document G by the detector provided, for example, in the external reading control part 601 of the external reading part 60 is small as compared with the external reading part 600A having the gap S2 according to Comparative Example 5.

As a result, occurrence of defective detection of edges of a document G by the detector can be suppressed as compared with the external reading part 600A according to Comparative Example 5 in a configuration in which the external reading part 60 detects edges of a document G placed on the document placing surface 63 on the basis of a luminance difference or a color difference between the document placing surface 63 and the document G.

Figure 44B:
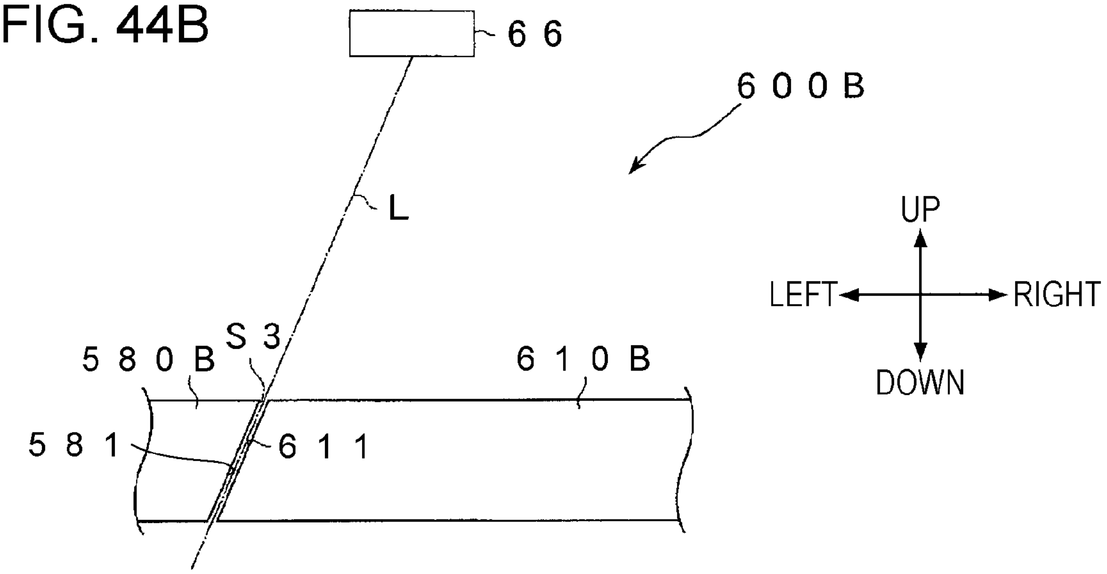
FIG. 44B illustrates a configuration of a part of a document placing table according to Comparative Example 6.

Next, operation and effects of the external reading part 60 are described as compared with an external reading part 600A according to Comparative Example 6 illustrated in FIG. 44B.

First, the external reading part 600B according to Comparative Example 6 includes a covering part 580B and a table part 610B instead of the covering part 58 and the table part 61 according to the first exemplary embodiment, as illustrated in FIG. 44B.

A right-side end surface 581 of the covering part 580B and a left-side end surface 611 of the table part 610B face each other on a left side relative to the reading device 66. Furthermore, the right-side end surface 581 of the covering part 580B and the left-side end surface 611 of the table part 610B are inclined leftward from an upper side toward a lower side when viewed from the apparatus depth direction. When the covering part 580B and the table part 610B form the document placing surface 63, the right-side end surface 581 of the covering part 580B is disposed on an upper side relative to the left-side end surface 611 of the table part 610B and overlaps the left-side end surface 611 of the table part 610B in the apparatus up-down direction. That is, the external reading part 600B according to Comparative Example 6 has an overlapping part.

A gap S3 formed between the right-side end surface 581 of the covering part 580B and the left-side end surface 611 of the table part 610B extends in a straight line inclined leftward from the upper side toward the lower side when viewed from the apparatus depth direction. In the external reading part 600B, in a case where visible light enters the gap S3 from the reading device 66, the visible light linearly reaches a lower edge of the end surface 581 of the covering part 580B and a lower edge of the end surface 611 of the table part 610B. That is, the external reading part 600B according to Comparative Example 6 has a configuration in which visible light can linearly reach a lower end of the overlapping part from the reading device 66.

Since the external reading part 600B according to Comparative Example 6 has a configuration in which visible light can linearly reach the lower end of the overlapping part from the reading device 66, visible light L entering the gap S3 from the reading device 66 reaches a lower side relative to the covering part 580B and the table part 610B without being blocked. In this case, the gap S3 may be undesirably imaged by the reading device 66 as one having a large luminance difference or color difference relative to the document placing surface 63. Accordingly, the gap S3 may be undesirably detected erroneously as an edge of a document G by a detector in a configuration in which only edges of a document G placed on the document placing surface 63 are detected on the basis of a luminance difference or a color difference between the document G and the document placing surface 63 in an image of the document G taken by the reading device 66.

Meanwhile, as illustrated in FIG. 20, the external reading part 60 is configured such that the table part 61 is disposed on the virtual straight line KC connecting the lower edge 58*j* of the protruding part 58*g* of the covering part 58 of the document transporting reading part 50 and the reading device 66.

Accordingly, visible light travelling from the reading device 66 toward the lower edge 58*j* along the virtual straight line KC connecting the reading device 66 and the lower edge 58*j* of the protruding part 58*g* of the covering part 58 is blocked by the table part 61. Furthermore, visible light that enters the gap S from the reading device 66 reaches the upward facing surface 58*h* of the protruding part 58*f*, as described above. With this configuration, occurrence of defective detection of edges of a document G by the detector can be suppressed as compared with the external reading part 600B according to Comparative Example 6 in a configuration in which the external reading part 60 detects edges of a document G placed on the document placing surface 63 on the basis of a luminance difference or a color difference between the document placing surface 63 and the document G.

Figure 44C:
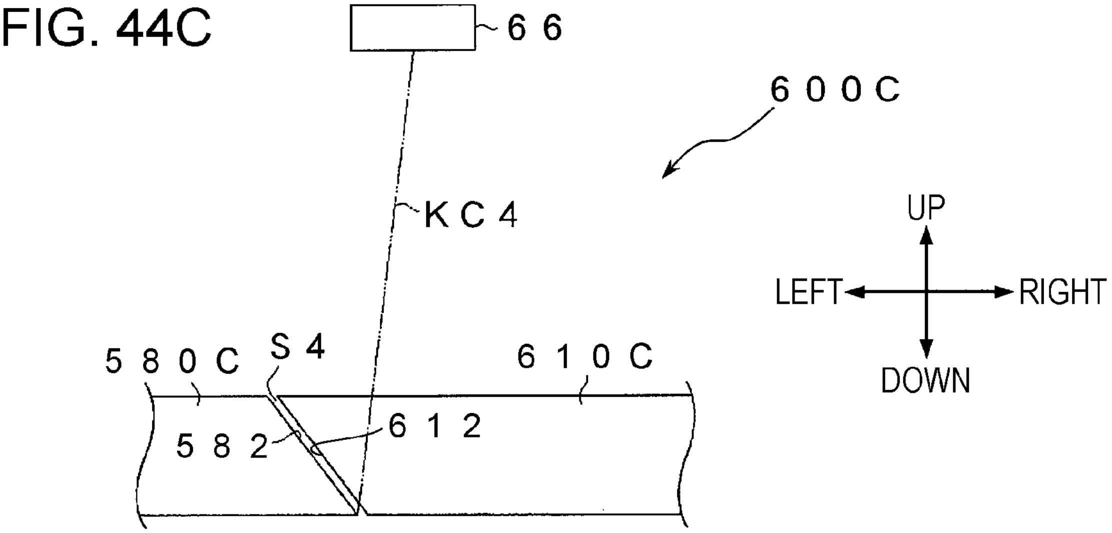
FIG. 44C illustrates a configuration of a part of a document placing table according to Comparative Example 7.

Next, operation and effects of the external reading part 60 are described as compared with an external reading part 600C according to Comparative Example 7 illustrated in FIG. 44C.

First, the external reading part 600C according to Comparative Example 7 includes a covering part 580C and a table part 610C instead of the covering part 58 and the table part 61 according to the first exemplary embodiment, as illustrated in FIG. 44C.

A right-side end surface 582 of the covering part 580C and a left-side end surface 612 of the table part 610C face each other on a left side relative to the reading device 66. Furthermore, the right-side end surface 582 of the covering part 580C and the left-side end surface 612 of the table part 610C are inclined rightward from an upper side toward a lower side when viewed from the apparatus depth direction. When an upper surface of the covering part 580C and an upper surface of the table part 610C form the document placing surface 63, a right-side end portion of the covering part 580C is disposed on a lower side relative to a left-side end portion of the table part 610C and overlaps the left-side end portion of the table part 610C in the apparatus up-down direction. That is, the external reading part 600C according to Comparative Example 7 has an overlapping part. A gap S4 formed between the right-side end surface 582 of the covering part 580C and the left-side end surface 612 of the table part 610C extends in a straight line inclined rightward from the upper side toward the lower side when viewed from the apparatus depth direction.

In the external reading part 600C according to Comparative Example 7, visible light travelling from the reading device 66 to a lower end of the gap S4 along a virtual straight line KC4 connecting the reading device 66 and the lower end of the gap S4 is blocked by the table part 610C. However, light entering the gap S4 from the reading device 66 deflects along the straight gap S4 and reaches a side below the covering part 580C and the table part 610C. As a result, the gap S4 may be undesirably detected erroneously as an edge of a document G by a detector.

Meanwhile, the external reading part 60 has the gap S extending in a non-straight manner from the document placing surface 63 to a side below the document placing surface 63 when viewed from the apparatus depth direction, as illustrated in FIGS. 8B and 20. With this configuration, occurrence of defective detection of edges of a document G by the detector can be suppressed as compared with the external reading part 600C according to Comparative Example 7 in a configuration in which the external reading part 60 detects edges of a document G placed on the document placing surface 63 on the basis of a luminance difference or a color difference between the document placing surface 63 and the document G. Note that the external reading part 600C according to Comparative Example 7 is encompassed within the technical idea of the present disclosure as a modification of the first exemplary embodiment.

Furthermore, the external reading part 60 according to the first exemplary embodiment is configured such that the protruding part **58*f* of the covering part 58 of the document transporting reading part 50 is integrally formed as a part of the covering part 58. Accordingly, the number of components in the external reading part 60 is smaller than a configuration in which the protruding part 58*f* is a member separate from the covering part 58**.

Furthermore, since the protruding part **58*f* of the covering part 58 is integrally formed as a part of the covering part 58, the protruding part 58*f* is made of the same material as the covering part 58. That is, the protruding part 58*f* has the same surface roughness and surface color as the covering part 58. Accordingly, a color difference between the surface of the protruding part 58*f* and the upper surface of the top plate 58*a* of the covering part 58 is smaller than a color difference between the protruding part provided separately from the covering part 58 and the upper surface of the covering part 58. Accordingly, a color difference between the surface of the protruding part 58*f* and the document G is equivalent to a color difference between the upper surface of the covering part 58 and the document G. As a result, occurrence of defective detection of edges of a document G by the detector can be suppressed as compared with a configuration in which the protruding part 58*f* is made of a material different from the covering part 58**.

Furthermore, the external reading part 60 is configured such that a color difference between the overlapping part 64 and the covering part 58 and the table part 61, all of which have a black surface, is smaller than a color difference between the covering part 58 and the table part 61, which have a black surface, and a document G whose base color is white. Accordingly, the external reading part 60 can suppress occurrence of defective detection of edges of a document G by the detector as compared with a configuration in which a color difference between the overlapping part 64 and the document placing surface 63 is larger than a color difference between the document placing surface 63 and a document G. Note that the color of the document placing surface 63 is a color detected as a color of the document placing surface 63 by the reading device 66 and need not necessarily a color of the document placing surface 63 itself. Furthermore, the color of a document G is a color detected as a color of the document G by the reading device 66 and need not necessarily a color of the document G itself.

The image forming apparatus 1A according to the first exemplary embodiment further includes the document transporting reading part 50 in addition to the external reading part 60. Accordingly, the image forming apparatus 1A can use not only the external reading part 60 but also the document transporting reading part 50 to read a document G.

Furthermore, the image forming apparatus 1A is configured such that the covering part 58 of the document transporting reading part 50 constitutes a part of the document placing surface 63. This makes it possible to reduce a size of the image forming apparatus 1A as compared with a case where one of two members constituting the document placing surface 63 is disposed between the table part 61 and the covering part 58.

Furthermore, the image forming apparatus 1A includes the document transporting reading part 50 that transports a document G from the document receiving opening **58*d* adjacent to the document platen 51 on a left side and the table part 61 of the external reading part 60 that can move to a right side relative to the document transporting reading part 50 and open an upper side of the document platen 51. Accordingly, a document G of a larger size can be placed so as to straddle the document platen 51 and the table part 61 that has moved to the right side as compared with a case where the table part 61 of the external reading part 60 moves in the apparatus depth direction (toward a rear side) in the configuration in which the image forming apparatus 1A includes the document transporting reading part 50**.

Furthermore, the image forming apparatus 1A is configured such that the table part 61 of the external reading part 60 moves in the apparatus width direction by sliding. Accordingly, the table part 61 can be easily moved to open an upper side of the document platen 51 as compared with a case where the table part 61 moves by rotating.

Furthermore, the image forming apparatus 1A is configured such that the covering part 58 of the document transporting reading part 50 has the protruding part 58*f* that can support, from a lower side, the table part 61 of the external reading part 60. Accordingly, in the image forming apparatus 1A, load bearing of the table part 61 in a state where the upper side of the document platen 51 is closed can be improved as compared with a configuration in which the table part 61 supports the covering part 58 from a lower side in the overlapping part.

Furthermore, the image forming apparatus 1A can suppress occurrence of defective reading of a document G using the reading device 66 of the external reading part 60 as compared with a configuration in which the external reading part 600A according to Comparative Example 4 is provided.

Furthermore, the image forming apparatus 1A includes the operation panel 91 that displays information on the image forming apparatus 1A toward the front face Ft side. Accordingly, in the image forming apparatus 1A, it is easier to move the table part 61 while checking contents displayed on the operation panel 91 than in a configuration in which the table part 61 of the document transporting reading part 50 moves toward the front face Ft side (front side) in the configuration in which the image forming apparatus 1A includes the operation panel 91 that displays information toward the front face Ft side.

Image Forming Unit

In the image forming apparatus 1A according to the first exemplary embodiment, the photoconductor drum 21 needs to be replaced with a new one in a case where a photoconductor layer or the like of the photoconductor drum 21 wears as a result of image formation operation and the photoconductor drum 21 comes to the end of its life. Furthermore, in the image forming apparatus 1A, the developing device 24 is replaced with a new one, for example, in a case where a developer in the developing device 24 deteriorates and the developing device 24 comes to the end of its life.

Accordingly, in the image forming apparatus 1A, yellow (Y), magenta (M), cyan (C), and black (K) image forming parts 20Y, 20M, 20C, and 20K are provided as units. As illustrated in FIG. 4B, each of the image forming parts 20Y, 20M, 20C, and 20K includes a photoconductor drum unit 200 as an example of a customer replacement unit (CRU) including the photoconductor drum 21, the charging device 22, and the drum cleaning device 27 in an integrated manner and a developing device unit 300 constituted by the developing device 24 alone. Note that the exposure device 23 is attached to the housing 10A, which is an apparatus body of the image forming apparatus 1A.

The yellow (Y), magenta (M), cyan (C), and black (K) photoconductor drum units 200 (Y, M, C, and K) and developing device units 300 (Y, M, C, and K) are attachable and detachable to and from the housing 10 independently of one another.

Figure 25:
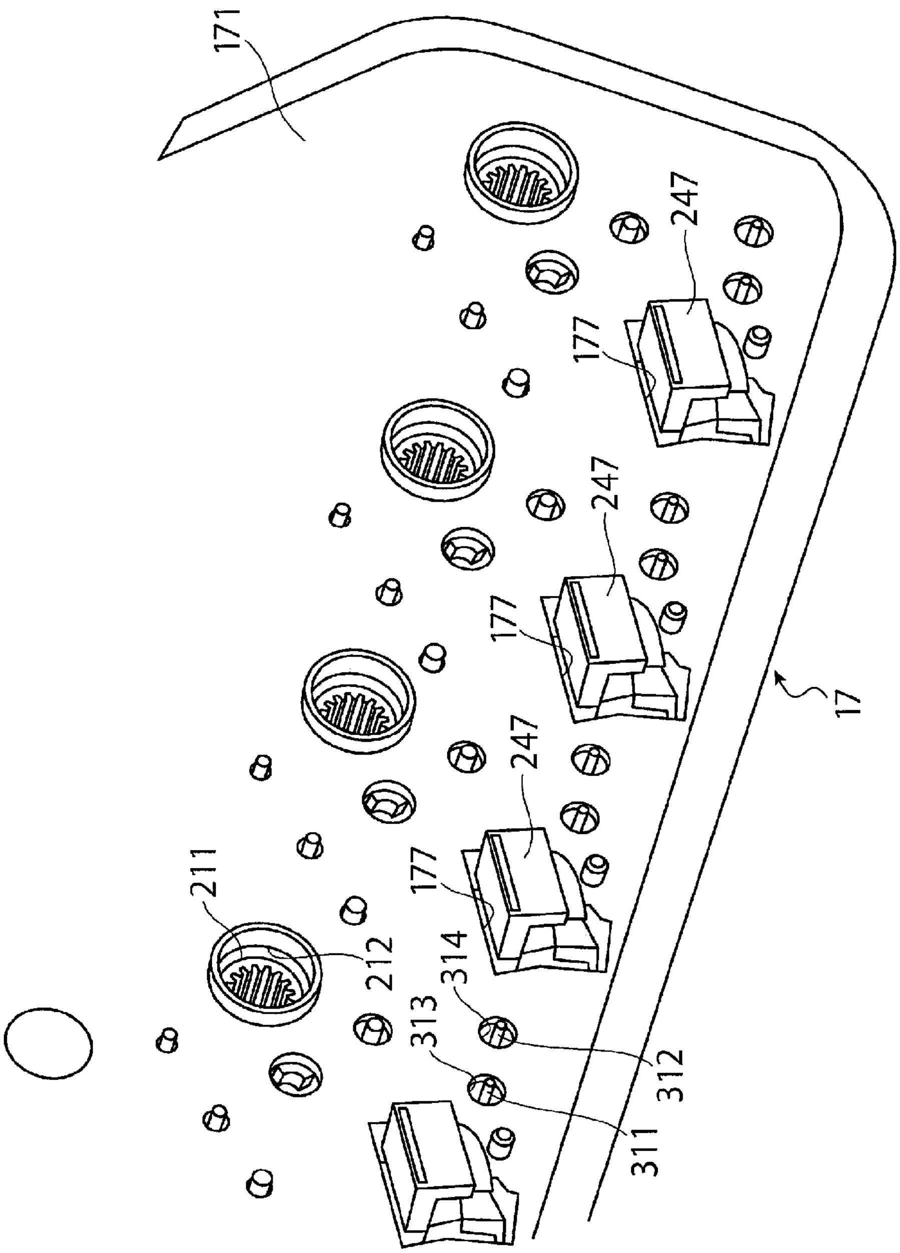
FIG. 25 is a schematic perspective view of an inner frame of the image forming apparatus of FIG. 1.

The photoconductor drum units 200 (Y, M, C, and K) and developing device units 300 (Y, M, C, and K) are attached by being pushed into the housing 10A from the front face side toward the rear (rear face) side of the housing 10A along a direction opposite to arrow Q (FIG. 2) by using a guide rail, which is an example of a guide part (not illustrated) provided in the housing 10A. As illustrated in FIG. 25, a position determining member 211 and plural position determining pins 311 and 312 to be fixed at predetermined operation positions are provided on a rear face side of the photoconductor drum unit 200 and the developing device unit 300 so as to protrude toward rear surfaces of the photoconductor drum unit 200 and the developing device unit 300. Furthermore, an inner frame 17 provided corresponding to positions of the photoconductor drum unit 200 and the developing device unit 300 has position determining holes 212, 313, and 314 into which the position determining member 211 and the position determining pins 311 and 312 are to be inserted. After the positions of the photoconductor drum unit 200 and the developing device unit 300 are determined at the operation positions, the photoconductor drum unit 200 and the developing device unit 300 are fixed at the operation positions by a fixing part (not illustrated).

Figure 26:
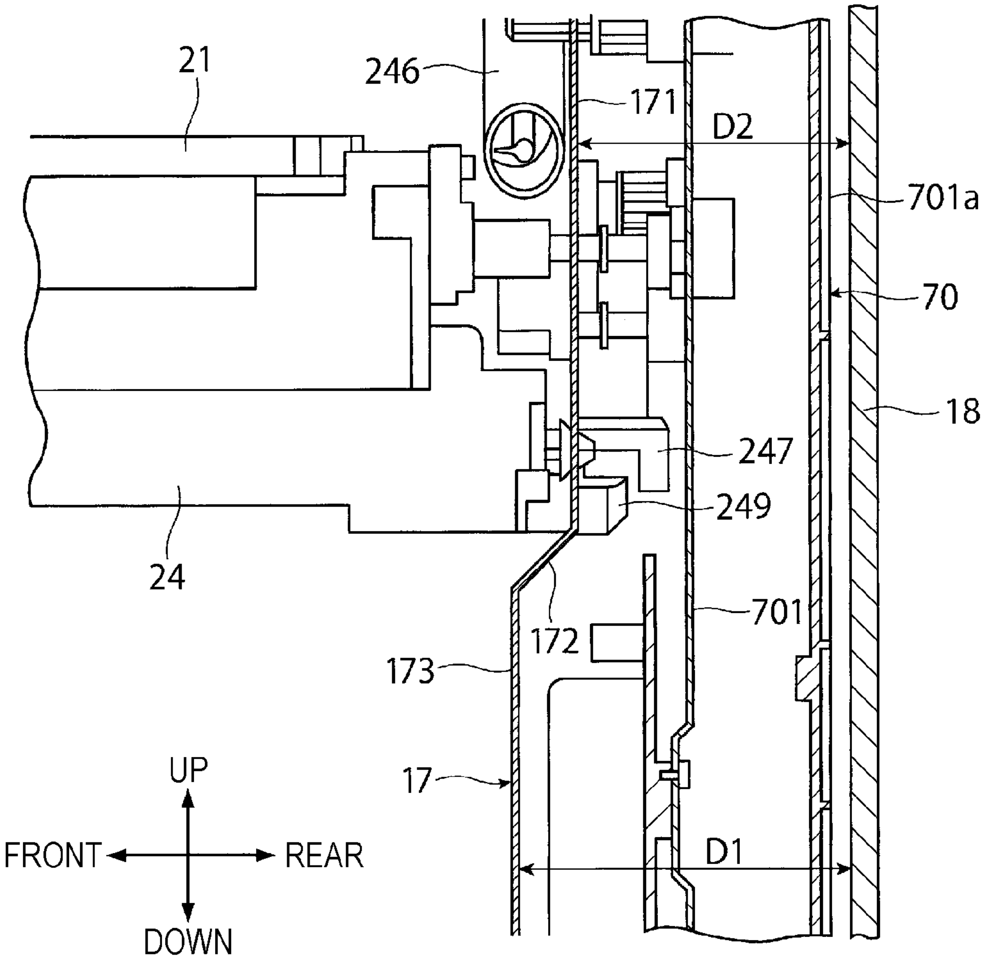
FIG. 26 is a schematic cross-sectional view of members such as a driving device of the image forming apparatus of FIG. 1.

Toner of a corresponding color is supplied from a toner cartridge (not illustrated) disposed above the intermediate transfer device 25 is supplied to each of the developing devices 24 (Y, M, C, and K) of the developing device units 300 (Y, M, C, and K) at a predetermined timing. Toner of the respective colors contained in the toner cartridges is transported toward the rear side of the housing 10A. As illustrated in FIG. 26, a supply pipe 246 that extends downward is connected to an end portion along a rear surface of the toner cartridge. As illustrated in FIGS. 25 and 26, a connecting part 247 that is an example of a protruding part that is connected to the developing device 24 (Y, M, C, or K) and supplies toner is provided at a lower end portion of the supply pipe 246. The connecting part 247 is provided with a first shutter member (not illustrated) that is attached so as to be openable and closable and normally closes a supply hole (not illustrated) opened at the lower end portion of the supply pipe 246. As illustrated in FIG. 26, the connecting part 247 is disposed so as to protrude from an opening portion 177 (see FIG. 25) provided in the inner frame 17 of the housing 10A toward the rear side of the housing 10A.

Configuration of Driving Device

Figure 27A:
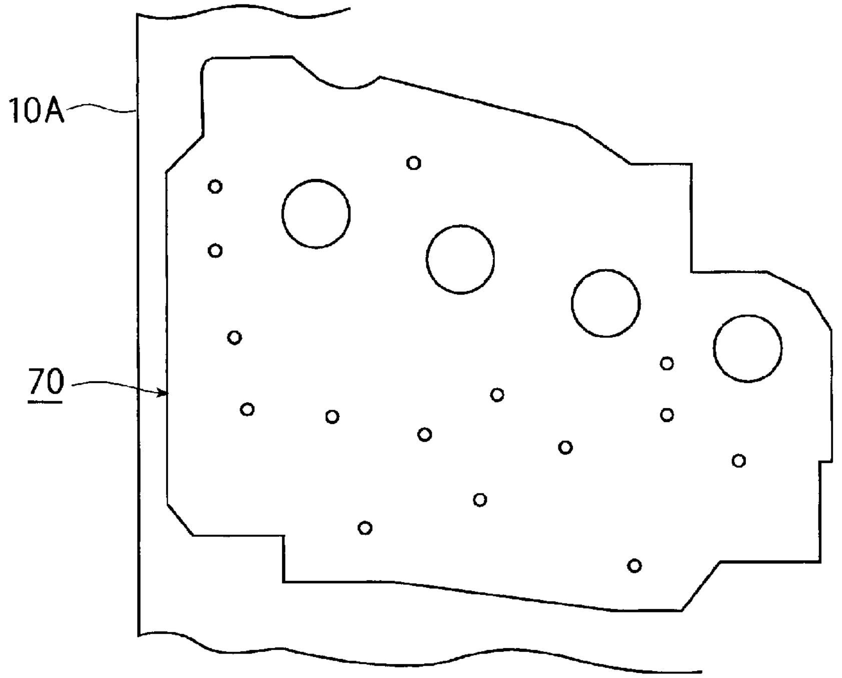
FIG. 27A is a schematic rear view of members such as the driving device.

As illustrated in FIG. 27A, the driving device 70 that drives the image forming parts 20Y, 20M, 20C, and 20K and the intermediate transfer device 25 of the image forming apparatus 1A is attached to the rear face of the housing 10A corresponding to the rear face (rear) side of the image forming parts 20Y, 20M, 20C, and 20K and the intermediate transfer device 25.

FIG. 27A illustrates a state where a rear face exterior covering that is an example of an exterior covering located on the rear face side of the image forming apparatus 1A has been detached. The rear face exterior covering is disposed on an outer side of the housing 10A relative to the inner frame 17 and the driving motor and covers at least the inner frame 17 and the driving motor.

Figure 27B:
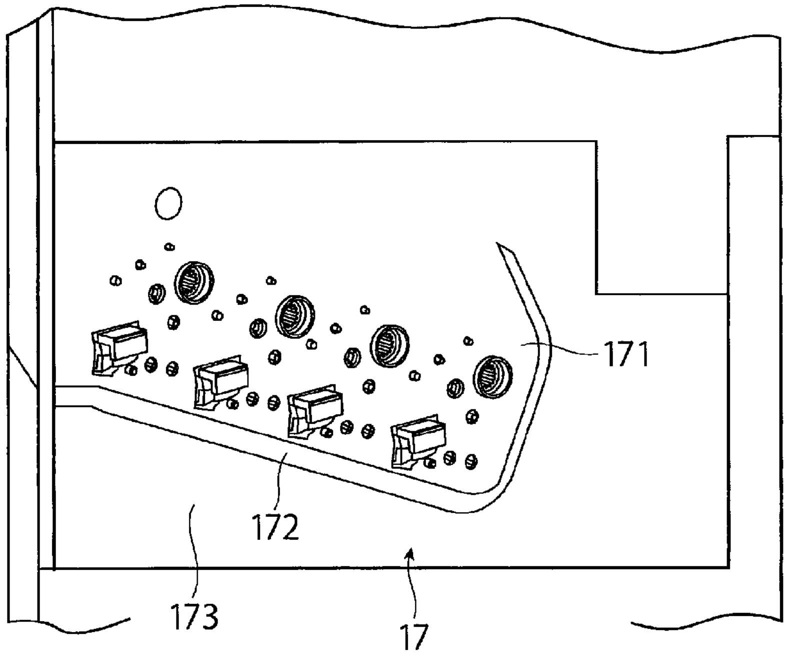
FIG. 27B is a schematic perspective view of members such as the inner frame and the driving device.

Before description of the driving device 70, the housing 10A of the image forming apparatus 1A includes the inner frame 17 inside the housing 10A on the rear side, as illustrated in FIG. 27B.

The inner frame 17 is formed by pressing (drawing) a metal plate so as to have a first part 171 having a flat plate shape and disposed in proximity and parallel with the rear face exterior covering 18 (see FIG. 26) of the housing 10A and a second part 173 having a flat plate shape disposed on an inner side of the housing 10A relative to the first part 171 with a drawn part 172 inclined with respect to the first part 171 interposed therebetween.

The first part 171 of the inner frame 17 is provided at a position corresponding to the rear face sides of the image forming parts 20Y, 20M, 20C, and 20K and the intermediate transfer device 25. The second part 173 of the inner frame 17 is provided at a position below and beside the image forming parts 20Y, 20M, 20C, and 20K and the intermediate transfer device 25. The first part 171 and the second part 173 of the inner frame 17 are disposed parallel with the rear face exterior covering 18.

An interval D1 between the second part 173 of the inner frame 17 and the rear face exterior covering 18 is set larger than an interval D2 between the first part 171 and the rear face exterior covering 18 (D1>D2), as illustrated in FIG. 26. A lower end portion of the drawn part 172 of the inner frame 17 has an inclination angle similar to the inclination of the image forming parts 20Y, 20M, 20C, and 20K.

The first part 171 and the second part 173 of the inner frame 17 are not limited to ones having a flat plate shape and encompasses a wide variety of parts such as an uneven part and a part disposed obliquely. Furthermore, the first part 171 and the second part 173 of the inner frame 17 need not necessarily be disposed parallel with the rear face exterior covering 18 and may be disposed at an angle with respect to the rear face exterior covering 18.

Furthermore, the first part 171 and the second part 173 of the inner frame 17 need not necessarily be formed integrally, and the first part 171 and the second part 173 may be formed by using different metal plates or the like and be coupled integrally with each other or configured as separate bodies.

As illustrated in FIG. 27A, the driving device 70 has a substantially rectangular flattened box shape whose length (thickness) along the apparatus rearward direction is relatively short (thin). The driving device 70 has a device substrate 701 is disposed on one side face of the housing 10A so as to stand along the upward direction, as illustrated in FIG. 26. An end surface of the driving device 70 on the rear face side of the housing 10A is covered with a device covering 701*a*.

Figure 28A:
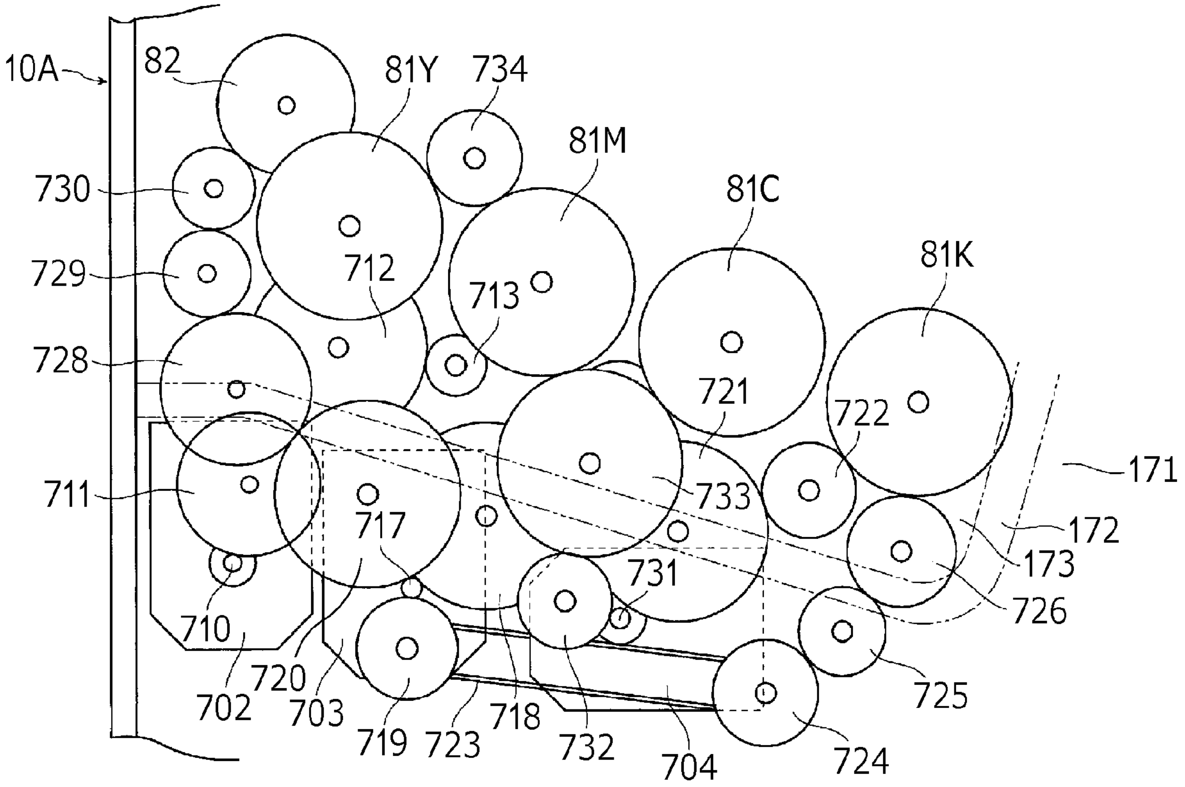
FIG. 28A illustrates an inside of the driving device.

As illustrated in FIG. 28A, the driving device 70 includes a first driving motor 702 as an example of a driving part (driving source) that drives the yellow (Y), magenta (M), and cyan (C) developing devices 24 (Y, M, and C). Furthermore, the driving device 70 includes a second driving motor 703 as an example of a driving part (driving source) that drives the intermediate transfer belt 251, the black (K) photoconductor drum 21K, and black (K) developing device 24K. Furthermore, the driving device 70 includes a third driving motor 704 as an example of a driving part (driving source) that drives the yellow (Y), magenta (M), and cyan (C) photoconductor drums 21 (Y, M, and C). In the first exemplary embodiment, the first to third driving motors 702 to 704 are attached to the device substrate 701.

The first to third driving motors 702 to 704 have similar configurations.

Figure 28B:
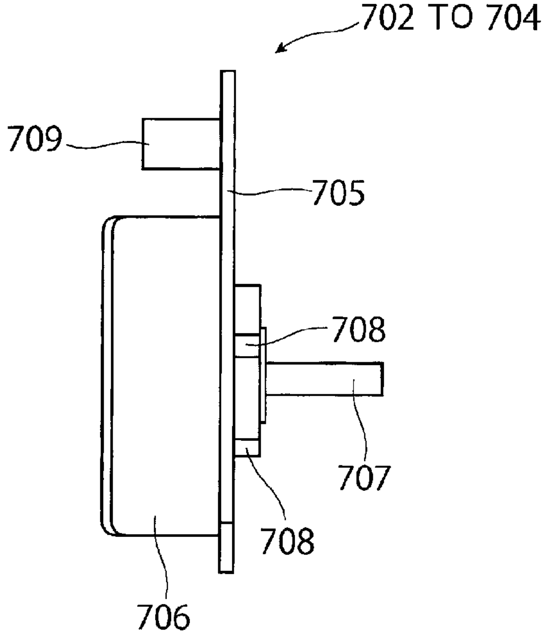
FIG. 28B illustrates a state where a driving motor is attached in the driving device.

As illustrated in FIG. 28B, each of the first to third driving motors 702 to 704 includes a substrate 705 having a flat substantially rectangular shape. A motor body 706 that is an example of a driving part body constituted by a motor including a deceleration mechanism is provided on a rear surface of the substrate 705 so as to protrude in a short columnar shape. Furthermore, a drive shaft 707 is disposed on a front surface of the substrate 705 so as to protrude from the motor body 706 toward one direction. Three female screw parts for attachment 708 for attachment of a corresponding one of the first to third driving motors 702 to 704 are provided around an outer circumference of the drive shaft 707 along a circumferential direction. As illustrated in FIG. 28B, a columnar boss 709 that determines a position of a corresponding one of the first to third driving motors 702 to 704 is provided.

Each of the first to third driving motors 702 to 704 drives the drive shaft 707 to rotate at a predetermined number of rotation by driving a rotary shaft of the built-in motor (not illustrated) to rotate and decelerating rotation of the rotary shaft by the built-in deceleration mechanism. Note that the first to third driving motors 702 to 704 may be configured not to include the deceleration mechanism.

As illustrated in FIG. 28A, the first to third driving motors 702 to 704 are disposed on the second part 173 of the inner frame 17.

The first driving motor 702 is disposed on an upper portion of a left side end of the second part 173 of the inner frame 17 so as to face downward when viewed from the rear face. The second driving motor 703 is disposed adjacent to the first driving motor 702 on a slightly lower side relative to the first driving motor 702 so as to face downward. The third driving motor 704 is slightly away from the second driving motor 703 toward a central part and is disposed horizontally on a lower side relative to the second driving motor 703 so as to face the second driving motor 703.

Each of the first to third driving motors 702 to 704 is disposed so that the drive shaft 707 protrudes from the motor body 706 toward the rear face exterior covering 18. Each of the first to third driving motors 702 to 704 is configured such that a length over which the driving motor can be mounted along an axial direction of the drive shaft 707 is larger than the interval D2 (see FIG. 26) between the first part 171 of the inner frame 17 and the rear face exterior covering 18.

As illustrated in FIG. 28A, the drive shaft 707 of the first driving motor 702 is configured as a drive gear 710 such as a helical gear or a spur gear.

The drive gear 710 of the first driving motor 702 is engaged with a first transmission gear 711 that transmits rotary driving force to the yellow (Y), magenta (M), and cyan (C) developing devices 24 (Y, M, and C).

Figure 29:
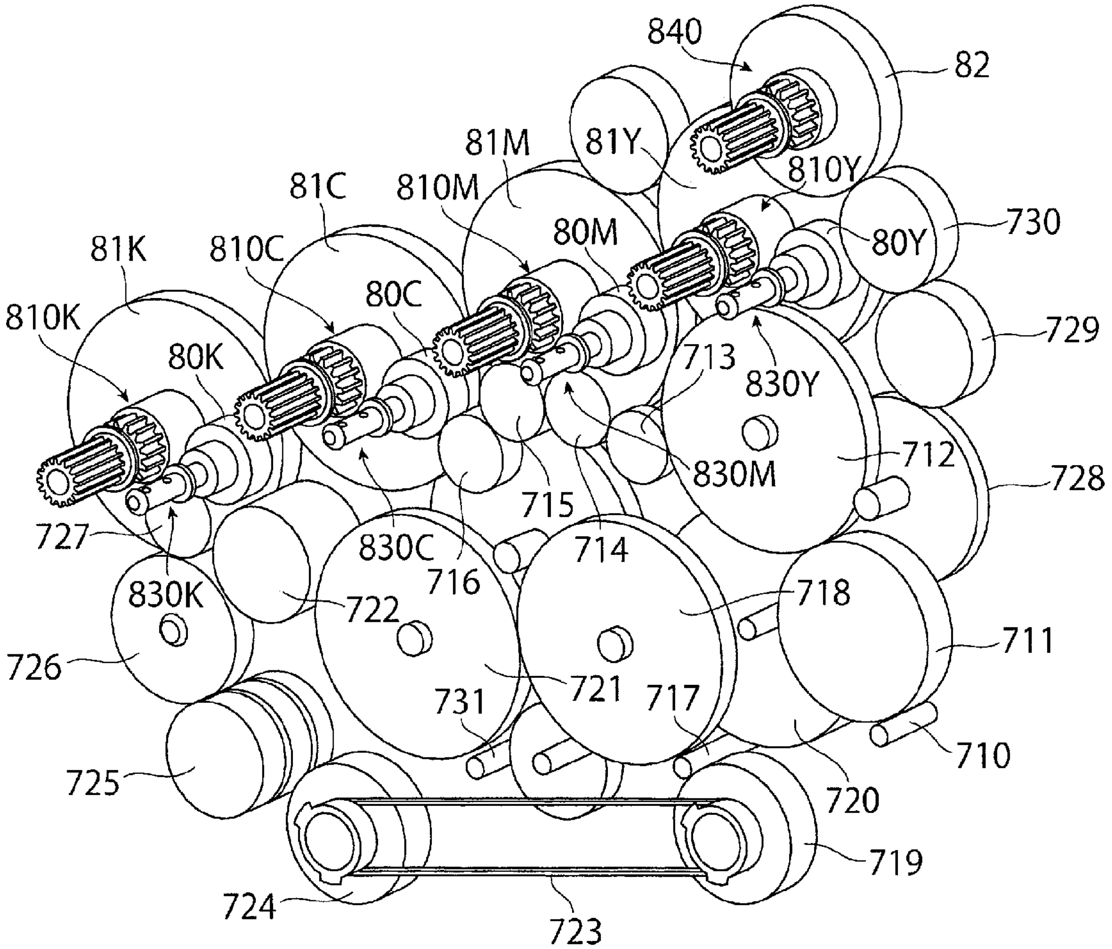
FIG. 29 is a perspective view illustrating an inside of the driving device.

As illustrated in FIG. 29, the first transmission gear 711 is engaged with a second transmission gear 712 disposed on an inner side of the housing 10A and having a relatively large diameter.

The second transmission gear 712 is engaged with a developing device drive gear 80Y disposed at a position corresponding to an end portion of the yellow (Y) developing device 24Y along an axial direction thereof. Furthermore, the second transmission gear 712 is engaged with a developing device drive gear 80M disposed at a position corresponding to an end portion of the magenta (M) developing device 24M along an axial direction thereof with third and fourth transmission gears 713 and 714 having relatively small external diameters interposed therebetween.

Furthermore, the fourth transmission gear 714 is engaged with a developing device drive gear 80C disposed at a position corresponding to an end portion of the cyan (C) developing device 24C along an axial direction thereof with fifth and sixth transmission gears 715 and 716 having relatively small external diameters interposed therebetween.

Therefore, when the first driving motor 702 of the driving device 70 is driven to rotate, the developing device drive gears 80 (Y, M, and C) disposed at positions corresponding to the end portions of the yellow (Y), magenta (M), and cyan (C) developing devices 24 (Y, M, and C) along axial directions thereof are driven to rotate.

As illustrated in FIG. 28A, the drive shaft 707 of the second driving motor 703 is configured as a drive gear 717 such as a helical gear or a spur gear.

The drive gear 717 of the second driving motor 703 is engaged with a seventh transmission gear 718 that transmits rotary driving force to the black (K) photoconductor drum unit 200K, a first transmission pulley 719 that transmits rotary driving force to the black (K) developing device 24K, and an eighth transmission gear 720 that transmits rotary driving force to a belt support roller serving as a driving roller for the intermediate transfer device 25.

The seventh transmission gear 718 is engaged with a ninth transmission gear 721 having a relatively large external diameter and a tenth transmission gear 722 having a relatively small external diameter.

The tenth transmission gear 722 is engaged with a photoconductor drive gear 81K disposed at a position corresponding to an end portion of the black (K) photoconductor drum 21K along an axial direction thereof.

Furthermore, rotary driving force of the first transmission pulley 719 is transmitted to the second transmission pulley 724 through a timing belt 723.

The first and second transmission pulleys 719 and 724 are pulleys with gears engaged with the timing belt 723. The second transmission pulley 724 is engaged with a developing device drive gear 80K disposed at a position corresponding to an end portion of the black (K) developing device 24K along an axial direction thereof with eleventh to thirteenth transmission gears 725 to 727 interposed therebetween. Note that the eleventh transmission gear 725 has plural transmission gears along an axial direction in an integrated manner and is configured to be capable of also transmitting driving force along the axial direction.

The eighth transmission gear 720 is engaged with a fourteenth transmission gear 728 having a relatively small external diameter and an intermediate transfer body drive gear 82 disposed at a position corresponding to an end portion of the driving roller 257 along an axial direction thereof, which is the belt support roller of the intermediate transfer device 25, with fifteenth and sixteenth transmission gears 729 and 730 having a relatively smaller external diameter interposed therebetween.

Accordingly, when the second driving motor 703 of the driving device 70 is driven to rotate, the developing device drive gear 80K disposed at a position corresponding to the end portion of the black (K) developing device 24K along an axial direction thereof and the photoconductor drive gear 81K disposed at a position corresponding to the end portion of the black (K) photoconductor drum 21K along an axial direction thereof are driven to rotate. Furthermore, when the second driving motor 703 is driven to rotate, the intermediate transfer body drive gear 82 disposed at a position corresponding to the end portion of the driving roller 257 of the intermediate transfer device 25 along an axial direction thereof is driven to rotate.

Furthermore, as illustrated in FIG. 28A, the drive shaft 707 of the third driving motor 704 is configured as a drive gear 731 such as a helical gear or a spur gear.

The drive gear 731 of the third driving motor 704 is engaged with a seventeenth transmission gear 732 that transmits rotary driving force to the yellow (Y), magenta (M), and cyan (C) photoconductor drums 21 (Y, M, and C). The seventeenth transmission gear 732 is engaged with photoconductor drive gears 81 (M and C) disposed at positions corresponding to end portions of the magenta (M) and cyan (C) photoconductor drums 21 (M and C) along axial directions thereof. The photoconductor drive gear 81M of the magenta (M) photoconductor drum 21M is engaged with a photoconductor drive gear 81Y disposed at a position corresponding to an end portion of the yellow (Y) photoconductor drum 21Y along an axial direction thereof with an eighteenth transmission gear 734 having a relatively small external diameter interposed therebetween.

Accordingly, when the third driving motor 704 of the driving device 70 is driven to rotate, the photoconductor drive gears 81 (Y, M, and C) disposed at positions corresponding to end portions of the photoconductor drums 21 (Y, M, and C) along the axial directions thereof are driven to rotate.

As illustrated in FIG. 29, the driving device 70 includes photoconductor master couplings 810 (Y, M, C, and K) and developing device master couplings 830 (Y, M, C, and K) as examples of first and second coupling transmission parts disposed so as to be movable along the axial directions of the photoconductor drive gears 81 (Y, M, C, and K) and the developing device drive gear 80 (Y, M, C, and K).

Furthermore, the driving device 70 includes an intermediate transfer device master coupling 840 as an example of a third coupling transmission part disposed so as to be movable along an axial direction of the driving roller 257 of the intermediate transfer device 25.

Figure 30:
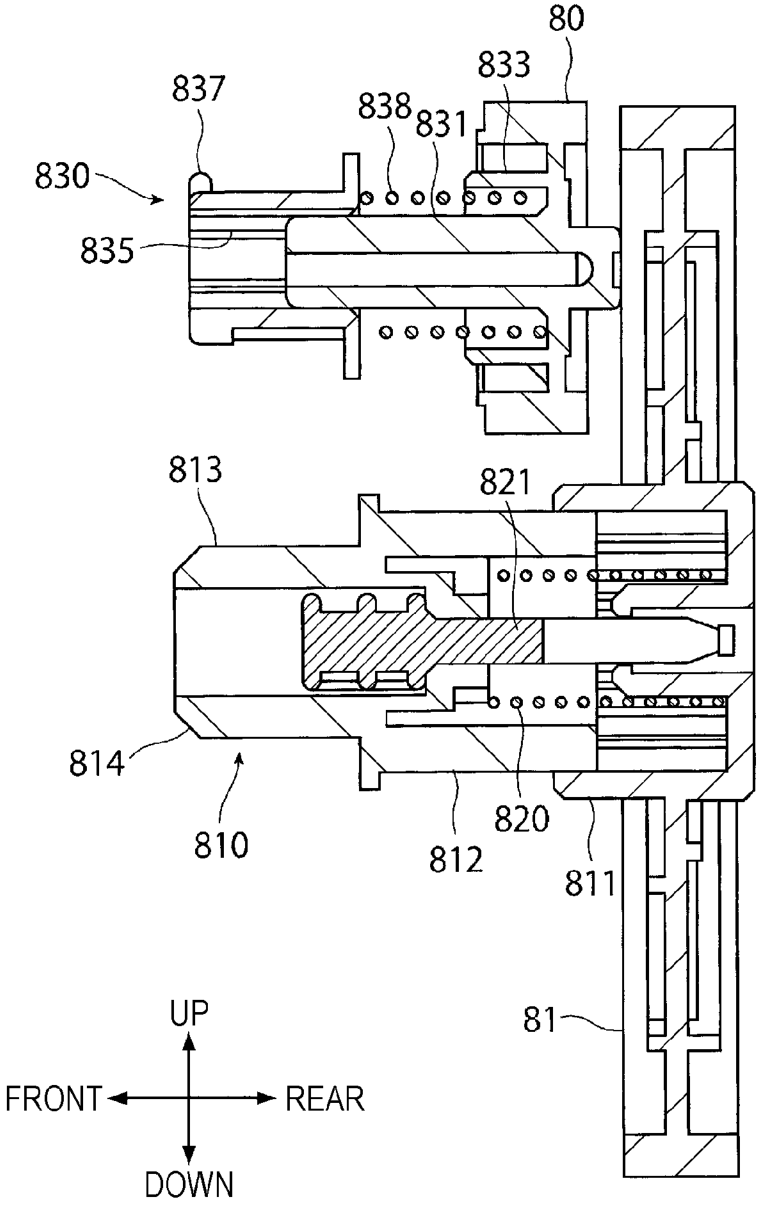
FIG. 30 is a schematic cross-sectional view illustrating members such as a coupling in the driving device.
Figure 31:
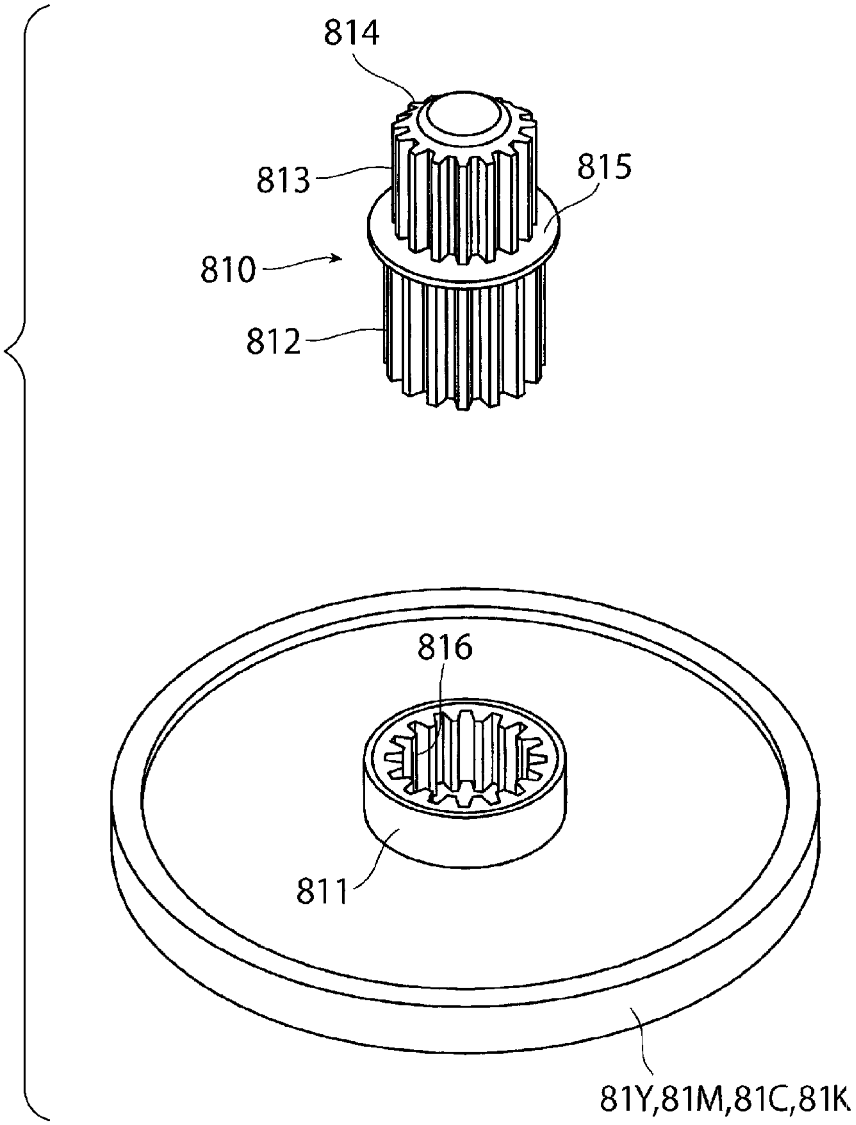
FIG. 31 is an exploded perspective view of the coupling of FIG. 30.

As illustrated in FIG. 30, each of the photoconductor drive gears 81 (Y, M, C, and K) integrally has, at a center thereof, a shaft center part 811 having a cylindrical shape protruding toward one side surface. To the shaft center part 811, the photoconductor master coupling 810 is attached so as to be biased in a protruding direction along a rotary axis direction on one side surface of the photoconductor drive gear 81.

The photoconductor master coupling 810 integrally has a first gear part 812 having a cylindrical shape provided with a spur gear that is an involute gear on an outer circumference thereof and a second gear part 813 having a cylindrical shape that is provided at a front end of the first gear part 812, has an external diameter smaller than the first gear part 812, and is provided with a spur gear that is an involute gear on an outer circumference thereof. The second gear part 813 has, at a front end thereof, a tapered part 814 having a tapered shape. The photoconductor master coupling 810 includes a first contact part 815 that protrudes in an annular shape toward an outer side in a radial direction between the first gear part 812 and the second gear part 813.

The shaft center part 811 of the photoconductor drive gear 81 is provided with an inner gear 816, which is a spur gear that is an involute gear, engaged with the first gear part 812 of the photoconductor master coupling 810.

The photoconductor master coupling 810 is configured to be movable along an axial direction in a state where the first gear part 812 is engaged with the inner gear 816 of the photoconductor drive gear 81 and rotary driving force has been transmitted.

Figure 32:
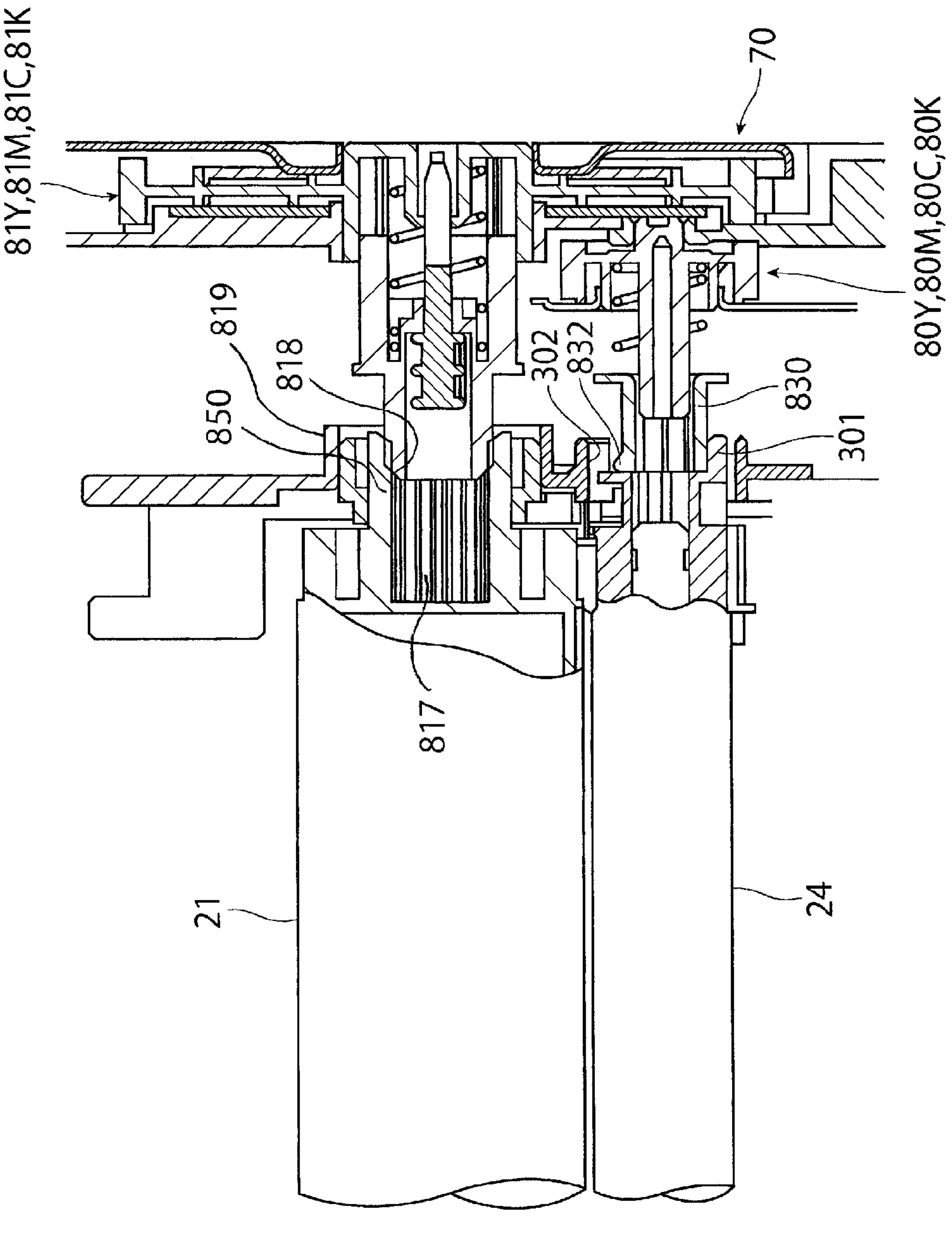
FIG. 32 is a schematic cross-sectional view illustrating members such as the driving device.

As illustrated in FIG. 32, the second gear part 813 of the photoconductor master coupling 810 is configured so as to be capable of being engaged (coupled) with and separated from a photoconductor subordinate coupling 850 that is an example of a second coupling transmission part provided at one end portion of the photoconductor drum 21 of the photoconductor drum unit 200 along the axial direction thereof.

The photoconductor subordinate coupling 850 has a cylindrical shape including, on an inner circumferential surface thereof, an inner gear 817, which is a spur gear that is an involute gear, engaged with the second gear part 813 of the photoconductor master coupling 810. The inner gear 817 has, at an opening end thereof, a tapered part 818 whose diameter increases toward an end portion. The photoconductor subordinate coupling 850 is attached fixedly to one end portion of the photoconductor drum 21 along the axial direction thereof. On a side surface of the photoconductor drum unit 200, a cylindrical protection member 819 that protects the photoconductor subordinate coupling 850 on an outer circumference of the photoconductor subordinate coupling 850 is provided so as to protrude sideways.

Although the photoconductor master coupling 810 is not limited to one including the first and second gear parts 812 and 813 that are involute gears, the photoconductor drum 21 driven to rotate through the photoconductor master coupling 810 is a member that directly influences image quality and therefore desirably has a small speed fluctuation or the like and has high rotation accuracy. The photoconductor master coupling 810 including the first and second gear parts 812 and 813 that are involute gears can transmit rotary driving force to the photoconductor drum 21 with relatively high rotation accuracy and is therefore suitably used.

As illustrated in FIG. 30, the photoconductor master coupling 810 is biased in a protruding direction by a first coil spring 820 that is an example of a first biasing part interposed between an inner end surface of the shaft center part 811 of the photoconductor drive gear 81 and an inner end surface of the first gear part 812. A protrusion amount of photoconductor master coupling 810 along an axial direction of the photoconductor drive gear 81 is regulated by a fixation shaft 821 attached to the shaft center part 811 of the photoconductor drive gear 81.

Figure 33:
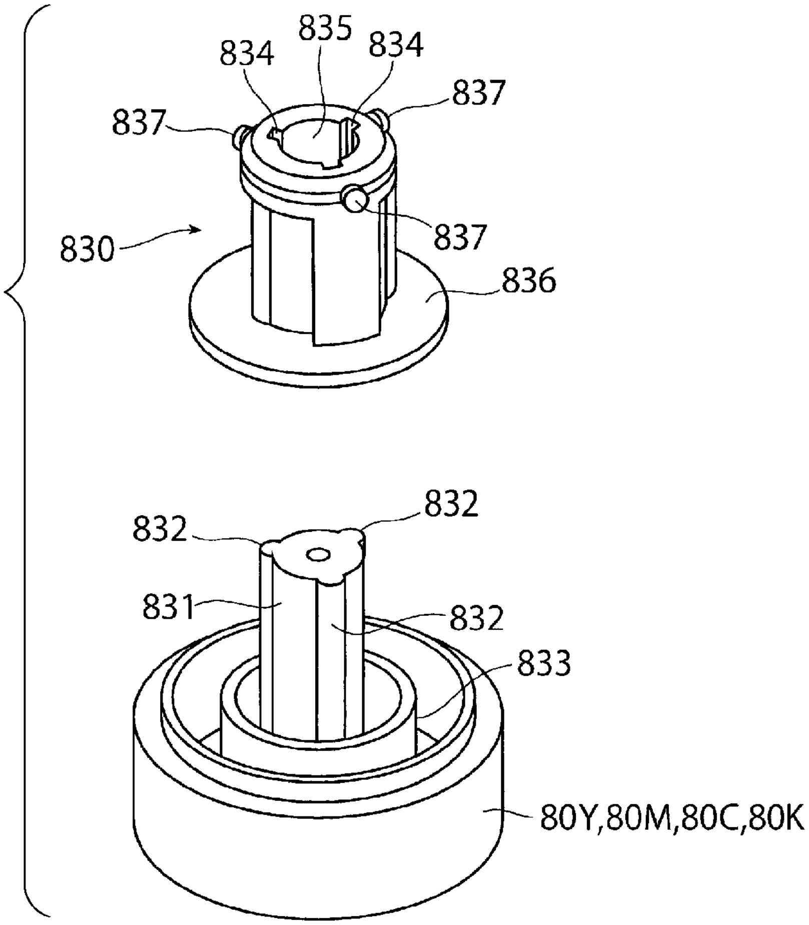
FIG. 33 is an exploded perspective view of the coupling.

Furthermore, as illustrated in FIG. 33, the developing device master coupling 830 is attached to each of the developing device drive gears 80 (Y, M, C, and K) so as to be capable of being displaced along an axial direction of the rotary shaft while a protrusion amount thereof is regulated.

The developing device drive gear 80 integrally includes, on one side surface thereof, a substantially columnar or cylindrical driving transmission shaft 831 provided so as to protrude along the axial direction.

On an outer circumference of the driving transmission shaft 831, plural (three in the present exemplary embodiment) first convex parts 832 having a substantially semicircular cross section are provided along a circumferential direction so as to be integral with the driving transmission shaft 831. Furthermore, the three first convex parts 832 are disposed on the outer circumference of the driving transmission shaft 831 so that an angle of 120 degrees is formed therebetween. Each of the first convex parts 832 is provided throughout the entire length of the driving transmission shaft 831 along the axial direction. The developing device drive gear 80 is provided with a first shaft support part 833 having a cylindrical shape along the outer circumference of the driving transmission shaft 831.

The developing device master coupling 830 has a substantially cylindrical shape. The developing device master coupling 830 has, on an inner circumferential surface thereof, an attachment hole 835 provided with plural first concave parts 834 to be engaged with the plural first convex parts 832 of the driving transmission shaft 831.

The developing device master coupling 830 integrally includes, at a base end part thereof, a second contact part 836 that protrudes in an annular shape toward an outer side in a radial direction. The developing device master coupling 830 integrally has, at a front end thereof, plural (three in the present exemplary embodiment) semi-spherical second convex parts 837 that are provided along a circumferential direction so as to protrude sideways. The second convex parts 837 are provided at the same positions as the first convex parts 832 of the developing device drive gear 80 along the circumferential direction of the developing device master coupling 830.

Furthermore, as illustrated in FIG. 32, the plural second convex parts 837 of the developing device master coupling 830 are configured so as to be capable of being engaged (coupled) with and separated from a developing device subordinate coupling 301, which is an example of a second driving transmission part provided at an end portion of a development roller 24*b* of the developing device unit 300 along the axial direction thereof.

The developing device subordinate coupling 301 includes, on an inner circumferential surface thereof, plural second concave parts 302 to be engaged with the plural first convex parts 832 of the developing device master coupling 830.

As illustrated in FIG. 33, the developing device master coupling 830 is biased in a protruding direction by a second coil spring 838, which is an example of a second biasing part interposed between an end surface of the developing device drive gear 80 and a lower end surface of the second contact part 836.

As illustrated in FIG. 32, the developing device master coupling 830 is attached so as to be rotatable while a protrusion position thereof is regulated by contact with the developing device subordinate coupling 301 of the development roller 24*b*. Note that the protrusion position of the developing device master coupling 830 is regulated by a regulating member (not illustrated).

Furthermore, as illustrated in FIG. 29, an intermediate transfer device master coupling 840, which is an example of a first coupling transmission part, is attached to the intermediate transfer body drive gear 82 so as to be capable of being displaced along an axial direction. The intermediate transfer device master coupling 840 have a similar configuration to the photoconductor master coupling 810.

Operation and Effects of Driving Device

In the driving device 70 according to the first exemplary embodiment, a distance between the inner frame 17 and an outer wall such as the rear face exterior covering can be made smaller than that in a case where a driving part is disposed between a part of the inner frame 17 closest to the outer wall and the outer wall in a driving device in which a driving part such as a motor is disposed between the inner frame 17 that supports the photoconductor drum 21 and the developing device 24 that are an example of a driven part and the outer wall, as described below.

First, as illustrated in FIG. 26, the driving device 70 is disposed in an end portion on a rear side in the housing 10A. The inner frame 17 is present in the end portion on the rear face side of the housing 10A.

Furthermore, on the first part 171 of the inner frame 17, supply parts 249 for the yellow (Y), magenta (M), cyan (C), and black (K) developing devices 24 (Y, M, C, and K) are provided so as to protrude toward the rear face side relative to the first part 171.

Figure 45:
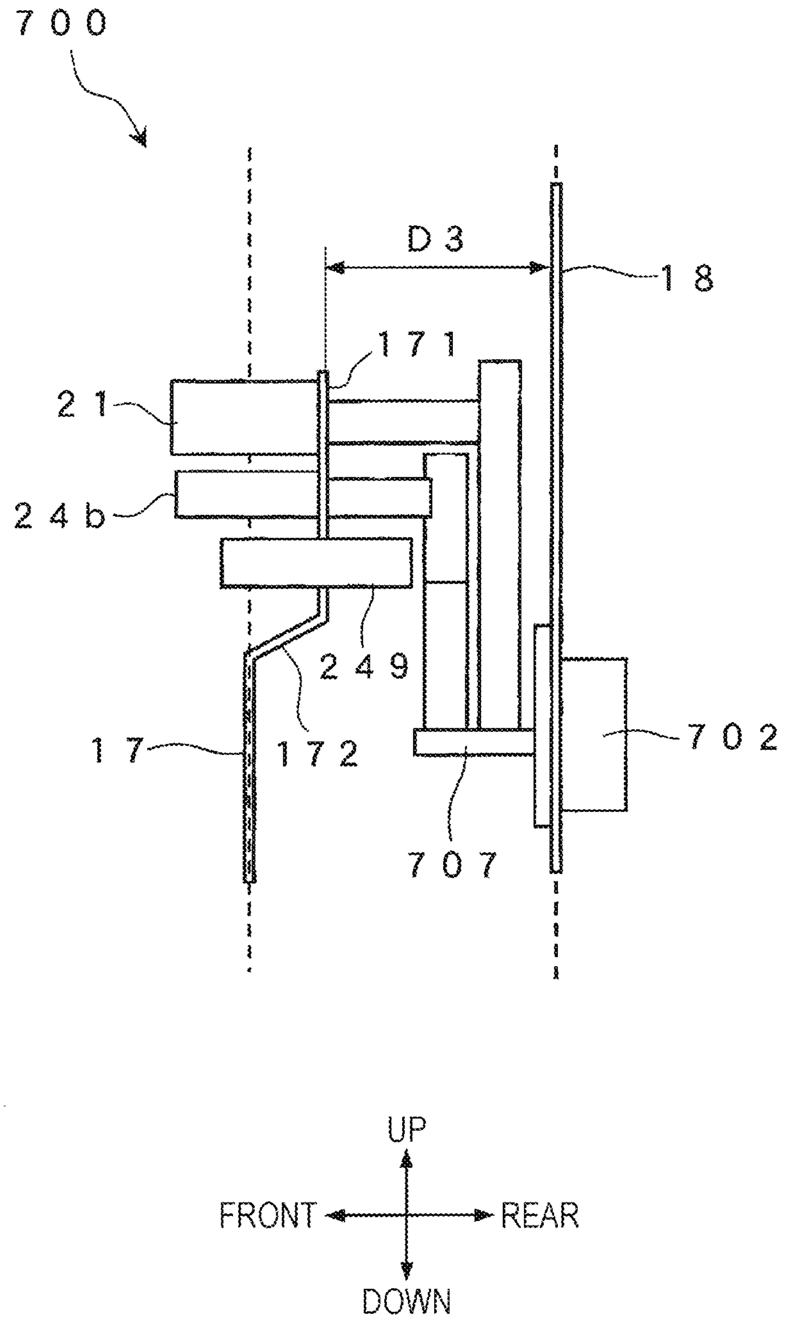
FIG. 45 (Prior Art)
FIG. 45 is a schematic view of a driving device to be compared.

Accordingly, conventionally, in the driving device 70, transmission gears that transmit driving force of the first to third driving motors 702 to 704 to the developing devices 24 (Y, M, C, and K) and the photoconductor drums 21 (Y, M, C, and K) need to be disposed so as to avoid the supply parts 249 for the developing devices 24 (Y, M, C, and K), like a driving device 700 according to a reference example illustrated in FIG. 45.

As a result, in the driving device 700 according to the reference example, the first to third driving motors 702 to 704 need to be disposed on a further rear face side of the housing 10A. This increases a distance between the first part 171 of the inner frame 17 and the rear face exterior covering 18 (interval D3), thereby inviting an increase in size of the housing 10A.

Meanwhile, the driving device 70 according to the first exemplary embodiment is configured such that the first to third driving motors 702 to 704 are disposed not between the first part 171, which is a part of the inner frame 17 closest to the rear face exterior covering 18, and the rear face exterior covering 18 but on the second part 173 of the inner frame 17 whose distance from the rear face exterior covering 18 is the interval D1 larger than the interval D2, as illustrated in FIG. 26.

With this configuration, in the driving device 70 that drives the developing devices 24 (Y, M, C, and K) and the photoconductor drums 21 (Y, M, C, and K), the first to third driving motors 702 to 704 can be disposed on the second part 173 whose distance from the rear face exterior covering 18 is the interval D1 larger than the interval D2 between the first part 171, which is a part of the inner frame 17 closest from the rear face exterior covering 18, and the rear face exterior covering 18 so that the drive shafts 707 of the driving motors 702 to 704 protrude from the motor body 706 toward the rear face exterior covering 18, as illustrated in FIG. 26.

Accordingly, in the driving device 70, only the transmission gears that transmit driving force of the first to third driving motors 702 to 704 to the developing devices 24 (Y, M, C, and K) and the photoconductor drums 21 (Y, M, C, and K) need to be disposed so as to avoid the supply parts 249 for the developing devices 24 (Y, M, C, and K), and the first to third driving motors 702 to 704 do not protrude toward the rear face side beyond the transmission gears.

As described above, in the driving device 70, a distance between the inner frame 17 and the rear face exterior covering 18 can be reduced as compared with a case where the first to third driving motors 702 to 704 are disposed between the first part 171 of the inner frame 17 closest to the outer wall and the rear face exterior covering 18 in a driving device in which the first to third driving motors 702 to 704 are disposed between the inner frame 17 that supports the developing devices 24 (Y, M, C, and K) and the photoconductor drums 21 (Y, M, C, and K) and the rear face exterior covering 18.

Second Exemplary Embodiment

Figure 34:
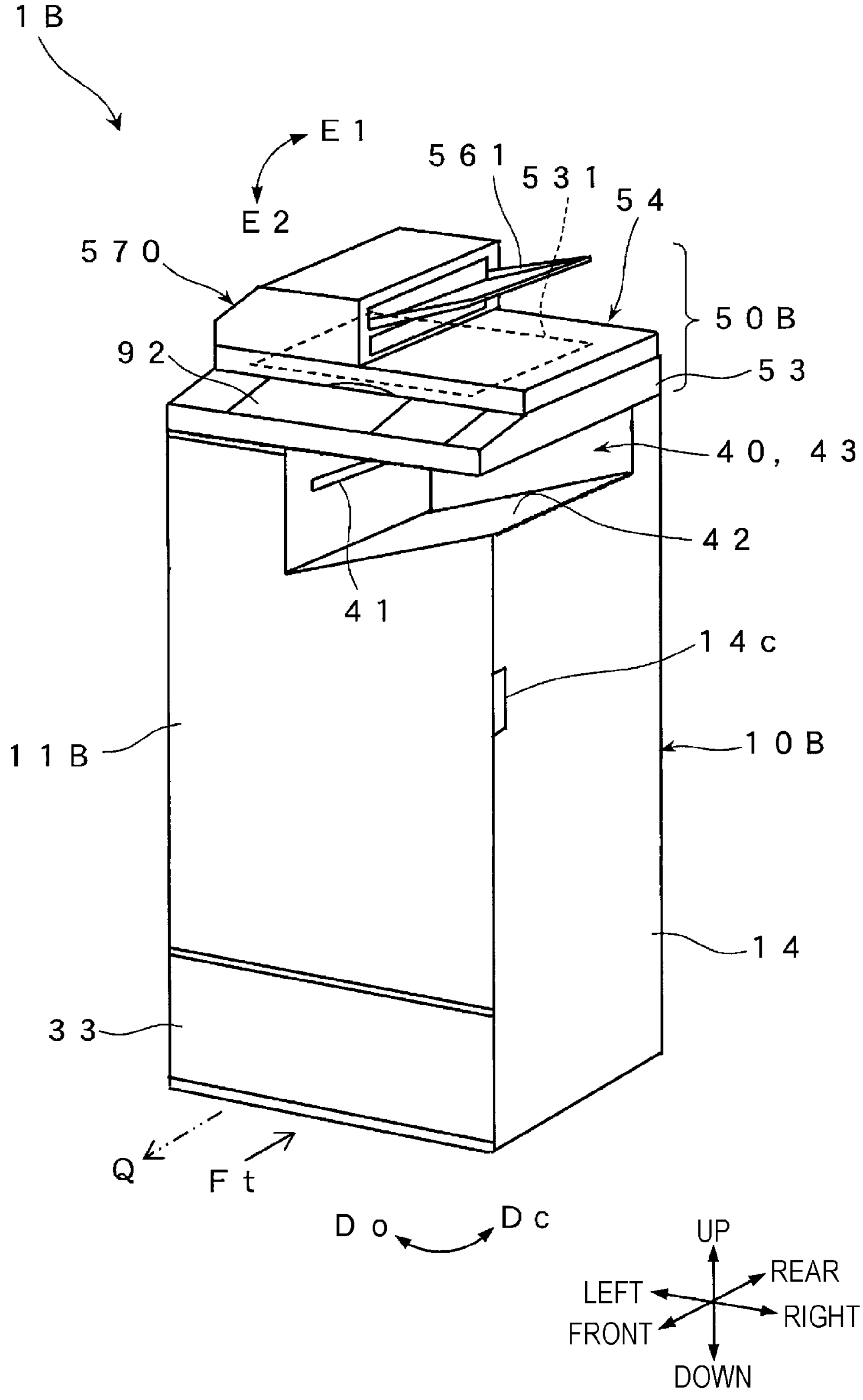
FIG. 34 is a perspective view of an image forming apparatus according to the second exemplary embodiment.
Figure 35:
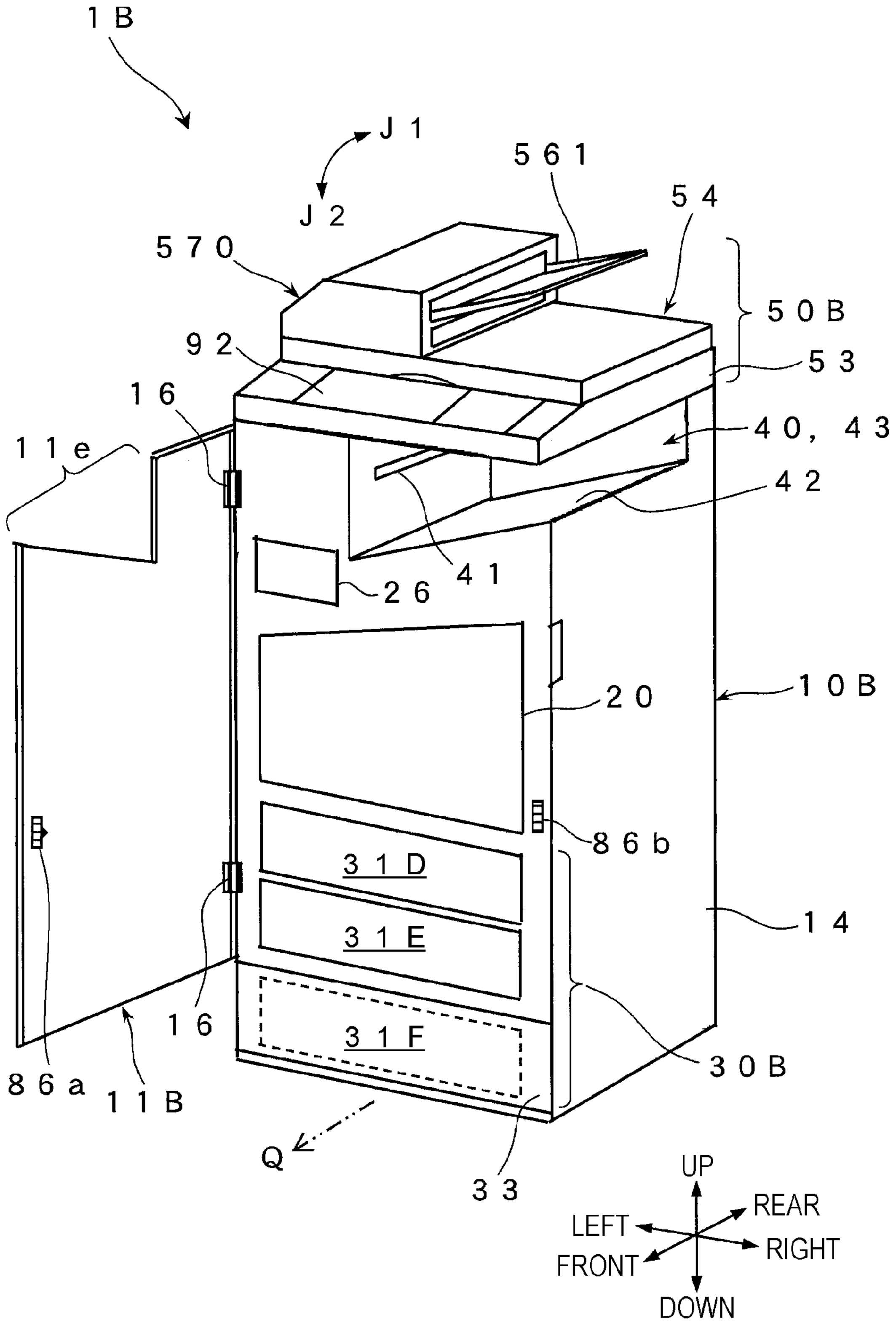
FIG. 35 is a perspective view illustrating a state where a front opening/closing covering of the image forming apparatus of FIG. 34 is opened.
Figure 36:
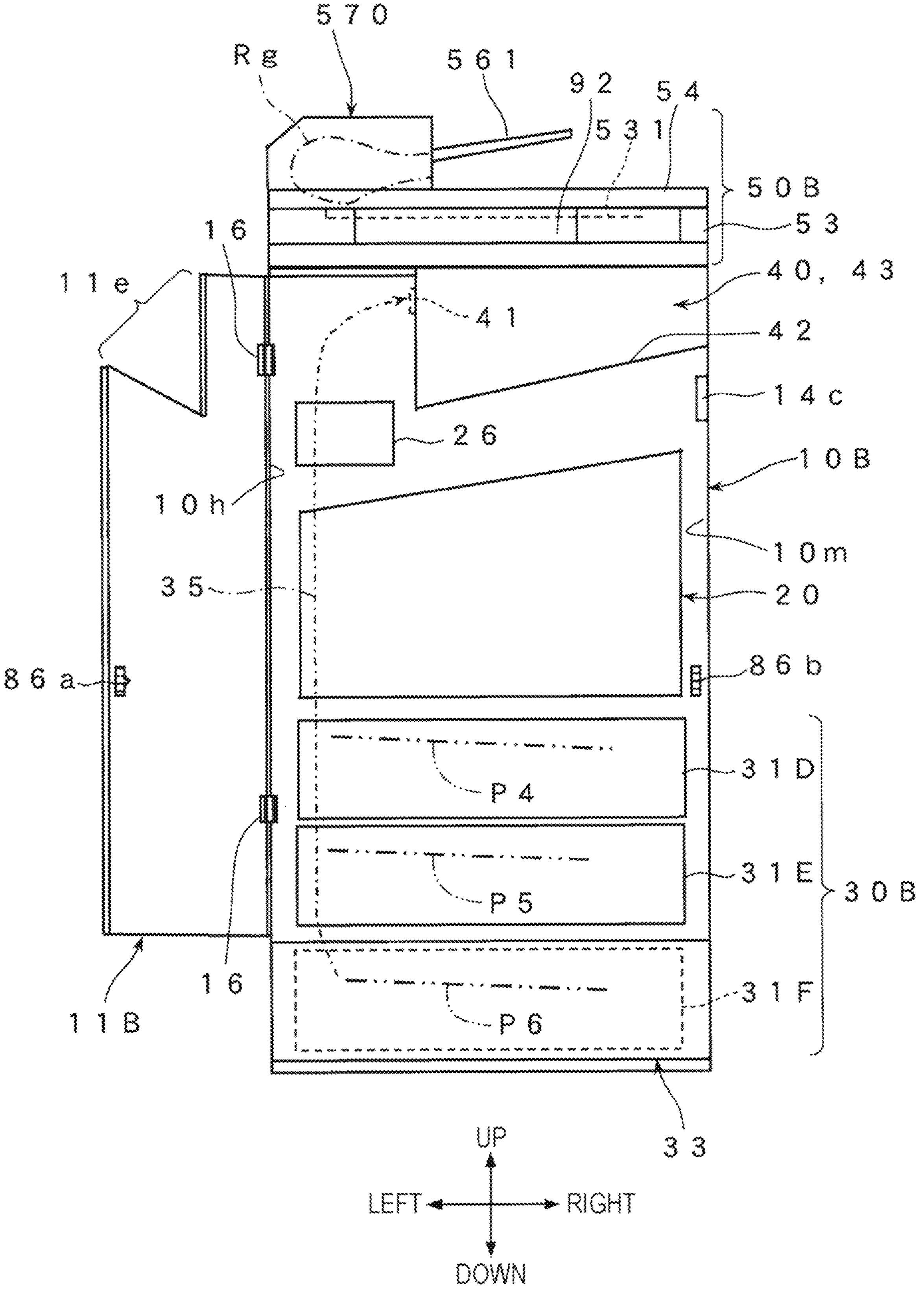
FIG. 36 is a front schematic view of the image forming apparatus of FIG. 34.

FIG. 34 is a perspective view illustrating an image forming apparatus 1B according to the second exemplary embodiment of the present disclosure viewed obliquely from a front side. FIG. 35 is a perspective view illustrating a state where a front opening/closing covering of the image forming apparatus 1B is opened. FIG. 36 is a front schematic view illustrating a state where the front opening/closing covering of the image forming apparatus 1B is opened.

The image forming apparatus 1B according to the second exemplary embodiment has a configuration identical to the image forming apparatus 1A according to the first exemplary embodiment except for the following points.

Specifically, the image forming apparatus 1B according to the second exemplary embodiment is different from the image forming apparatus 1A according to the first exemplary embodiment in that a document-only reading part 50B is applied instead of the external reading part 60 and the document transporting reading part 50, a medium storage part 30B is applied instead of the medium storage part 30A, and a front opening/closing covering 11B is applied instead of the front opening/closing covering 11A, as illustrated in FIGS. 34 to 36. The housing 10B, which is an example of an apparatus body, is different from the housing 10A according to the first exemplary embodiment in that the medium storage part 30B is employed.

In the following description, common constituent elements are given similar reference signs to those used in the first exemplary embodiment, and description thereof is omitted unless necessary.

First, the document-only reading part 50B is a part that has a device for reading a sheet-shaped document (G). As illustrated in FIGS. 34 to 36, the document-only reading part 50B includes devices and members such as an image reading part 53, a platen covering part 54, and an auto document feeder 570.

The image reading part 53 is a part that has a platen glass 531, which is an example of a document platen on which a document is placed, a reading device (not illustrated) that reads a document placed on the platen glass 531, and the like. The platen covering part 54 is an openable/closable part that covers the platen glass 531. The auto document feeder 570 is a device that is disposed on the platen covering part 54 and automatically transports plural documents placed on a document platen 561 so as to enable successive reading.

The auto document feeder 570 employs a system in which a document is read by a reading device such as an image sensor disposed on a document transport path Rg and a system in which a document placed on the platen glass 531 is read by using a reading device in the image reading part 53. The document transport path Rg indicated by the line with alternate long and short dashes in FIG. 36 is a document transport path along which a document is transported in the auto document feeder 570. The platen covering part 54 is coupled with the image reading part 53 by an opening/closing support member such as a hinge (not illustrated) on a rear side of the platen glass 531. With this configuration, the platen covering part 54 is attached to as to be rotationally movable in opening and closing directions indicated by arrows E1 and E2 about the hinge (not illustrated) disposed on a rear end portion thereof.

The document-only reading part 50B reads a document on the platen glass 531 or successively reads documents that are being transported by the auto document feeder 570 and transmits, as image information, information thus read from the document from the image reading part 53 to members such as an image forming part 20. Accordingly, the image forming apparatus 1B is configured so that the image forming part 20 can form an image of a document read by the document-only reading part 50B on a recording medium P and output the recording medium P on which the image has been formed.

Furthermore, the document-only reading part 50B is configured such that an operation panel 92 for operating the image forming apparatus 1B is disposed at a front-side end portion of the image reading part 53. The operation panel 92 includes not only mechanical parts such as buttons and switches, but also a display part such as an image display part or a touch-type liquid crystal panel on which an operation screen can be displayed and operated.

Next, the medium storage part 30B has three storage parts 31D, 31E, and 31F arranged in the up-down direction, as illustrated in FIGS. 35 and 36.

Each of the three storage parts 31D, 31E, and 31F includes a storage such as a tray (not illustrated) in which recording media P are stored and a feeding device (not illustrated) that feeds out a recording medium P from the storage.

Each of the three storage parts 31D, 31E, and 31F is configured as a general storage part in which the storage is disposed almost horizontally along the left-right direction. Recording media P4, P5, and P6 stored in the storage parts 31D, 31E, and 31F, respectively may have the same size or may have different sizes. Alternatively, at least one of the recording media P4, P5, and P6 may have a size different from the others. The topmost storage part 31D is a storage part closest to the image forming part 20.

Next, the front opening/closing covering 11B is configured as an opening/closing covering that can cover the whole image forming part 20 and a part (the storage parts 31D and 31E) of the medium storage part 30B in the housing 10B, as illustrated in FIGS. 34 to 36 and other drawings.

The front opening/closing covering 11B according to the second exemplary embodiment is a part of a front face of the housing 10B excluding a medium discharge part 40 and a part (the storage part 31F) of the medium storage part 30B and is configured as an opening/closing covering that can cover the whole image forming part 20 and a part of the medium storage part 30B.

In other words, the front opening/closing covering 11B is configured as a single opening/closing covering that covers a range from one end to the other end in the left-right direction of the image forming part 20 in the left-right direction of the housing 10A and covers a range from one end to the other end in the left-right direction of the part of the medium storage part 30B.

The front opening/closing covering 11B is an opening/closing covering that covers a range from one end (left end 10*h*) to the other end (right end 10*m*) in the left-right direction on the front face of the housing 10B.

The entire shape of the front opening/closing covering 11B is an oblong shape that is long in the up-down direction, is a lower part of the front face of the housing 10B obtained by excluding the image reading part 53, and has a cutout part 11*e* in a right half of an upper part of the oblong, and covers a portion excluding the lower storage part 31F of the medium storage part 30B and a portion below the lower storage part 31F. The cutout part 11*e* is a part having a shape corresponding to a shape of a front face opening of the medium discharge part 40.

Furthermore, as illustrated in FIG. 35 and other drawings, the front opening/closing covering 11B is attached so as to open and close in directions indicated by arrows Do and Dc about plural (two in this example) opening/closing support members 16 such as hinges at a left end on the front face of the housing 10B. With this configuration, the whole front opening/closing covering 11B opens in a lateral leftward direction (a direction indicated by arrow Do).

Furthermore, in the image forming apparatus 1B, the front opening/closing covering 11B is an opening/closing covering that does not cover the lowermost storage part 31F of the medium storage part 30B.

Accordingly, a front face external covering 33 is fixedly attached to a front face side of the storage of the lowermost storage part 31F instead of the front opening/closing covering 11B.

Meanwhile, both of the storages of the storage parts 31D and 31E covered with the front opening/closing covering 11B include, on a front face side thereof, an inner covering having a contour corresponding to a shape (horizontally-long oblong) of the storage parts 31D and 31E on the front face side.

The storages of the storage parts 31D and 31E are attached so that when the front opening/closing covering 11B is opened (see FIGS. 35 and 36), the storages can be drawn out from an inner side toward an outer side (a front face near side of the housing 10B) of the housing 10B as indicated by arrow Q in FIG. 35 and work such as work of storing the recording media P4 and P5 can be performed.

Meanwhile, the lowermost storage part 31F is attached so that the lowermost storage part 31F can be drawn out from an inner side toward an outer side of the housing 10B and work such as work of storing the recording media P6 can be performed at any time irrespective of whether the front opening/closing covering 11B is opened or closed.

In the image forming apparatus 1B configured as above, in a case where the front opening/closing covering 11B is closed, the whole of the image forming part 20 (including a fixation device 26) and the storage parts 31D and 31E, which are a part of the medium storage part 30B, are covered with the single front opening/closing covering 11B on an exterior of the front face of the housing 10B, as illustrated in FIG. 34.

Accordingly, in the image forming apparatus 1B, there is no dividing line Lv (see FIG. 41) extending almost along the up-down direction created between coverings at least on the exterior of the medium storage part 30A as compared with a case where the medium storage part 30A is covered with plural coverings from one end to the other end in the left-right direction.

Furthermore, in the image forming apparatus 1B, a dividing line extending so as to straddle the image forming part 20 and the medium storage part 30B is not present due to the closed front opening/closing covering 11A as compared with the image forming part 20 and the medium storage part 30B are covered with separate opening/closing coverings, respectively.

Furthermore, the image forming apparatus 1B is configured such that the front opening/closing covering 11B covers the two storage parts 31D and 31E of the medium storage part 30B.

Accordingly, in the image forming apparatus 1B, there is no dividing line (Ld) between the storage parts 31D and 31E of the medium storage part 30B on the exterior (the front opening/closing covering 11B) of the front face of the housing 10B, and quality of appearance improves accordingly.

Meanwhile, in the image forming apparatus 1B, the storage part 31F of the medium storage part 30B that is not covered with the front opening/closing covering 11B can be drawn out from an inner side toward an outer side of the housing 10B and work such as work of storing the recording media P6 can be performed at any time irrespective of whether the front opening/closing covering 11B is opened or closed.

Accordingly, for example, a storage part in which the recording media P6 consumed a lot and frequently requires supplying work are stored is desirably selected as the storage part 31F that is not covered with the front opening/closing covering 11B. According to such a configuration in which the storage part 31F is not covered with the front opening/closing covering 11B, an action of opening and closing the front opening/closing covering 11B is not needed to supply the frequently-used recording media P6 to the storage part 31F, and workability improves.

Furthermore, in the image forming apparatus 1B, an interlock switch 86 shifts to a non-connected state when the front opening/closing covering 11B is opened. Specifically, as illustrated in FIG. 35 and other drawings, a movable connection part 86*a* of the interlock switch 86 on the front opening/closing covering 11B side is disengaged from a switch part 86*b* of the interlock switch 86 on the housing 10B side. Furthermore, in a case where the front opening/ closing covering 11B is opened during execution of image formation operation by the image forming apparatus 1B, shift of the interlock switch 86 to the non-connected state is detected, and upon receipt of detection information thus acquired, a central controller 95 (see FIG. 16) of a control device performs control for forcibly stopping operation of an image formation control part 201 and a medium transport control part 351.

Accordingly, in the image forming apparatus 1B, operation (image formation operation) of the image forming part 20 and a medium transport path 35 exposed on the front face side of the housing 10B is stopped when the front opening/closing covering 11B is opened, and therefore safety is ensured.

Meanwhile, in the image forming apparatus 1B, transport operation from the lowermost storage part 31F to the medium transport path 35 is not stopped even when the front opening/closing covering 11B is opened during execution of image formation operation.

Although the present disclosure has been described by using the specific exemplary embodiments, it is clear to a person skilled in the art that the present disclosure is not limited to these exemplary embodiments and other exemplary embodiment may be employed within the scope of the present disclosure. Change, deletion, addition, and combination can be made without departing from the technical idea of the present exemplary embodiment. For example, parts or all of the exemplary embodiments may be combined as appropriate or constituent parts described in different exemplary embodiments may be combined.

In the image forming apparatus 1A according to the first exemplary embodiment, the front opening/closing covering 11A may be a single opening/closing covering that covers a part of the medium storage part 30A and a part (e.g., a part excluding the fixation device 26) of the image forming part 20 so as to open and close the part of the medium storage part 30A and the part of the image forming part 20.

Furthermore, in the image forming apparatus 1A, the left side opening/closing covering 13 may be configured so as to be opened and closed by the opening/closing support members 16 disposed at a right end in the left-right direction (a front end in the front-rear direction from the view point of the housing 10A).

Furthermore, in the image forming apparatus 1A, the right side covering 14 may be configured as an opening/closing covering that covers the image forming part 20 and the medium storage part 30A on the right side face of the housing 10A instead or in addition to the left side opening/closing covering 13. In this case, in a case where the right side covering 14 is heavier than the front opening/closing covering 11A, it is desirable to employ a configuration in which the right side covering 14 is opened and closed by the opening/closing support members 16 disposed at one end in the left-right direction of the side covering 14 (the front-rear direction of the housing 10A).

Furthermore, in the image forming apparatus 1A, both of the left side covering and the right side covering may be exterior coverings that do not open nor close.

In the image forming apparatus 1B according to the second exemplary embodiment, the front opening/closing covering 11B may be an opening/closing covering that covers all of the three storage parts 31D, 31E, and 31F of the medium storage part 30B, as in the case of the front opening/closing covering 11A according to the first exemplary embodiment. Conversely, the front opening/closing covering 11B may be configured as an opening/closing covering that covers the topmost storage part 31D of the medium storage part 30B in addition to the image forming part 20.

The housing 10 is not limited to a structure having a rectangular parallelepiped shape long in the up-down direction such as the housings 10A and 10B illustrated in the first and second exemplary embodiments and may be, for example, a housing 10 having curved side face parts.

Although a configuration example in which the front opening/closing covering 11A or 11B and the left side opening/closing covering 13 are opened and closed by rotationally moving about the opening/closing support members 16 has been illustrated in the first and second exemplary embodiments, the front opening/closing covering 11A or 11B and the left side opening/closing covering 13 may be opened and closed by sliding.

Furthermore, in the first and second exemplary embodiments, mass of the front opening/closing covering 11A or 11B may be set smaller than mass of the medium storage part 30A or 30B, and the front opening/closing covering 11A or 11B located at the open position may be prevented from moving to the covering position in a state in which any one of the storage parts 31A, 31B, 31C, 31D, and 31E of the medium storage part 30A or 30B has been pulled out (drawn out) from the housing 10A.

In this case, in a case where the front opening/closing covering 11A or 11B at the open position is moved to the covering position in a state where any of the storage parts 31 is pulled out from the housing 10A, the front opening/closing covering 11A or 11B makes contact with the storage part 31 thus pulled out and movement thereof stops. Accordingly, breakage of the front opening/closing covering 11A or 11B is less likely to occur than in a configuration in which the front opening/closing covering 11A or 11B at the open position can be forcibly moved to the covering position in a state where the storage part 31 has been pulled out from the housing 10A.

Furthermore, although the opening/closing support members 16 of the front opening/closing covering 11A or 11B are disposed on a left side of the storage part 31A in the first and second exemplary embodiments, the opening/closing support members 16 may be disposed on a right side of the storage part 31A and the front opening/closing covering 11A or 11B may be opened and closed about these opening/closing support members 16. In this case, the front opening/closing covering 11A is not disposed (is not present) on the left side of the storage part 31A when the front opening/closing covering 11A or 11B is moved to the open position, and therefore, for example, it becomes easy to handle jam occurring at a portion where the recording medium P1 is picked up.

In addition, in the first exemplary embodiment, in a case where the front opening/closing covering 11A that is constituted by a single covering is moved to the covering position, the storage part 31A and the storage part 31C are covered with the front opening/closing covering 11A in the apparatus depth direction. With this configuration, the number of dividing lines created by the front opening/closing covering 11A is smaller than a case where two front face coverings are provided.

Furthermore, although a configuration example in which the three storage parts 31A to 31C or the three storage parts 31D to 31F are provided as the medium storage part 30A or 30B in the first and second exemplary embodiments, the number of storage parts 31 may be one, may be two, or may be four or more.

Although a configuration example in which the middle storage part 31B and the lower storage part 31C of the medium storage part 30A are disposed horizontally has been illustrated in the first exemplary embodiment, the storage part 31B and the storage part 31C need not be disposed horizontally and may be disposed so as to be inclined at an inclination angle smaller than an inclination angle of the topmost oblique storage part 31A.

According to such a configuration, the recording media P2 and P3 stored in the storage part 31B and the storage part 31C are less likely to move in inclination directions than in a case where the inclination angles of the storage part 31B and the storage part 31C are identical to the inclination angle of the oblique storage part 31A and a case where the inclination angles of the storage part 31B and the storage part 31C are larger than the inclination angle of the oblique storage part 31A.

Furthermore, although the storage part 31B and the storage part 31C mounted in the housing 10A can be drawn out from the housing 10A toward the apparatus near side irrespective of the position of the topmost oblique storage part 31A in the first exemplary embodiment, it is also possible to employ a configuration in which at least one of the storage part 31B and the storage part 31C can be drawn out. With this configuration, it is easier to supply the recording media P as compared with a case where both of the storage part 31B and the storage part 31C cannot be drawn out.

In the first exemplary embodiment, the number of recording media P3 that can be stored in the lowermost storage part 31C is larger than the number of recording media P1 that can be stored in the oblique storage part 31A and the number of recording media P2 that can be stored in the middle storage part 31B. However, the relationship in the number of recording medium P among the storage parts 31 is not limited to this, and other relationships may be employed. In this case, the effect produced because the number of recording media P3 that can be stored in the lowermost storage part 31C is largest is not produced.

Furthermore, although an aspect in which the storage part 31A is oblique with respect to the horizontal direction has been described in the first exemplary embodiment, it is only necessary that one end and the other end of the storage part 31A are located at different positions. For example, even in a case where the storage part 31A is provided parallel with a vertical direction, a range in which the storage part 31A is disposed in the apparatus width direction can be reduced as compared with a case where the storage part 31A is horizontal. As for the one end and the other end, see the above description.

In the first exemplary embodiment, the topmost oblique storage part 31A mounted in the housing 10A can be moved to a supply position irrespective of the positions of the storage part 31B and the storage part 31C although this is not described in the first exemplary embodiment. With this configuration, it is easier to supply the recording media P1 to the oblique storage part 31A than in a case where movement of the oblique storage part 31A is restricted by the positions of the storage part 31B and the storage part 31C.

Figure 37:
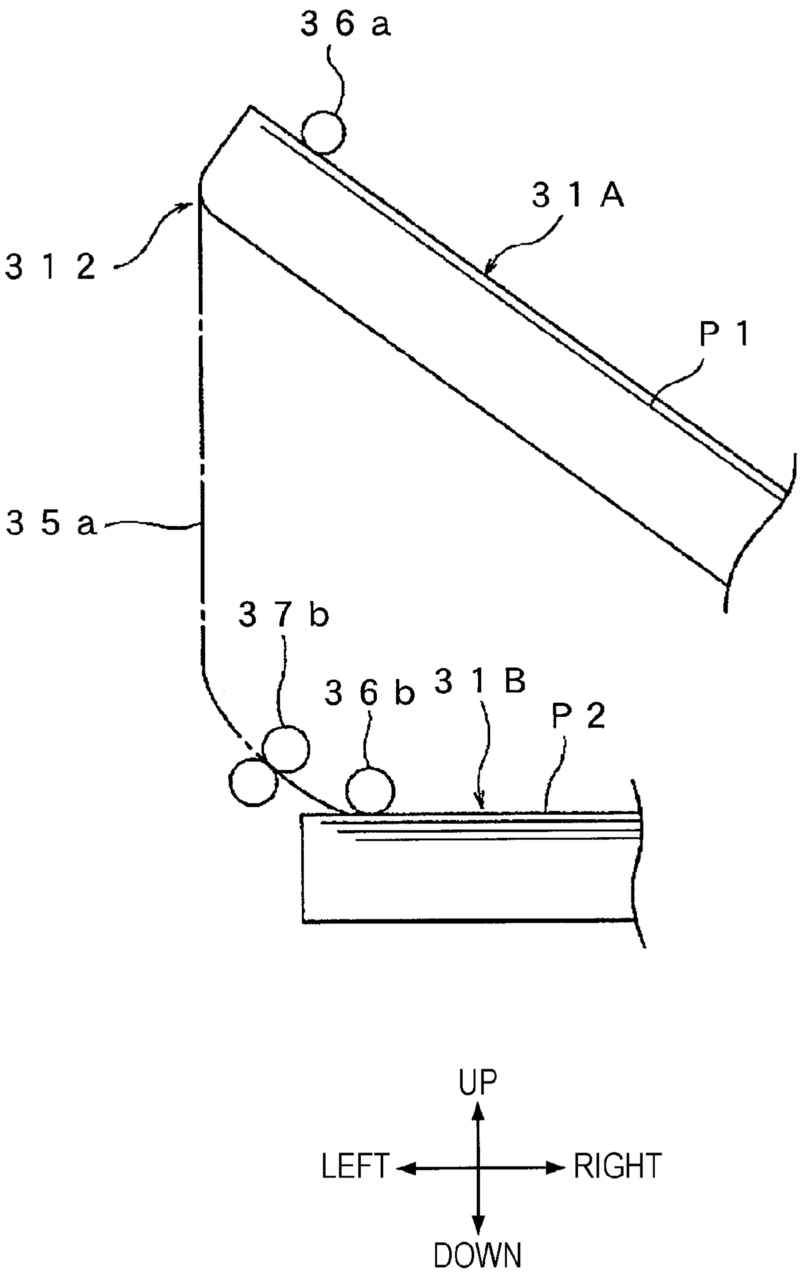
FIG. 37 is a schematic front view of a modification of members such as a medium storage part.

It is also possible to employ a configuration in which a guide part 312 such as a rib that guides the recording medium P2 transported from the middle storage part 31B is provided in an upper end portion of the oblique storage part 31A and a transport path 35*a* from the middle storage part 31B to the guide part 312 is disposed within a range in which the oblique storage part 31A is disposed in the apparatus width direction (the left-right direction) as illustrated in FIG. 37 although this is not described in the first exemplary embodiment. In this case, the width of the housing 10A is prevented from becoming wide due to the transport path 35*a* from the storage part 31B to the guide part 312 as compared with a case where the transport path 35*a* from the storage part 31B to the guide part 312 is disposed outside the range in which the oblique storage part 31A is disposed in the apparatus width direction.

A part of or the whole of the image forming part 20 may be disposed within the range in which the oblique storage part 31A is disposed in the apparatus width direction although this is not described in the first exemplary embodiment. With this configuration, the width of the housing 10A including at least the image forming part 20 is prevented from becoming wide as compared with a case where the image forming part 20 is disposed outside the range in which the oblique storage part 31A is disposed.

A reversing path for reversing the recording medium P may be disposed within the range in which the oblique storage part 31A is disposed in the apparatus width direction although this is not described in the first exemplary embodiment. With this configuration, the width of the housing 10A is prevented from becoming wide as compared with a case where the reversing path is disposed outside the range in which the oblique storage part 31A is disposed in the apparatus width direction.

The transfer nip NT at which an image is transferred onto a recording medium P by the image forming part 20 may be disposed on a side opposite to a portion where the recording medium P1 is fed out from the oblique storage part 31A in the apparatus width direction although this is not described in the first exemplary embodiment. Furthermore, the reversing path for reversing the recording medium P may be disposed within the range in which the oblique storage part 31A is disposed in the apparatus width direction. With this configuration, the width of the housing 10A is prevented from becoming wide as compared with a case where the reversing path is disposed outside the range in which the oblique storage part 31A is disposed in the apparatus width direction.

The medium storage part 30A or 30B may be configured not to include the feeding rollers 36*a*, 36*b*, and 36*c* and the prevention rollers 37*a*, 37*b*, and 37*c* of the medium transport path 35 although this is not described in the first and second exemplary embodiments.

The middle storage part 31B may be a storage part disposed so as to be inclined with respect to the horizontal direction although this is not described in the first exemplary embodiment. It is only necessary that the recording media P2 of the maximum size stored in the storage part 31B are disposed within the range R1 when viewed from the apparatus depth direction.

The lowermost storage part 31C may be a storage part disposed so as to be inclined with respect to the horizontal direction although this is not described in the first exemplary embodiment. It is only necessary that the recording media P3 of the maximum size stored in the storage part 31C are disposed within the range R1 when viewed from the apparatus depth direction.

Figure 38:
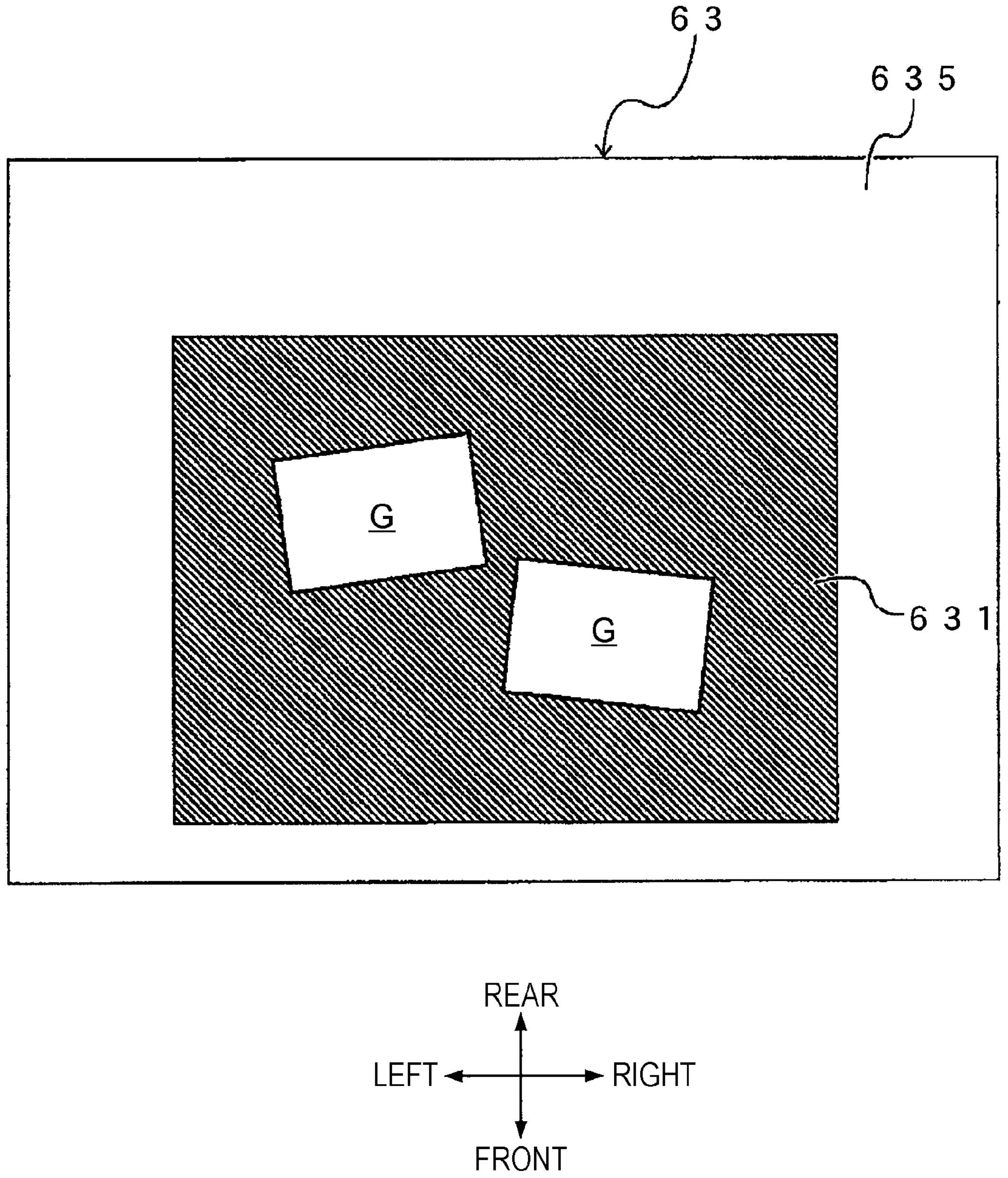
FIG. 38 is a schematic plan view of a modification of members such as a document placing surface.

In the first exemplary embodiment, a document placing surface in which a range 631 on which a document G is to be placed is black or a color of a preset optical density or higher and a guideline 635 is provided around the range 631 as illustrated in FIG. 38 may be employed as the document placing surface 63.

In this case, a center of the photographing range of the reading device 66 of the external reading part 60 is deviated toward a side accessed by a user (the front side of the apparatus) from a center of the top surface of the housing 10A. In other words, the center of the photographing range of the reading device 66 is deviated toward the near side of the housing 10A from the center of the top surface of the housing 10A.

Furthermore, a center of the range 631 in which a document G is to be placed that is a center within the guideline 635 is deviated toward the side accessed by a user, that is, the near side of the apparatus body 12 from the center of the top surface of the housing 10A.

Figure 39:
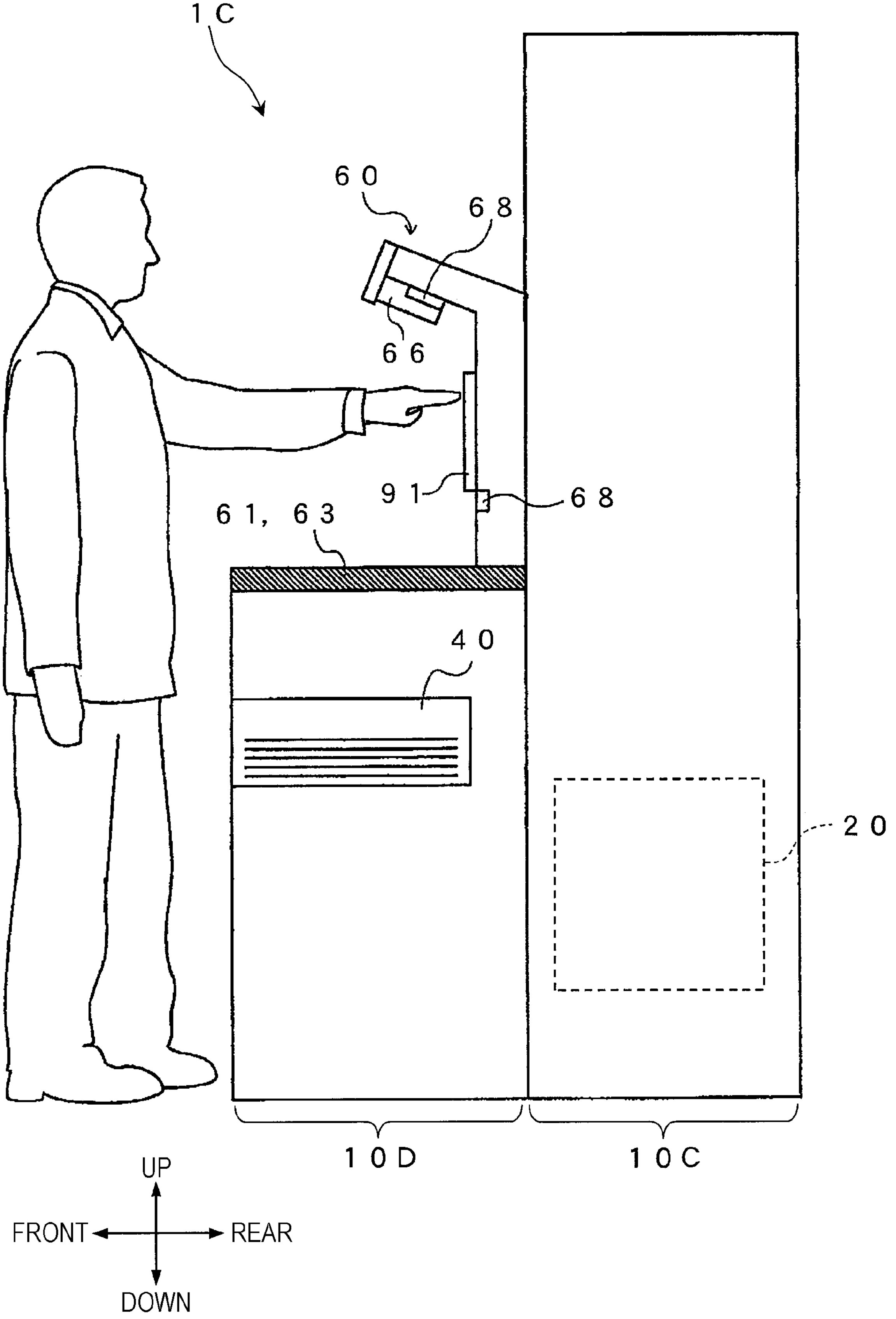
FIG. 39 is a schematic side view of a modification of the image forming apparatus.

The image forming apparatus 1A according to the first exemplary embodiment may be configured as an image forming apparatus 1C illustrated in FIG. 39.

The image forming apparatus 1C of FIG. 39 includes a body part 10C including members such as the image forming part 20 and an image processing part 10D including members such as the document placing surface 63 of the external reading part 60 and the medium discharge part 40.

In this image forming apparatus 1C, the document placing surface 63 and the reading device 66 of the external reading part 60 are disposed not in an upper portion of the image forming apparatus 1C (actually, an upper portion of the body part 10C) but in a middle portion of the image forming apparatus 1C.

The document placing surface 63 and the medium discharge part 40 are provided at a height at which a standing user can perform an operation or work such as work of taking a recording medium out. The document placing surface 63 is disposed on a side (front side) on which a standing user performs an operation.

The reading device 66 is disposed above the document placing surface 63 and is configured to read a target to be read, examples of which include a document G (subject), placed on the document placing surface 63 from above. The reading device 66 is provided so as to face downward, that is, face the document placing surface 63.

Furthermore, in the image forming apparatus 1C, the center of the document placing surface 63 is deviated toward the side accessed by a user (the front side of the apparatus) from the center of the top surface of the body part 10C. In other words, the center of the document placing surface 63 is disposed in the image processing part 10D so as to be deviated toward the near side of the whole image forming apparatus 1C from the center of the top surface of the body part 10C.

The center of the photographing range of the reading device 66 is deviated toward the side accessed by a user from the center of the top surface of the body part 10C. In other words, the center of the photographing range of the reading device 66 is deviated toward the near side of the whole image forming apparatus 1C from the center of the top surface of the body part 10C.

Although a case where the paint color or material color of the whole or a part of the document placing surface 63 of the external reading part 60 is black or a color of a preset optical density or higher has been described in the first exemplary embodiment, this is not restrictive. It is also possible to employ a configuration in which at least a paint color or a material color of a portion of the document placing surface 63 where the target to be read is not placed and that is close to a portion in contact with an end of a target to be read is black or a color of a preset optical density or higher.

Although a case where a color of the marks M on the document placing surface 63 is white has been described in the first exemplary embodiment, this is not restrictive, the color of the marks M may be any of other colors and may be black. That is, the color of the marks M may be any color that can be discriminated from the color of the document placing surface 63.

The document placing surface 63 of the external reading part 60 need not necessarily be completely flat. That is, the document placing surface 63 may have any shape, as long as a document G can be placed on the document placing surface 63 and can be read (photographed) by the reading device 66. Accordingly, the document placing surface 63 may be, for example, an uneven surface, as long as a document G can be placed on the document placing surface 63 and can be read (photographed) by the reading device 66.

In the first exemplary embodiment, a document placing surface constituted by two members, specifically, the covering part 58 of the document transporting reading part 50 and the table part 61 of the external reading part 60 is illustrated as the document placing surface 63.

However, the document placing surface 63 may be a single member whose upper surface is divided into plural surfaces by one or more grooves. The one or more grooves are an example of a boundary line.

Furthermore, the document placing surface 63 may be constituted by three or more members. That is, the document placing surface 63 may be configured such that two or more boundary lines K are formed by gaps S between the members.

In the first exemplary embodiment, a single straight line is illustrated as the boundary line K on the document placing surface 63.

However, the boundary line K may be a curved line on the document placing surface 63 or may be a bent line on the document placing surface 63.

In the first exemplary embodiment, a table part that moves by sliding in the apparatus width direction is illustrated as the table part 61 of the external reading part 60.

However, the table part 61 may be one configured to slide in the apparatus depth direction. Alternatively, the table part 61 may be configured to move by rotating and open an upper side of the document platen 51 of the document transporting reading part 50. Furthermore, the table part 61 may be configured to be attachable to and detachable from the housing 10A.

In the first exemplary embodiment, the table part 61 of the external reading part 60 is configured such that a length thereof in the apparatus width direction is longer than a half of an entire length of the document placing surface 63 in the apparatus width direction.

However, the length of the table part 61 in the apparatus width direction is not limited to the length longer than a half of the entire length of the document placing surface 63 in the apparatus width direction and may be equivalent to a half of the entire length of the document placing surface 63 in the apparatus width direction or may be shorter than a half of the entire length of the document placing surface 63 in the apparatus width direction.

In the first exemplary embodiment, the A3 size is illustrated as a maximum size of a document G that can be read by the reading device 66 of the external reading part 60.

However, the maximum size of a document G that can be read by the reading device 66 is not limited to the A3 size and may be a size larger than the A3 size such as the A2 size or the B3 size or may be a size smaller than the A3 size such as the A4 size or the B4 size.

In the first exemplary embodiment, the A4 size is illustrated as a size of the recording media P3 that can be stored the most in the lowermost storage part 31C of the medium storage part 30A. However, the size of the recording media P3 that can be stored the most in the storage part 31C is not limited to the A4 size and may be the A3 size or may be the B5 size.

Although a gap having an L shape when viewed from the apparatus depth direction (front size) is illustrated as the gap S of the document placing surface 63, the gap S of the document placing surface 63 is not limited to one having an L shape.

For example, a shape of the gap S of the document placing surface 63 viewed from the apparatus depth direction may be a linear shape as long as a part of the table part 61 or the covering part 58 is disposed on the virtual straight line KC4 connecting the lower end of the overlapping part and the reading device 66 as in the external reading part 660C (see FIG. 44C) according to Comparative Example 3.

Figure 40A:
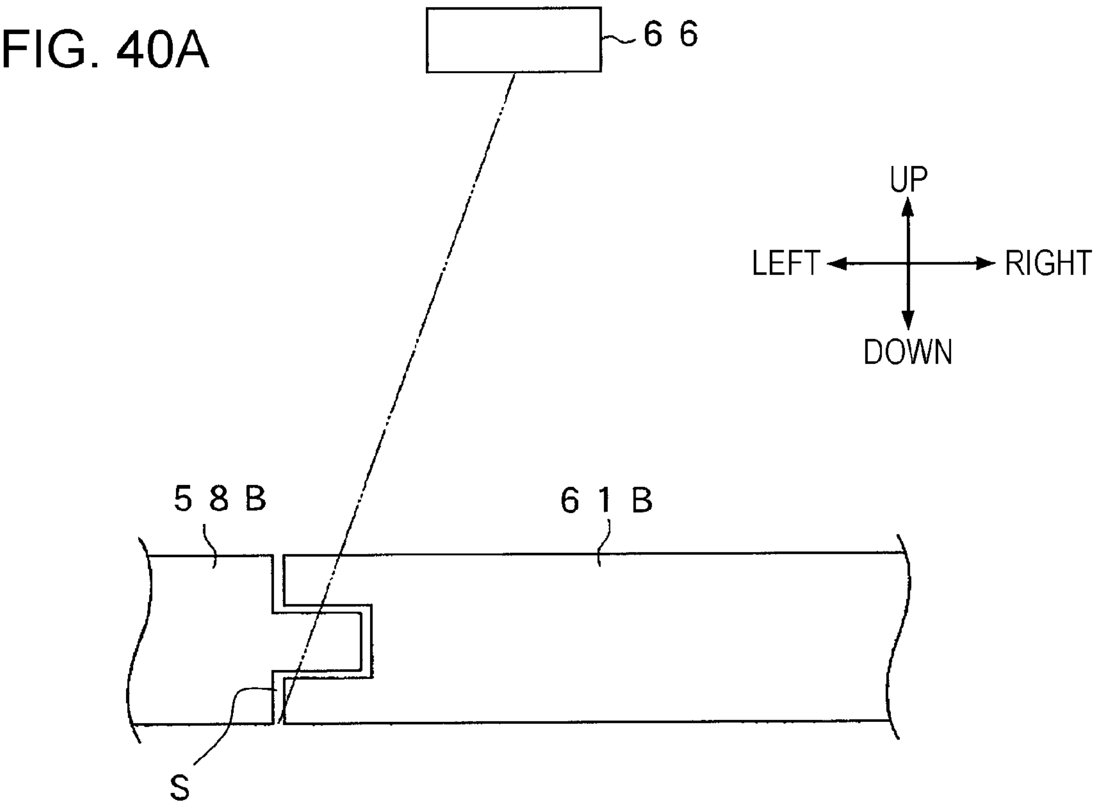
FIG. 40A illustrates a modification of a part of the document placing surface.

Alternatively, the shape of the gap S of the document placing surface 63 viewed from the apparatus depth direction may be a shape of a hat lying on its side (convex part), as illustrated in FIG. 40A. Specifically, the gap S illustrated in FIG. 40A is formed between a covering part 58B whose end portion on a right side has a convex shape bulging rightward and a table part 61B whose end portion on a left side has a concave shape corresponding to the right end portion of the covering part 58B when viewed from the apparatus depth direction.

Figure 40B:
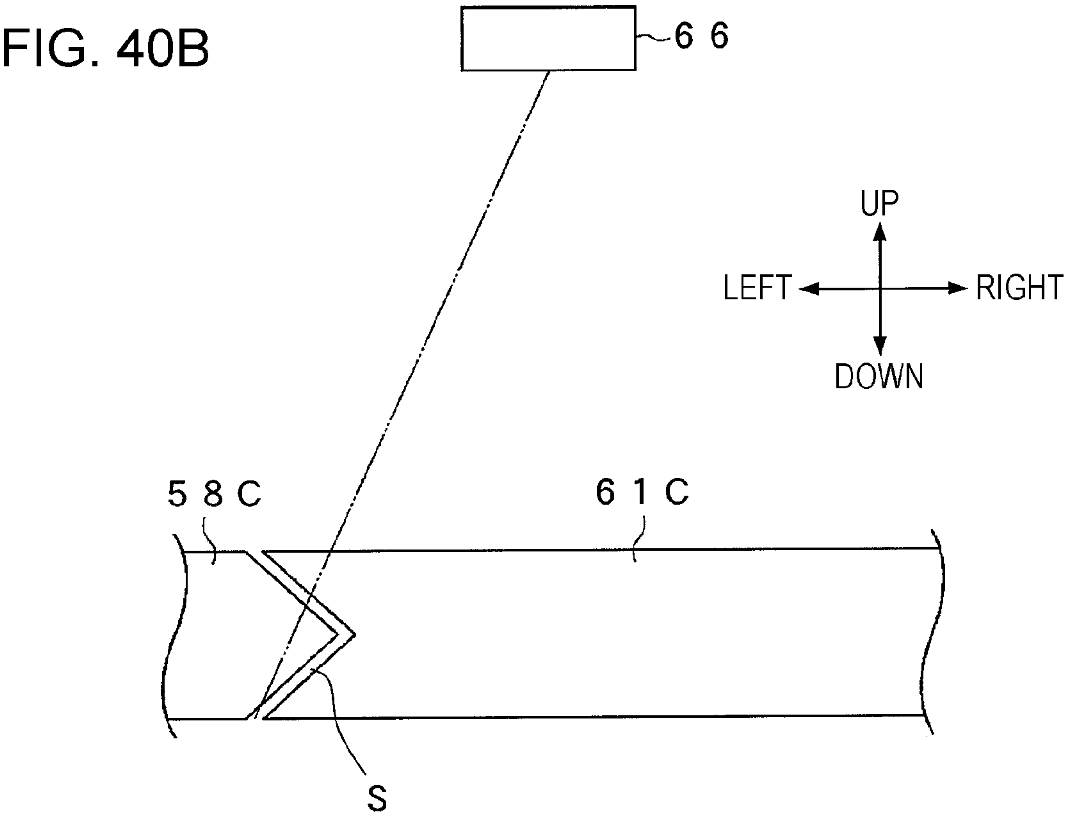
FIG. 40B illustrates another modification of a part of the document placing surface.

Alternatively, the shape of the gap S of the document placing surface 63 viewed from the apparatus depth direction may be a V shape lying on its side, as illustrated in FIG. 40B. Specifically, the gap S illustrated in FIG. 40B is formed between a covering part 58C whose end portion on a right side has a V-shape protrusion protruding rightward and a table part 61C whose end portion on a left side has a V-shaped recess corresponding to the right end portion of the covering part 58C when viewed from the apparatus depth direction.

Alternatively, the shape of the gap S viewed from the apparatus depth direction may be a U shape instead of the V shape of the gap S illustrated in FIG. 40B.

In the first exemplary embodiment, a case where the protruding part 58*f* forming the overlapping part 64 of the document placing surface 63 is integral with the covering part 58 has been illustrated.

However, the overlapping part 64 of the document placing surface 63 may be provided separately from the covering part 58 or the table part 61. Note that at least a part of the overlapping part 64 exposed from the gap S desirably has the same surface roughness and surface color as the covering part 58 or the table part 61.

In the first exemplary embodiment, a case where the document placing surface 63 is surrounded by the four marks M has been described. However, the document placing surface 63 is not limited in particular, and may be one formed by the whole upper surface of the top plate 58*a* of the covering part 58 and the whole upper surface 61*a* of the table part 61.

In the first exemplary embodiment, a case where the document placing surface 63 of the external reading part 60 is constituted by the upper surface 61*a* of the table part 61 located at the covering position and the top surface of the top plate 58*a* of the covering part 58 of the document transporting reading part 50 has been illustrated.

However, the document placing surface 63 may be configured such that a document G is placed only on the upper surface 61*a* of the table part 61. In this case, the reading range MH of the reading device 66 of the external reading part 60 may be a range including only the upper surface 61*a* of the table part 61.

Furthermore, for example, the document platen 51 of the document transporting reading part 50 may be used as an example of the document placing surface 63 of the external reading part 60.

That is, according to this configuration, a target to be read such as a document G whose document image is to be read by the reading device 66 of the external reading part 60 is placed on the document platen 51 of the document transporting reading part 50. In this case, for example, the table part 61 may be fixed at the open position or may be omitted.

The reading device 66 of the external reading part 60 is not limited to one that reads a still image and may be, for example, one that reads a moving image or the like.

A target to be read by the external reading part 60 is not limited to a document G and may be, for example, an image display device (e.g., a smartphone or a mobile terminal) that displays an image, a name card, or the like, as long as the target to be read is one that can be read by the reading device 66. Furthermore, any target to be read that can be placed on a part such as the document placing surface 63 can be used as a subject.

Although a case where a contact image sensor is used as the reader part 55 of the document transporting reading part 50 has been illustrated in the first exemplary embodiment, this is not restrictive. The reader part 55 may be, for example, an image sensor such as a CCD and may be any part that can read a document image of a transported document G.

Although a configuration example in which the two reading devices (reading sensors) 55A and 55B are disposed on both sides of a transport path of the transport mechanism 57 so as to read document images on front and rear surfaces of a document G at one time as the reader part 55 of the document transporting reading part 50 has been illustrated, this is not restrictive. Only one of the two reading devices 55A and 55B may be disposed as the reader part 55 so that a document image on one surface of a document G is read during transport.

Although the covering part 58 is disposed as a constituent part that constitutes a part of the document transporting reading part 50 in the first exemplary embodiment, this is not restrictive. For example, the covering part 58 may be configured as a constituent part that constitutes a part of the transport mechanism 57.

The image forming apparatus 1A according to the first exemplary embodiment may be configured not to include the document transporting reading part 50.

In the image forming apparatus 1A having this configuration, for example, a document image on a document G is read only by the reading device 66 of the external reading part 60.

Furthermore, in the image forming apparatus 1A having this configuration, the table part 61 of the external reading part 60 may be configured to open an upper side of the medium discharge part 40 by sliding rightward from the covering position illustrated in FIG. 8A and FIG. 9A. Even in the image forming apparatus 1A having this configuration, effects similar to those produced in the image forming apparatus 1A according to the first exemplary embodiment including the document transporting reading part 50 are produced.

Furthermore, the aspect of the driving device 70 encompasses not only a case where the driving device 70 is configured as a member separate from other constituent parts of the image forming apparatus 1A, but also a case where the driving device 70 is configured as a part of the image forming apparatus 1A. Similarly, the aspect of the frame according to the present disclosure encompasses not only a case where the frame of the driving device 70 is configured as a member separate from the inner frame 17 of the image forming apparatus 1A, but also a case where the inner frame 17 of the image forming apparatus 1A and the frame of the driving device 70 are a single frame.

The external reading part 60 may be omitted in the image forming apparatus 1A (including the image forming apparatus 1C) according to the first exemplary embodiment.

Furthermore, the document transporting reading part 50 may be omitted in the image forming apparatus 1B according to the second exemplary embodiment.

In a case where an image forming apparatus having such a configuration is employed, it is only necessary that, for example, an upper end covering is provided as an exterior covering at an upper end of the housing 10A or 10B, where the external reading part 60 or the document transporting reading part 50 is disposed in the original configuration.

In addition, the image forming part 20 is not limited to an electrophotographic image forming part using a developer and may be an image forming part 20 employing another image formation system (e.g., an ink ejection system, an offset printing system).

Furthermore, the image forming part 20 in the image forming apparatus may be an image forming part employing a direct transfer system in which a toner image formed on the photoconductor drum 21 is directly transferred onto a recording medium P instead of the intermediate transfer system using the intermediate transfer device 25.

Furthermore, the image forming part 20 in the image forming apparatus is not limited to an image forming part that forms a color image and may be an image forming part that forms an image having a single color (e.g., black).

The operation and effects described in the above exemplary embodiments are operation and effects in the present disclosure described in the above exemplary embodiments and are operation and effects produced under certain conditions. That is, the constituent parts described in the claims need not necessarily produce the above operation and effects corresponding to the constituent parts (that is, the operation and effects described in the above exemplary embodiments).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:

an apparatus body having an image forming part that forms an image on a recording medium and a medium storage part in which the recording medium to be supplied to the image forming part is stored;

a front opening/closing covering that is an openable and closable covering that covers at least a part of the image forming part and a part of the medium storage part on a front face of the apparatus body; and a side opening/closing covering that is provided on one or both of left and right side faces of the apparatus body and is heavier than the front opening/closing covering, wherein the front opening/closing covering is constituted by a single opening/closing covering that covers at least a range from one end to an other end in a left-right direction of the part of the medium storage part in a left-right direction of the apparatus body, and the side opening/closing covering is opened and closed by an opening/closing support member disposed on any one of ends in a left-right direction of the side opening/closing covering.

2. The image forming apparatus according to claim 1, wherein:

the front opening/closing covering covers a range from one end to an other end in the left-right direction of the part of the image forming part.

3. The image forming apparatus according to claim 2, wherein:

the medium storage part has a plurality of storage parts; and the front opening/closing covering covers all of the plurality of storage parts.

4. The image forming apparatus according to claim 3, wherein:

the medium storage part has an oblique storage part disposed obliquely on the front face of the apparatus body; and the front opening/closing covering covers at least the oblique storage part.

5. The image forming apparatus according to claim 4, wherein:

the front opening/closing covering has a shape such that a lower end thereof extends in the left-right direction without extending along an oblique contour line of the oblique storage part.

6. The image forming apparatus according to claim 2, wherein:

the medium storage part has a plurality of storage parts; and the front opening/closing covering covers one or some storage parts close to the image forming part among the plurality of storage parts.

7. The image forming apparatus according to claim 6, wherein:

the medium storage part has an oblique storage part disposed obliquely on the front face of the apparatus body; and the front opening/closing covering covers at least the oblique storage part.

8. The image forming apparatus according to claim 7, wherein:

the front opening/closing covering has a shape such that a lower end thereof extends in the left-right direction without extending along an oblique contour line of the oblique storage part.

9. The image forming apparatus according to claim 2, wherein:

the medium storage part has an oblique storage part disposed obliquely on the front face of the apparatus body; and the front opening/closing covering covers at least the oblique storage part.

10. The image forming apparatus according to claim 9, wherein:

the front opening/closing covering has a shape such that a lower end thereof extends in the left-right direction without extending along an oblique contour line of the oblique storage part.

11. The image forming apparatus according to claim 2, further comprising:

a reading device provided above the apparatus body.

12. The image forming apparatus according to claim 1, wherein:

the medium storage part has a plurality of storage parts; and the front opening/closing covering covers all of the plurality of storage parts.

13. The image forming apparatus according to claim 12, wherein:

the medium storage part has an oblique storage part disposed obliquely on the front face of the apparatus body; and the front opening/closing covering covers at least the oblique storage part.

14. The image forming apparatus according to claim 13, wherein:

the front opening/closing covering has a shape such that a lower end thereof extends in the left-right direction without extending along an oblique contour line of the oblique storage part.

15. The image forming apparatus according to claim 1, wherein:

the medium storage part has a plurality of storage parts; and the front opening/closing covering covers one or some storage parts close to the image forming part among the plurality of storage parts.

16. The image forming apparatus according to claim 15, wherein:

the medium storage part has an oblique storage part disposed obliquely on the front face of the apparatus body; and the front opening/closing covering covers at least the oblique storage part.

17. The image forming apparatus according to claim 16, wherein:

the front opening/closing covering has a shape such that a lower end thereof extends in the left-right direction without extending along an oblique contour line of the oblique storage part.

18. The image forming apparatus according to claim 1, wherein:

the medium storage part has an oblique storage part disposed obliquely on the front face of the apparatus body; and the front opening/closing covering covers at least the oblique storage part.

19. The image forming apparatus according to claim 18, wherein:

the front opening/closing covering has a shape such that a lower end thereof extends in the left-right direction without extending along an oblique contour line of the oblique storage part.

20. The image forming apparatus according to claim 1, further comprising:

a reading device provided above the apparatus body.

* * * * *